US011202047B2

United States Patent
Rivard et al.

(10) Patent No.: US 11,202,047 B2
(45) Date of Patent: Dec. 14, 2021

(54) SYSTEMS AND METHODS FOR DIGITAL PHOTOGRAPHY

(71) Applicant: Duelight LLC, Sunnyvale, CA (US)

(72) Inventors: William Guie Rivard, Menlo Park, CA (US); Adam Barry Feder, Mountain View, CA (US); Brian J. Kindle, Sunnyvale, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 155 days.

(21) Appl. No.: 16/744,735

(22) Filed: Jan. 16, 2020

(65) Prior Publication Data

US 2020/0154089 A1 May 14, 2020

Related U.S. Application Data

(63) Continuation of application No. 16/518,811, filed on Jul. 22, 2019, now Pat. No. 10,554,943, which is a
(Continued)

(51) Int. Cl.
*H04N 5/232* (2006.01)
*H04N 9/73* (2006.01)
(Continued)

(52) U.S. Cl.
CPC .......... *H04N 9/735* (2013.01); *H04N 1/3871* (2013.01); *H04N 5/2256* (2013.01);
(Continued)

(58) Field of Classification Search
CPC .. H04N 9/735; H04N 5/23232; H04N 5/2256; H04N 5/2353; H04N 5/2354;
(Continued)

(56) References Cited

U.S. PATENT DOCUMENTS 8,270,764 B1 * 9/2012 Agarwala ............... G06T 11/60
 345/629
8,644,644 B2 * 2/2014 Yadav ...................... G06T 5/50
 345/441

(Continued)

OTHER PUBLICATIONS

Corrected Notice of Allowance from U.S. Appl. No. 14/340,557, dated Jul. 27, 2017.
(Continued)

*Primary Examiner* — Mekonnen D Dagnew
(74) *Attorney, Agent, or Firm* — Zilka-Kotab, P.C.

(57) ABSTRACT

A system, method, and computer program product are provided for rendering a combined image. In use, two or more source images including at least one strobe image and at least one ambient image are loaded. A pixel-level correction is estimated for at least one of the two or more source images based on a pixel level correction function. At least one pixel of the two or more source images is color-corrected based on the pixel-level correction. A first blend weight associated with the two or more source images is initialized, and a first combined image from the two or more source images is rendered based on the color-correction and the first blend weight. Additional systems, methods, and computer program products are also presented.

20 Claims, 31 Drawing Sheets

Related U.S. Application Data continuation of application No. 16/296,038, filed on Mar. 7, 2019, now Pat. No. 10,375,367, which is a continuation of application No. 16/147,149, filed on Sep. 28, 2018, now Pat. No. 10,284,834, which is a continuation of application No. 15/808,753, filed on Nov. 9, 2017, now Pat. No. 10,110,867, which is a continuation of application No. 14/887,211, filed on Oct. 19, 2015, now Pat. No. 9,924,147, which is a continuation of application No. 13/999,343, filed on Feb. 11, 2014, now Pat. No. 9,215,433.

(51) Int. Cl.
  *H04N 5/225* (2006.01)
  *H04N 9/76* (2006.01)
  *H04N 5/235* (2006.01)
  *H04N 1/387* (2006.01)

(52) U.S. Cl.
  CPC ......... *H04N 5/2353* (2013.01); *H04N 5/2354* (2013.01); *H04N 5/23232* (2013.01); *H04N 5/232933* (2018.08); *H04N 9/76* (2013.01)

(58) Field of Classification Search
  CPC ........ H04N 9/045; H04N 9/76; H04N 1/3871; H04N 5/232933
  See application file for complete search history.

(56) References Cited

U.S. PATENT DOCUMENTS

| | | | |
|---|---|---|---|
| 8,872,855 | B2 | 10/2014 | Doll |
| 9,070,229 | B2 | 6/2015 | Williamson et al. |
| 9,215,433 | B2 | 12/2015 | Rivard et al. |
| 9,424,798 | B2 | 8/2016 | Park |
| 9,489,927 | B2 | 11/2016 | Aizawa |
| 9,560,269 | B2 | 1/2017 | Baldwin |
| 9,591,225 | B2 | 3/2017 | Jung et al. |
| 9,628,647 | B2 | 4/2017 | Tomono et al. |
| 9,924,147 | B2 | 3/2018 | Rivard et al. |
| 10,110,867 | B2 | 10/2018 | Rivard et al. |
| 10,284,834 | B2 | 5/2019 | Rivard et al. |
| 10,375,367 | B2 | 8/2019 | Rivard et al. |
| 10,554,943 | B2 | 2/2020 | Rivard et al. |
| 2006/0012689 | A1 | 1/2006 | Dalton et al. |
| 2006/0203100 | A1 | 9/2006 | Ajito et al. |
| 2009/0002391 | A1 | 1/2009 | Williamson et al. |
| 2009/0021937 | A1 | 1/2009 | Sloan et al. |
| 2009/0219387 | A1 | 9/2009 | Marman et al. |
| 2010/0066763 | A1 | 3/2010 | MacDougall et al. |
| 2010/0123805 | A1 | 5/2010 | Craig et al. |
| 2012/0176413 | A1 | 7/2012 | Kulik et al. |
| 2012/0324400 | A1 | 12/2012 | Caliendo, Jr. et al. |
| 2013/0016222 | A1 | 1/2013 | Jiang et al. |
| 2013/0063571 | A1* | 3/2013 | Ishii ............ G06T 15/205 348/47 |
| 2013/0222516 | A1 | 8/2013 | Do et al. |
| 2013/0335596 | A1 | 12/2013 | Demandolx et al. |
| 2014/0002718 | A1 | 1/2014 | Spielberg |
| 2015/0030246 | A1 | 1/2015 | Wilensky et al. |
| 2015/0229898 | A1 | 8/2015 | Rivard et al. |
| 2016/0044293 | A1 | 2/2016 | Rivard et al. |
| 2016/0248968 | A1 | 8/2016 | Baldwin |
| 2017/0048442 | A1 | 2/2017 | Cote et al. |
| 2017/0048449 | A1 | 2/2017 | Chen et al. |
| 2019/0037192 | A1 | 1/2019 | Rivard et al. |
| 2019/0208172 | A1 | 7/2019 | Rivard et al. |
| 2019/0342534 | A1 | 11/2019 | Rivard et al. |

OTHER PUBLICATIONS

Notice of Allowance for U.S. Appl. No. 13/999,343, dated Jul. 17, 2015.
Non-Final Office Action from U.S. Appl. No. 14/887,211, dated Feb. 18, 2016.
Final Office Action from U.S. Appl. No. 14/887,211, dated Sep. 23, 2016.
Notice of Allowance from U.S. Appl. No. 14/887,211, dated May 1, 2017.
Notice of Allowance from U.S. Appl. No. 14/887,211, dated Sep. 13, 2017.
Non-Final Office Action from U.S. Appl. No. 14/887,211, dated Jan. 17, 2017.
Non-Final Office Action from U.S. Appl. No. 15/808,753, dated Feb. 23, 2018.
Notice of Allowance from U.S. Appl. No. 15/808,753, dated Jul. 10, 2018.
Notice of Allowance from U.S. Appl. No. 16/147,149, dated Jan. 14, 2019.
Notice of Allowance from U.S. Appl. No. 16/296,038, dated Apr. 12, 2019.
Notice of Allowance from U.S. Appl. No. 16/518,811, dated Sep. 25, 2019.
Rivard et al., U.S. Appl. No. 16/518,811, filed Jul. 22, 2019.

* cited by examiner

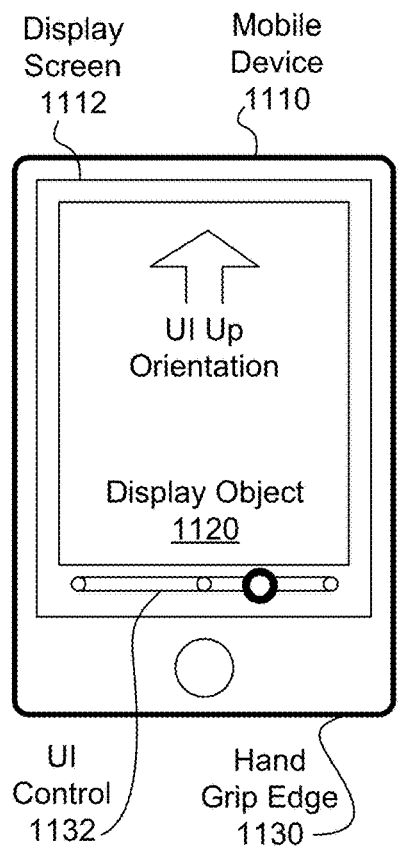
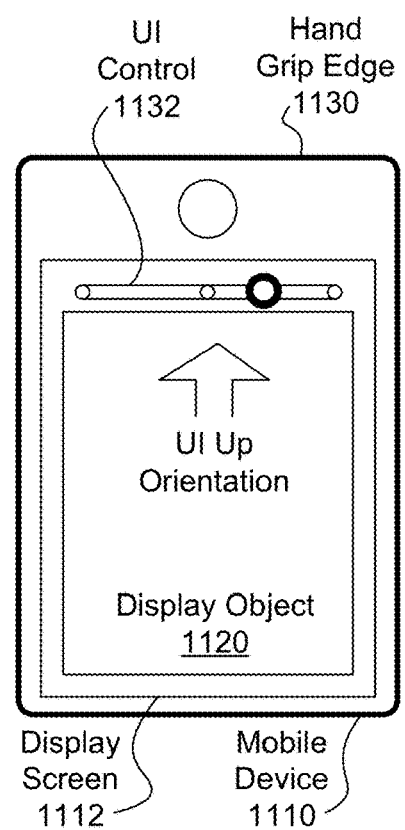
Figure 11A
Figure 11B
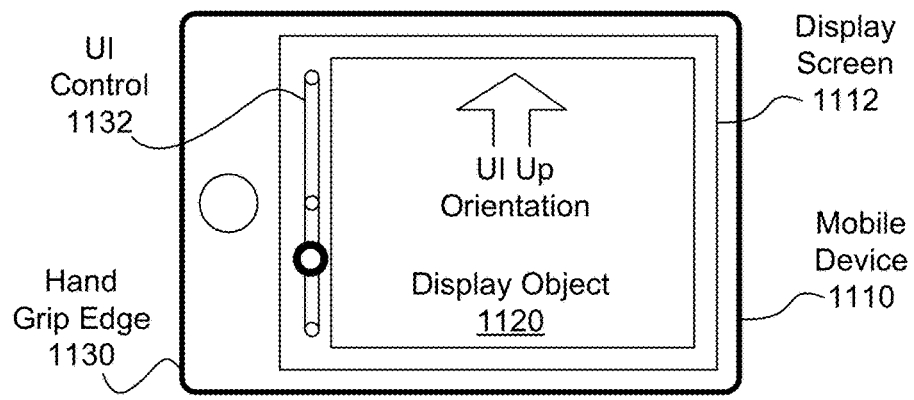
Figure 11C

SYSTEMS AND METHODS FOR DIGITAL PHOTOGRAPHY

CROSS-REFERENCES TO RELATED APPLICATIONS

The present application is a continuation of, and claims priority to, U.S. patent application Ser. No. 16/518,811, filed Jul. 22, 2019, entitled "SYSTEMS AND METHODS FOR DIGITAL PHOTOGRAPHY," which in turn is a continuation of, and claims priority to, U.S. patent application Ser. No. 16/296,038, filed Mar. 7, 2019, entitled "SYSTEMS AND METHODS FOR DIGITAL PHOTOGRAPHY," now U.S. Pat. No. 10,375,367, which in turn is a continuation of, and claims priority to, U.S. patent application Ser. No. 16/147,149, filed Sep. 28, 2018, entitled "SYSTEMS AND METHODS FOR DIGITAL PHOTOGRAPHY", now U.S. Pat. No. 10,284,834, which in turn is a continuation of, and claims priority to, U.S. patent application Ser. No. 15/808,753, filed Nov. 9, 2017, entitled "SYSTEMS AND METHODS FOR DIGITAL PHOTOGRAPHY", now U.S. Pat. No. 10,110,867; which in turn is a continuation of, and claims priority to, U.S. patent application Ser. No. 14/887,211, filed Oct. 19, 2015, entitled "SYSTEMS AND METHODS FOR DIGITAL PHOTOGRAPHY", now U.S. Pat. No. 9,924,147; which in turn is a continuation of, and claims priority to, U.S. patent application Ser. No. 13/999,343, filed Feb. 11, 2014, entitled "Systems and Methods for Digital Photography", now U.S. Pat. No. 9,215,433; which, in turn, claims priority to U.S. Provisional Application No. 61/850,246, titled "Systems and Methods for Digital Photography," filed Feb. 12, 2013, the entire contents of all of which are hereby incorporated by reference for all purposes.

BACKGROUND OF THE INVENTION

Field of the Invention

Embodiments of the present invention relate generally to photographic systems, and more specifically to systems and methods for digital photography.

Description of the Related Art

A typical digital camera generates a digital photograph by focusing an optical image of a scene onto an image sensor, which samples the optical image to generate an electronic representation of the scene. The electronic representation is then processed and stored as the digital photograph. The image sensor is configured to generate a two-dimensional array of color pixel values from the optical image, typically including an independent intensity value for standard red, green, and blue wavelengths. The digital photograph is commonly viewed by a human, who reasonably expects the digital photograph to represent the scene as if observed directly. To generate digital photographs having a natural appearance, digital cameras attempt to mimic certain aspects of human visual perception.

One aspect of human visual perception that digital cameras mimic is dynamic adjustment to scene intensity. An iris within the human eye closes to admit less light and opens to admit more light, allowing the human eye to adjust to different levels of light intensity in a scene. Digital cameras dynamically adjust to scene intensity by selecting a shutter speed, sampling sensitivity ("ISO" index of sensitivity), and lens aperture to yield a good exposure level when generating a digital photograph. A good exposure level generally preserves subject detail within the digital photograph. Modern digital cameras are typically able to achieve good exposure level for scenes with sufficient ambient lighting.

Another aspect of human visual perception that digital cameras mimic is color normalization, which causes a white object to be perceived as being white, even under arbitrarily colored ambient illumination. Color normalization allows a given object to be perceived as having the same color over a wide range of scene illumination color and therefore average scene color, also referred to as white balance. For example, a white object will be perceived as being white whether illuminated by red-dominant incandescent lamps or blue-dominant afternoon shade light. A digital camera needs to compensate for scene white balance to properly depict the true color of an object, independent of illumination color. For example, a white object illuminated by incandescent lamps, which inherently produce orange-tinted light, will be directly observed as being white. However, a digital photograph of the same white object will appear to have an orange color cast imparted by the incandescent lamps. To achieve proper white balance for a given scene, a digital camera conventionally calculates gain values for red, green, and blue channels and multiplies each component of each pixel within a resulting digital photograph by an appropriate channel gain value. By compensating for scene white balance in this way, an object will be recorded within a corresponding digital photograph as having color that is consistent with a white illumination source, regardless of the actual white balance of the scene. In a candle-lit scene, which is substantially red in color, the digital camera may reduce red gain, while increasing blue gain. In the case of afternoon shade illumination, which is substantially blue in color, the digital camera may reduce blue gain and increase red gain.

In scenarios where a scene has sufficient ambient lighting, a typical digital camera is able to generate a digital photograph with good exposure and proper white balance. One technique for implementing white balance compensation makes a "gray world" assumption, which states that an average image color should naturally be gray (attenuated white). This assumption is generally consistent with how humans dynamically adapt to perceive color.

In certain common scenarios, ambient lighting within a scene is not sufficient to produce a properly-exposed digital photograph of the scene or certain subject matter within the scene. In one example scenario, a photographer may wish to photograph a subject at night in a setting that is inadequately illuminated by incandescent or fluorescent lamps. A photographic strobe, such as a light-emitting diode (LED) or Xenon strobe, is conventionally used to beneficially illuminate the subject and achieve a desired exposure. However, the color of the strobe frequently does not match that of ambient illumination, creating a discordant appearance between objects illuminated primarily by the strobe and other objects illuminated primarily by ambient lighting.

For example, if ambient illumination is provided by incandescent lamps having a substantially orange color and strobe illumination is provided by an LED having a substantially white color, then a set of gain values for red, green, and blue that provides proper white balance for ambient illumination will result in an unnatural blue tint on objects primarily illuminated by the strobe. Alternatively, a set of gain values that provides proper white balance for the LED will result in an overly orange appearance for objects primarily illuminated by ambient incandescent light. A photograph taken with the LED strobe in this scenario will either have properly colored regions that are primarily illuminated by the strobe and improperly orange regions that are primarily illuminated by ambient light, or improperly blue-tinted regions that are primarily illuminated by the strobe and properly-colored regions that are primarily illuminated by ambient light. In sum, the photograph will include regions that are unavoidably discordant in color because the white balance of the strobe is different than that of the ambient illumination.

One approach to achieving relatively consistent white balance in strobe photography is to flood a given scene with illumination from a high-powered strobe or multiple high-powered strobes, thereby overpowering ambient illumination sources and forcing illumination in the scene to the same white balance. Flooding does not correct for discordantly colored ambient light sources such as incandescent lamps or candles visible within the scene. With ambient illumination sources of varying color overpowered, a digital camera may generate a digital photograph according to the color of the high-powered strobe and produce an image having very good overall white balance. However, such a solution is impractical in many settings. For example, a high-powered strobe is not conventionally available in small consumer digital cameras or mobile devices that include a digital camera subsystem. Conventional consumer digital cameras have very limited strobe capacity and are incapable of flooding most scenes. Furthermore, flooding a given environment with an intense pulse of strobe illumination may be overly disruptive and socially unacceptable in many common settings, such as a public restaurant or indoor space. As such, even when a high-powered strobe unit is available, flooding an entire scene may be disallowed. More commonly, a combination of partial strobe illumination and partial ambient illumination is available, leading to discordant white balance within a resulting digital photograph.

As the foregoing illustrates, there is a need for addressing the issue of performing color balance and/or other issues associated with the prior art of photography.

SUMMARY

A system, method, and computer program product are provided for rendering a combined image. In use, two or more source images including at least one strobe image and at least one ambient image are loaded. A pixel-level correction is estimated for at least one of the two or more source images based on a pixel level correction function. At least one pixel of the two or more source images is color-corrected based on the pixel-level correction. A first blend weight associated with the two or more source images is initialized, and a first combined image from the two or more source images is rendered based on the color-correction and the first blend weight. Additional systems, methods, and computer program products are also presented.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 11A-11C illustrate a user interface configured to adapt to device orientation while preserving proximity of a user interface control element to a hand grip edge, according to embodiments of the present invention;

DETAILED DESCRIPTION

Certain embodiments of the present invention enable digital photographic systems having a strobe light source to beneficially preserve proper white balance within regions of a digital photograph primarily illuminated by the strobe light source as well as regions primarily illuminated by an ambient light source. Proper white balance is maintained within the digital photograph even when the strobe light source and an ambient light source are of discordant color. The strobe light source may comprise a light-emitting diode (LED), a Xenon tube, or any other type of technically feasible illuminator device. Certain embodiments beneficially maintain proper white balance within the digital photograph even when the strobe light source exhibits color shift, a typical characteristic of high-output LEDs commonly used to implement strobe illuminators for mobile devices.

Certain other embodiments enable efficient capture of multiple related images either concurrently in time, or spaced closely together in time. Each of the multiple related images may be sampled at different exposure levels within an image sensor.

Certain other embodiments provide for a user interface configured to enable efficient management of different merge parameters associated with a multi-exposure image.

System Overview

Figure 1A:
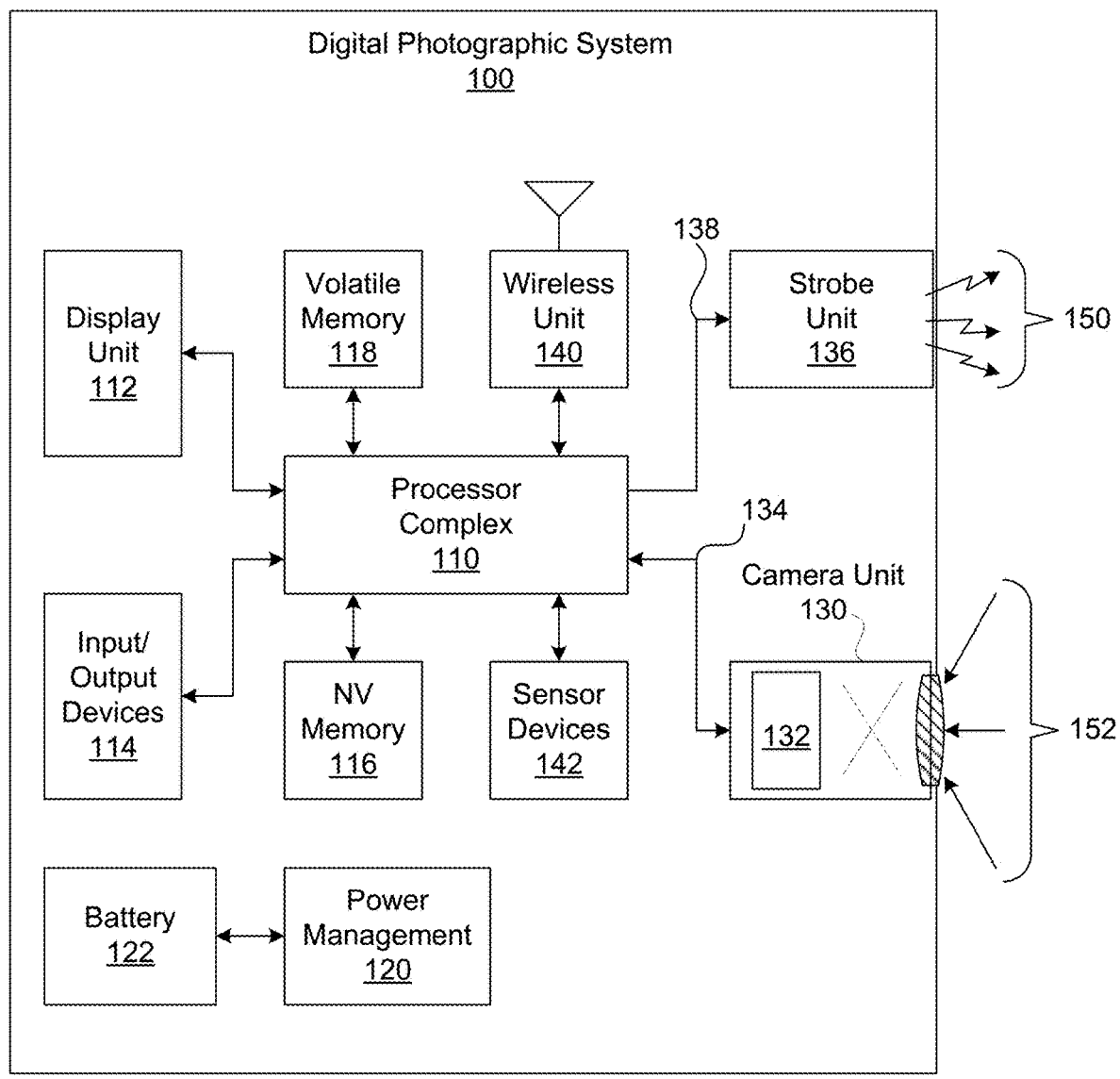
FIG. 1A illustrates a digital photographic system, configured to implement one or more aspects of the present invention.

FIG. 1A illustrates a digital photographic system 100, configured to implement one or more aspects of the present invention. Digital photographic system 100 includes a processor complex 110 coupled to a camera unit 130. Digital photographic system 100 may also include, without limitation, a display unit 112, a set of input/output devices 114, non-volatile memory 116, volatile memory 118, a wireless unit 140, and sensor devices 142, coupled to processor complex 110. In one embodiment, a power management subsystem 120 is configured to generate appropriate power supply voltages for each electrical load element within digital photographic system 100, and a battery 122 is configured to supply electrical energy to power management subsystem 120. Battery 122 may implement any technically feasible battery, including primary or rechargeable battery technologies. Alternatively, battery 122 may be implemented as a fuel cell, or high capacity electrical capacitor.

In one embodiment, strobe unit 136 is integrated into digital photographic system 100 and configured to provide strobe illumination 150 that is synchronized with an image capture event performed by camera unit 130. In an alternative embodiment, strobe unit 136 is implemented as an independent device from digital photographic system 100 and configured to provide strobe illumination 150 that is synchronized with an image capture event performed by camera unit 130. Strobe unit 136 may comprise one or more LED devices, one or more Xenon cavity devices, one or more instances of another technically feasible illumination device, or any combination thereof without departing the scope and spirit of the present invention. In one embodiment, strobe unit 136 is directed to either emit illumination or not emit illumination via a strobe control signal 138, which may implement any technically feasible signal transmission protocol. Strobe control signal 138 may also indicate an illumination intensity level.

In one usage scenario, strobe illumination 150 comprises at least a portion of overall illumination in a scene being photographed by camera unit 130. Optical scene information 152, which may include strobe illumination 150 reflected from objects in the scene, is focused onto an image sensor 132 as an optical image. Image sensor 132, within camera unit 130, generates an electronic representation of the optical image. The electronic representation comprises spatial color intensity information, which may include different color intensity samples for red, green, and blue light. In alternative embodiments the color intensity samples may include, without limitation, cyan, magenta, and yellow spatial color intensity information. Persons skilled in the art will recognize that other sets of spatial color intensity information may be implemented without departing the scope of embodiments of the present invention. The electronic representation is transmitted to processor complex 110 via interconnect 134, which may implement any technically feasible signal transmission protocol.

Display unit 112 is configured to display a two-dimensional array of pixels to form a digital image for display. Display unit 112 may comprise a liquid-crystal display, an organic LED display, or any other technically feasible type of display. Input/output devices 114 may include, without limitation, a capacitive touch input surface, a resistive tabled input surface, buttons, knobs, or any other technically feasible device for receiving user input and converting the input to electrical signals. In one embodiment, display unit 112 and a capacitive touch input surface comprise a touch entry display system, and input/output devices 114 comprise a speaker and microphone.

Non-volatile (NV) memory 116 is configured to store data when power is interrupted. In one embodiment, NV memory 116 comprises one or more flash memory devices. NV memory 116 may be configured to include programming instructions for execution by one or more processing units within processor complex 110. The programming instructions may include, without limitation, an operating system (OS), user interface (UI) modules, imaging processing and storage modules, and one or more embodiments of techniques taught herein for generating a digital photograph having proper white balance in both regions illuminated by ambient light and regions illuminated by the strobe unit 136. One or more memory devices comprising NV memory 116 may be packaged as a module that can be installed or removed by a user. In one embodiment, volatile memory 118 comprises dynamic random access memory (DRAM) configured to temporarily store programming instructions, image data, and the like needed during the course of normal operation of digital photographic system 100. Sensor devices 142 may include, without limitation, an accelerometer to detect motion and orientation, an electronic gyroscope to detect motion and orientation, a magnetic flux detector to detect orientation, and a global positioning system (GPS) module to detect geographic position.

Wireless unit 140 may include one or more digital radios configured to send and receive digital data. In particular, wireless unit 140 may implement wireless standards known in the art as "WiFi" based on institute for electrical and electronics engineers (IEEE) standard 802.11, and may implement digital cellular telephony standards for data communication such as the well-known "3G" and "4G" suites of standards. In one embodiment, digital photographic system 100 is configured to transmit one or more digital photographs, generated according to techniques taught herein and residing within either NV memory 116 or volatile memory 118 to an online photographic media service via wireless unit 140. In such a scenario, a user may possess credentials to access the online photographic media service and to transmit the one or more digital photographs for storage and presentation by the online photographic media service. The credentials may be stored or generated within digital photographic system 100 prior to transmission of the digital photographs. The online photographic media service may comprise a social networking service, photograph sharing service, or any other web-based service that provides storage and download of digital photographs. In certain embodiments, one or more digital photographs are generated by the online photographic media service according to techniques taught herein. In such embodiments, a user may upload source images for processing into the one or more digital photographs.

In one embodiment, digital photographic system 100 comprises a plurality of camera units 130 and at least one strobe unit 136 configured to sample multiple views of a scene. In one implementation, the plurality of camera units 130 is configured to sample a wide angle to generate a panoramic photograph. In another implementation, the plurality of camera units 130 is configured to sample two or more narrow angles to generate a stereoscopic photograph.

Figure 1B:
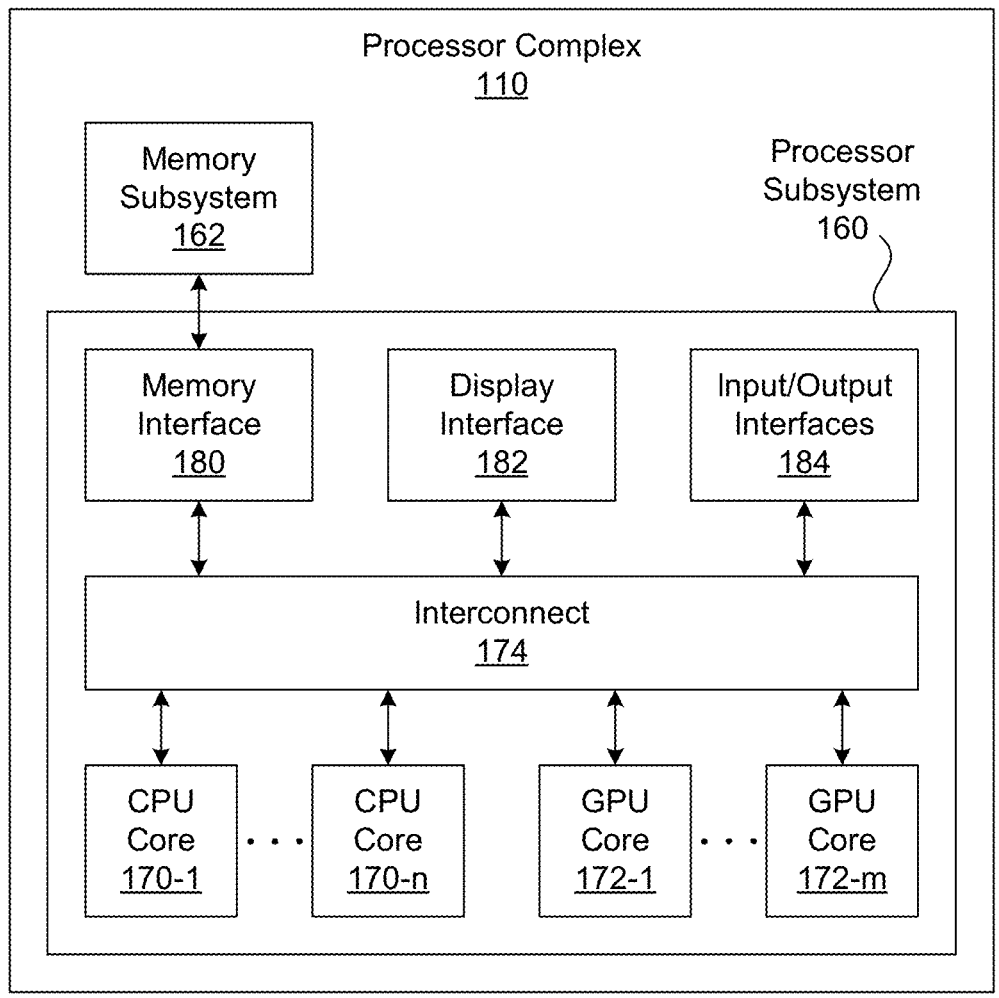
FIG. 1B illustrates a processor complex within the digital photographic system, according to one embodiment of the present invention.

FIG. 1B illustrates a processor complex 110 within digital photographic system 100, according to one embodiment of the present invention. Processor complex 110 includes a processor subsystem 160 and may include a memory subsystem 162. In one embodiment processor subsystem 160 comprises a system on a chip (SoC) die, memory subsystem 162 comprises one or more DRAM dies bonded to the SoC die, and processor complex 110 comprises a multi-chip module (MCM) encapsulating the SoC die and the one or more DRAM dies.

Processor subsystem 160 includes at least one central processing unit (CPU) core 170, a memory interface 180, input/output interfaces unit 184, and a display interface 182 coupled to an interconnect 174. The at least one CPU core 170 is configured to execute instructions residing within memory subsystem 162, volatile memory 118 of FIG. 1A, NV memory 116, or any combination thereof. Each of the at least one CPU core 170 is configured to retrieve and store data via interconnect 174 and memory interface 180. Each CPU core 170 may include a data cache, and an instruction cache. Two or more CPU cores 170 may share a data cache, an instruction cache, or any combination thereof. In one embodiment, a cache hierarchy is implemented to provide each CPU core 170 with a private layer one cache, and a shared layer two cache.

Graphic processing unit (GPU) cores 172 implement graphics acceleration functions. In one embodiment, at least one GPU core 172 comprises a highly-parallel thread processor configured to execute multiple instances of one or more thread programs. GPU cores 172 may be configured to execute multiple thread programs according to well-known standards such as OpenGL™, OpenCL™, CUDA™, and the like. In certain embodiments, at least one GPU core 172 implements at least a portion of a motion estimation function, such as a well-known Harris detector or a well-known Hessian-Laplace detector. Persons skilled in the art will recognize that such detectors may be used to provide point pairs for estimating motion between two images and a corresponding affine transform to account for the motion. As discussed in greater detail below, such an affine transform may be useful in performing certain steps related to embodiments of the present invention.

Interconnect 174 is configured to transmit data between and among memory interface 180, display interface 182, input/output interfaces unit 184, CPU cores 170, and GPU cores 172. Interconnect 174 may implement one or more buses, one or more rings, a mesh, or any other technically feasible data transmission structure or technique. Memory interface 180 is configured to couple memory subsystem 162 to interconnect 174. Memory interface 180 may also couple NV memory 116 and volatile memory 118 to interconnect 174. Display interface 182 is configured to couple display unit 112 to interconnect 174. Display interface 182 may implement certain frame buffer functions such as frame refresh. Alternatively, display unit 112 may implement frame refresh. Input/output interfaces unit 184 is configured to couple various input/output devices to interconnect 174.

Figure 1C:
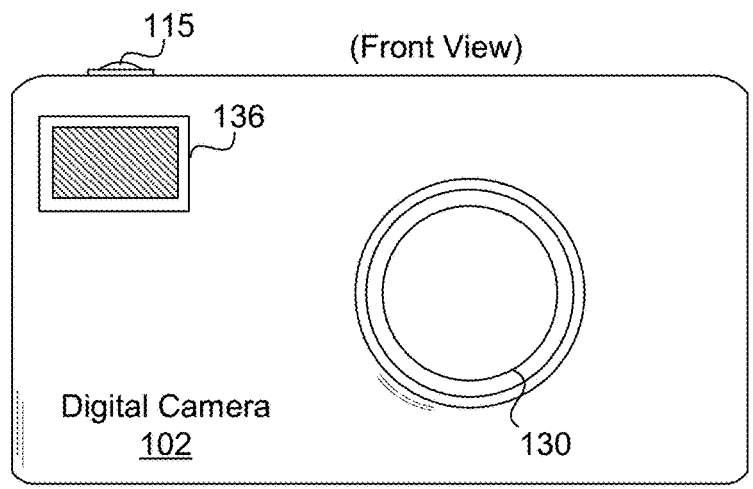
FIG. 1C illustrates a digital camera, according to one embodiment of the present invention.

FIG. 1C illustrates a digital camera 102, according to one embodiment of the present invention. Digital camera 102 comprises digital photographic system 100 packaged as a stand-alone system. As shown, a front lens for camera unit 130 and strobe unit 136 are configured to face in the same direction, allowing strobe unit 136 to illuminate a photographic subject, which camera unit 130 is then able to photograph. Digital camera 102 includes a shutter release button 115 for triggering a capture event to be executed by the camera unit 130. Shutter release button 115 represents an input device comprising input/output devices 114. Other mechanisms may trigger a capture event, such as a timer. In certain embodiments, digital camera 102 may be configured to trigger strobe unit 136 when photographing a subject regardless of available illumination, or to not trigger strobe unit 136 regardless of available illumination, or to automatically trigger strobe unit 136 based on available illumination or other scene parameters.

Figure 1D:
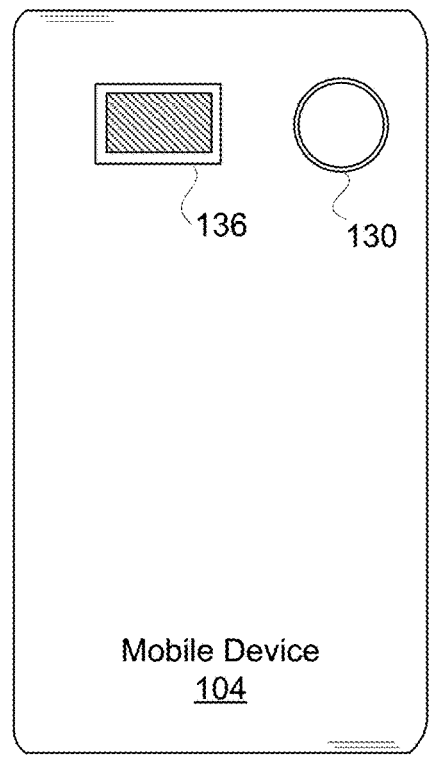
FIG. 1D illustrates a mobile device, according to one embodiment of the present invention.

FIG. 1D illustrates a mobile device 104, according to one embodiment of the present invention. Mobile device 104 comprises digital photographic system 100 and integrates additional functionality, such as cellular mobile telephony. Shutter release functions may be implemented via a mechanical button or via a virtual button, which may be activated by a touch gesture on a touch entry display system within mobile device 104. Other mechanisms may trigger a capture event, such as a remote control configured to transmit a shutter release command, completion of a timer count down, an audio indication, or any other technically feasible user input event.

In alternative embodiments, digital photographic system 100 may comprise a tablet computing device, a reality augmentation device, or any other computing system configured to accommodate at least one instance of camera unit 130 and at least one instance of strobe unit 136.

Image Synthesis

Figure 2A:
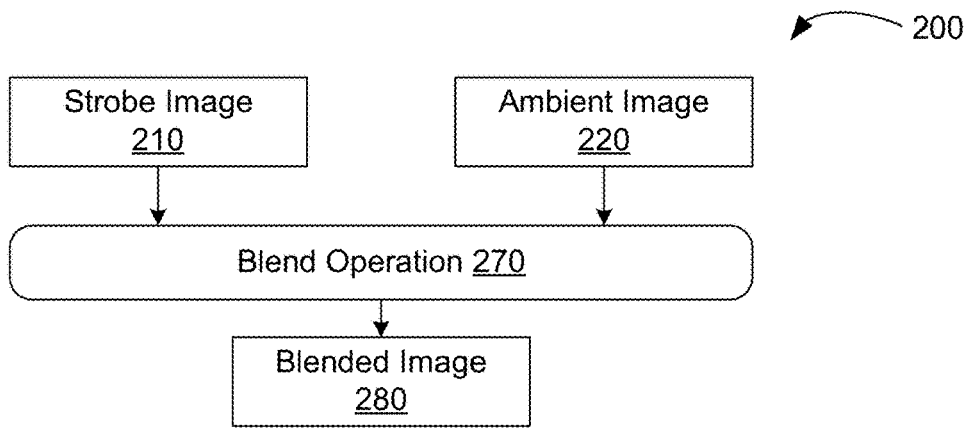
FIG. 2A illustrates a first data flow process for generating a blended image based on at least an ambient image and a strobe image, according to one embodiment of the present invention.

FIG. 2A illustrates a first data flow process 200 for generating a blended image 280 based on at least an ambient image 220 and a strobe image 210, according to one embodiment of the present invention. A strobe image 210 comprises a digital photograph sampled by camera unit 130 while strobe unit 136 is actively emitting strobe illumination 150. Ambient image 220 comprises a digital photograph sampled by camera unit 130 while strobe unit 136 is inactive and substantially not emitting strobe illumination 150. In other words, the ambient image 220 corresponds to a first lighting condition and the strobe image 210 corresponds to a second lighting condition.

In one embodiment, ambient image 220 is generated according to a prevailing ambient white balance for a scene being photographed. The prevailing ambient white balance may be computed using the well-known gray world model, an illuminator matching model, or any other technically feasible technique. Strobe image 210 should be generated according to an expected white balance for strobe illumination 150, emitted by strobe unit 136. Blend operation 270, discussed in greater detail below, blends strobe image 210 and ambient image 220 to generate a blended image 280 via preferential selection of image data from strobe image 210 in regions of greater intensity compared to corresponding regions of ambient image 220.

In one embodiment, data flow process 200 is performed by processor complex 110 within digital photographic system 100, and blend operation 270 is performed by at least one GPU core 172, one CPU core 170, or any combination thereof.

Figure 2B:
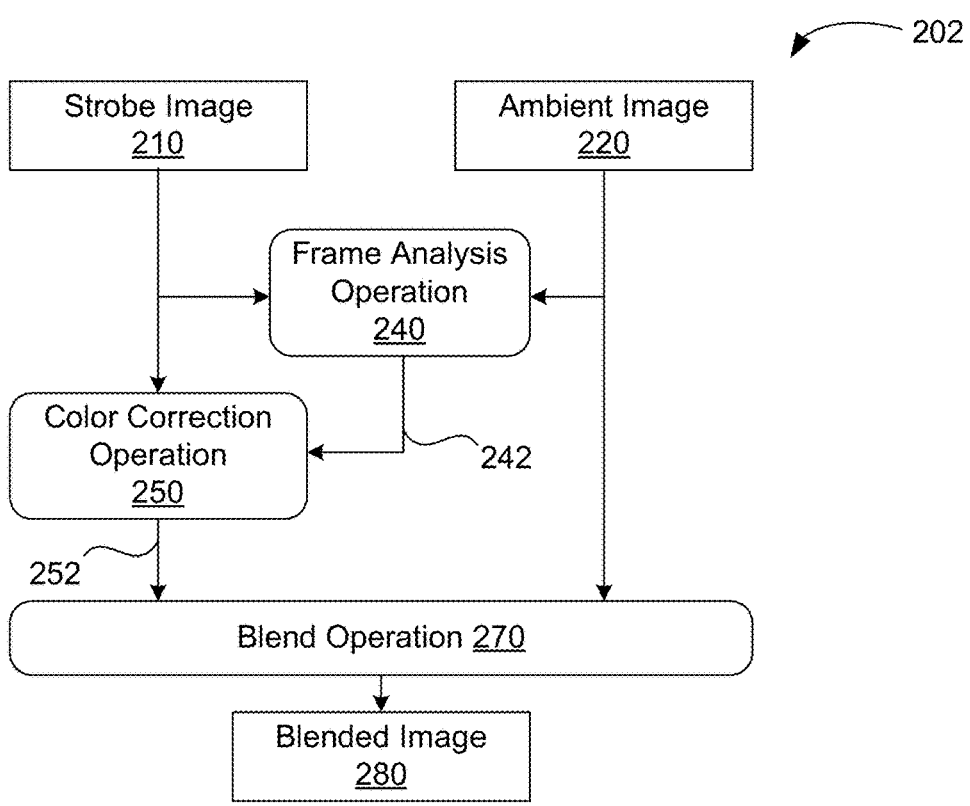
FIG. 2B illustrates a second data flow process for generating a blended image based on at least an ambient image and a strobe image, according to one embodiment of the present invention.

FIG. 2B illustrates a second data flow process 202 for generating a blended image 280 based on at least an ambient image 220 and a strobe image 210, according to one embodiment of the present invention. Strobe image 210 comprises a digital photograph sampled by camera unit 130 while strobe unit 136 is actively emitting strobe illumination 150. Ambient image 220 comprises a digital photograph sampled by camera unit 130 while strobe unit 136 is inactive and substantially not emitting strobe illumination 150.

In one embodiment, ambient image 220 is generated according to a prevailing ambient white balance for a scene being photographed. The prevailing ambient white balance may be computed using the well-known gray world model, an illuminator matching model, or any other technically feasible technique. In certain embodiments, strobe image 210 is generated according to the prevailing ambient white balance. In an alternative embodiment ambient image 220 is generated according to a prevailing ambient white balance, and strobe image 210 is generated according to an expected white balance for strobe illumination 150, emitted by strobe unit 136. In other embodiments, ambient image 210 and strobe image 220 comprise raw image data, having no white balance operation applied to either. Blended image 280 may be subjected to arbitrary white balance operations, as is common practice with raw image data, while advantageously retaining color consistency between regions dominated by ambient illumination and regions dominated by strobe illumination.

As a consequence of color balance differences between ambient illumination, which may dominate certain portions of strobe image 210 and strobe illumination 150, which may dominate other portions of strobe image 210, strobe image 210 may include color information in certain regions that is discordant with color information for the same regions in ambient image 220. Frame analysis operation 240 and color correction operation 250 together serve to reconcile discordant color information within strobe image 210. Frame analysis operation 240 generates color correction data 242, described in greater detail below, for adjusting color within strobe image 210 to converge spatial color characteristics of strobe image 210 to corresponding spatial color characteristics of ambient image 220. Color correction operation 250 receives color correction data 242 and performs spatial color adjustments to generate corrected strobe image data 252 from strobe image 210. Blend operation 270, discussed in greater detail below, blends corrected strobe image data 252 with ambient image 220 to generate blended image 280. Color correction data 242 may be generated to completion prior to color correction operation 250 being performed. Alternatively, certain portions of color correction data 242, such as spatial correction factors, may be generated as needed.

In one embodiment, data flow process 202 is performed by processor complex 110 within digital photographic system 100. In certain implementations, blend operation 270 and color correction operation 250 are performed by at least one GPU core 172, at least one CPU core 170, or a combination thereof. Portions of frame analysis operation 240 may be performed by at least one GPU core 172, one CPU core 170, or any combination thereof. Frame analysis operation 240 and color correction operation 250 are discussed in greater detail below.

Figure 2C:
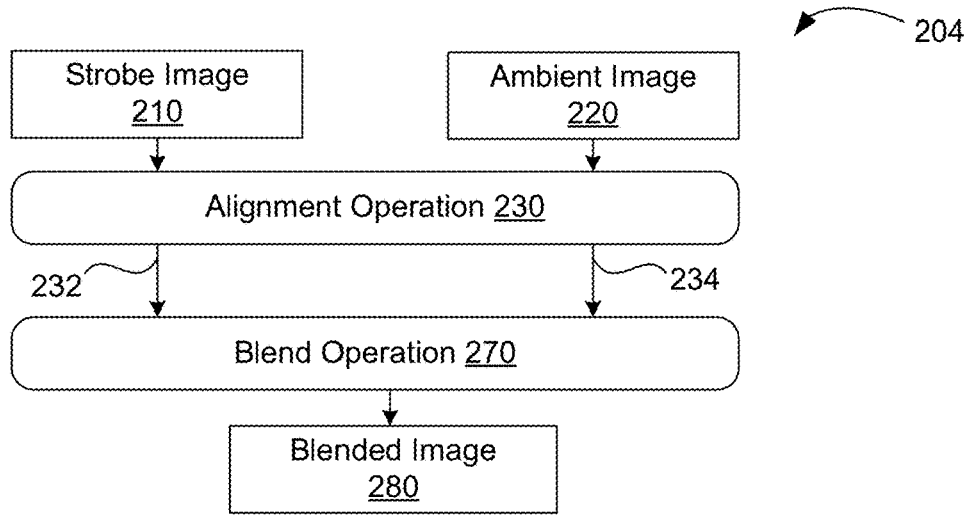
FIG. 2C illustrates a third data flow process for generating a blended image based on at least an ambient image and a strobe image, according to one embodiment of the present invention.

FIG. 2C illustrates a third data flow process 204 for generating a blended image 280 based on at least an ambient image 220 and a strobe image 210, according to one embodiment of the present invention. Strobe image 210 comprises a digital photograph sampled by camera unit 130 while strobe unit 136 is actively emitting strobe illumination 150. Ambient image 220 comprises a digital photograph sampled by camera unit 130 while strobe unit 136 is inactive and substantially not emitting strobe illumination 150.

In one embodiment, ambient image 220 is generated according to a prevailing ambient white balance for a scene being photographed. The prevailing ambient white balance may be computed using the well-known gray world model, an illuminator matching model, or any other technically feasible technique. Strobe image 210 should be generated according to an expected white balance for strobe illumination 150, emitted by strobe unit 136.

In certain common settings, camera unit 130 resides within a hand-held device, which may be subject to a degree of involuntary random movement or "shake" while being held in a user's hand. In these settings, when the hand-held device sequentially samples two images, such as strobe image 210 and ambient image 220, the effect of shake may cause misalignment between the two images. The two images should be aligned prior to blend operation 270, discussed in greater detail below. Alignment operation 230 generates an aligned strobe image 232 from strobe image 210 and an aligned ambient image 234 from ambient image 220. Alignment operation 230 may implement any technically feasible technique for aligning images or sub-regions.

In one embodiment, alignment operation 230 comprises an operation to detect point pairs between strobe image 210 and ambient image 220, an operation to estimate an affine or related transform needed to substantially align the point pairs. Alignment may then be achieved by executing an operation to resample strobe image 210 according to the affine transform thereby aligning strobe image 210 to ambient image 220, or by executing an operation to resample ambient image 220 according to the affine transform thereby aligning ambient image 220 to strobe image 210. Aligned images typically overlap substantially with each other, but may also have non-overlapping regions. Image information may be discarded from non-overlapping regions during an alignment operation. Such discarded image information should be limited to relatively narrow boundary regions. In certain embodiments, resampled images are normalized to their original size via a scaling operation performed by one or more GPU cores 172.

In one embodiment, the point pairs are detected using a technique known in the art as a Harris affine detector. The operation to estimate an affine transform may compute a substantially optimal affine transform between the detected point pairs, comprising pairs of reference points and offset points. In one implementation, estimating the affine transform comprises computing a transform solution that minimizes a sum of distances between each reference point and each offset point subjected to the transform. Persons skilled in the art will recognize that these and other techniques may be implemented for performing the alignment operation 230 without departing the scope and spirit of the present invention.

In one embodiment, data flow process 204 is performed by processor complex 110 within digital photographic system 100. In certain implementations, blend operation 270 and resampling operations are performed by at least one GPU core.

Figure 2D:
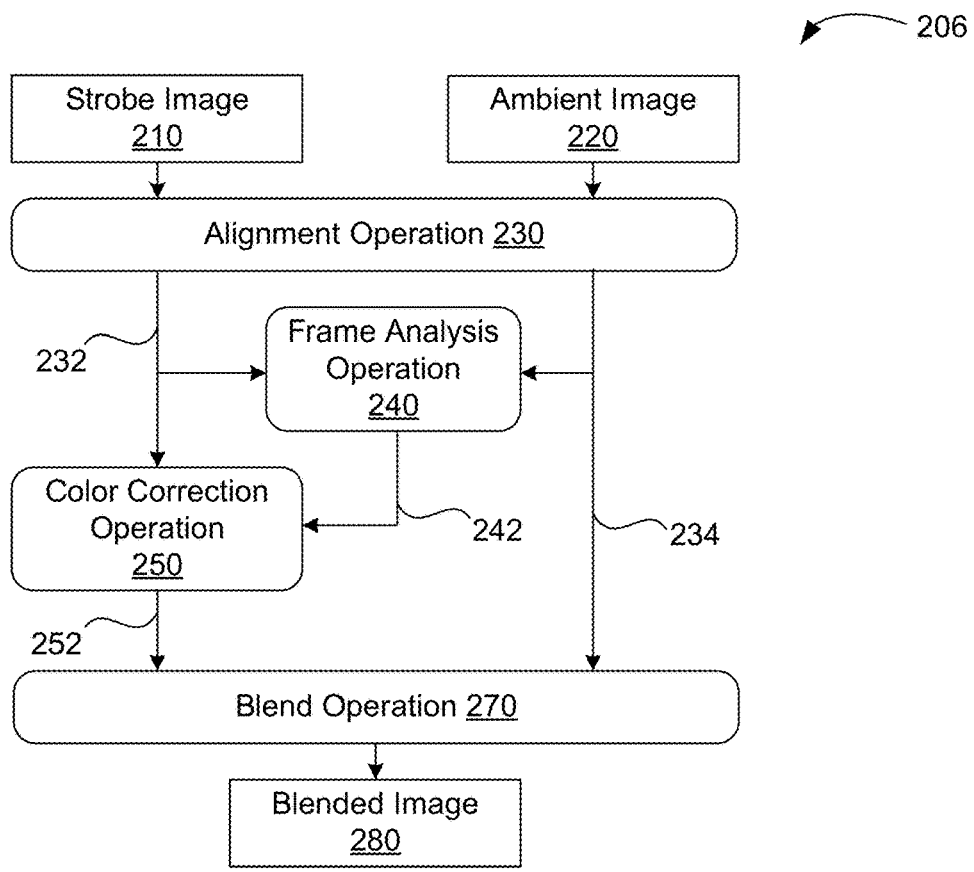
FIG. 2D illustrates a fourth data flow process for generating a blended image based on at least an ambient image and a strobe image, according to one embodiment of the present invention.

FIG. 2D illustrates a fourth data flow process 206 for generating a blended image 280 based on at least an ambient image 220 and a strobe image 210, according to one embodiment of the present invention. Strobe image 210 comprises a digital photograph sampled by camera unit 130 while strobe unit 136 is actively emitting strobe illumination 150. Ambient image 220 comprises a digital photograph sampled by camera unit 130 while strobe unit 136 is inactive and substantially not emitting strobe illumination 150.

In one embodiment, ambient image 220 is generated according to a prevailing ambient white balance for a scene being photographed. The prevailing ambient white balance may be computed using the well-known gray world model, an illuminator matching model, or any other technically feasible technique. In certain embodiments, strobe image 210 is generated according to the prevailing ambient white balance. In an alternative embodiment ambient image 220 is generated according to a prevailing ambient white balance, and strobe image 210 is generated according to an expected white balance for strobe illumination 150, emitted by strobe unit 136. In other embodiments, ambient image 210 and strobe image 220 comprise raw image data, having no white balance operation applied to either. Blended image 280 may be subjected to arbitrary white balance operations, as is common practice with raw image data, while advantageously retaining color consistency between regions dominated by ambient illumination and regions dominated by strobe illumination.

Alignment operation 230, discussed previously in FIG. 2C, generates an aligned strobe image 232 from strobe image 210 and an aligned ambient image 234 from ambient image 220. Alignment operation 230 may implement any technically feasible technique for aligning images.

Frame analysis operation 240 and color correction operation 250, both discussed previously in FIG. 2B, operate together to generate corrected strobe image data 252 from aligned strobe image 232. Blend operation 270, discussed in greater detail below, blends corrected strobe image data 252 with ambient image 220 to generate blended image 280.

Color correction data 242 may be generated to completion prior to color correction operation 250 being performed. Alternatively, certain portions of color correction data 242, such as spatial correction factors, may be generated as needed. In one embodiment, data flow process 206 is performed by processor complex 110 within digital photographic system 100.

While frame analysis operation 240 is shown operating on aligned strobe image 232 and aligned ambient image 234, certain global correction factors may be computed from strobe image 210 and ambient image 220. For example, in one embodiment, a frame-level color correction factor, discussed below, may be computed from strobe image 210 and ambient image 220. In such an embodiment the frame-level color correction may be advantageously computed in parallel with alignment operation 230, reducing overall time required to generate blended image 280.

In certain embodiments, strobe image 210 and ambient image 220 are partitioned into two or more tiles and color correction operation 250, blend operation 270, and resampling operations comprising alignment operation 230 are performed on a per tile basis before being combined into blended image 280. Persons skilled in the art will recognize that tiling may advantageously enable finer grain scheduling of computational tasks among CPU cores 170 and GPU cores 172. Furthermore, tiling enables GPU cores 172 to advantageously operate on images having higher resolution in one or more dimensions than native two-dimensional surface support may allow for the GPU cores. For example, certain generations of GPU core are only configured to operate on 2048 by 2048 pixel images, but popular mobile devices include camera resolution of more than 2048 in one dimension and less than 2048 in another dimension. In such a system, two tiles may be used to partition strobe image 210 and ambient image 220 into two tiles each, thereby enabling a GPU having a resolution limitation of 2048 by 2048 to operate on the images. In one embodiment, a first of tile blended image 280 is computed to completion before a second tile for blended image 280 is computed, thereby reducing peak system memory required by processor complex 110.

Figure 3A:
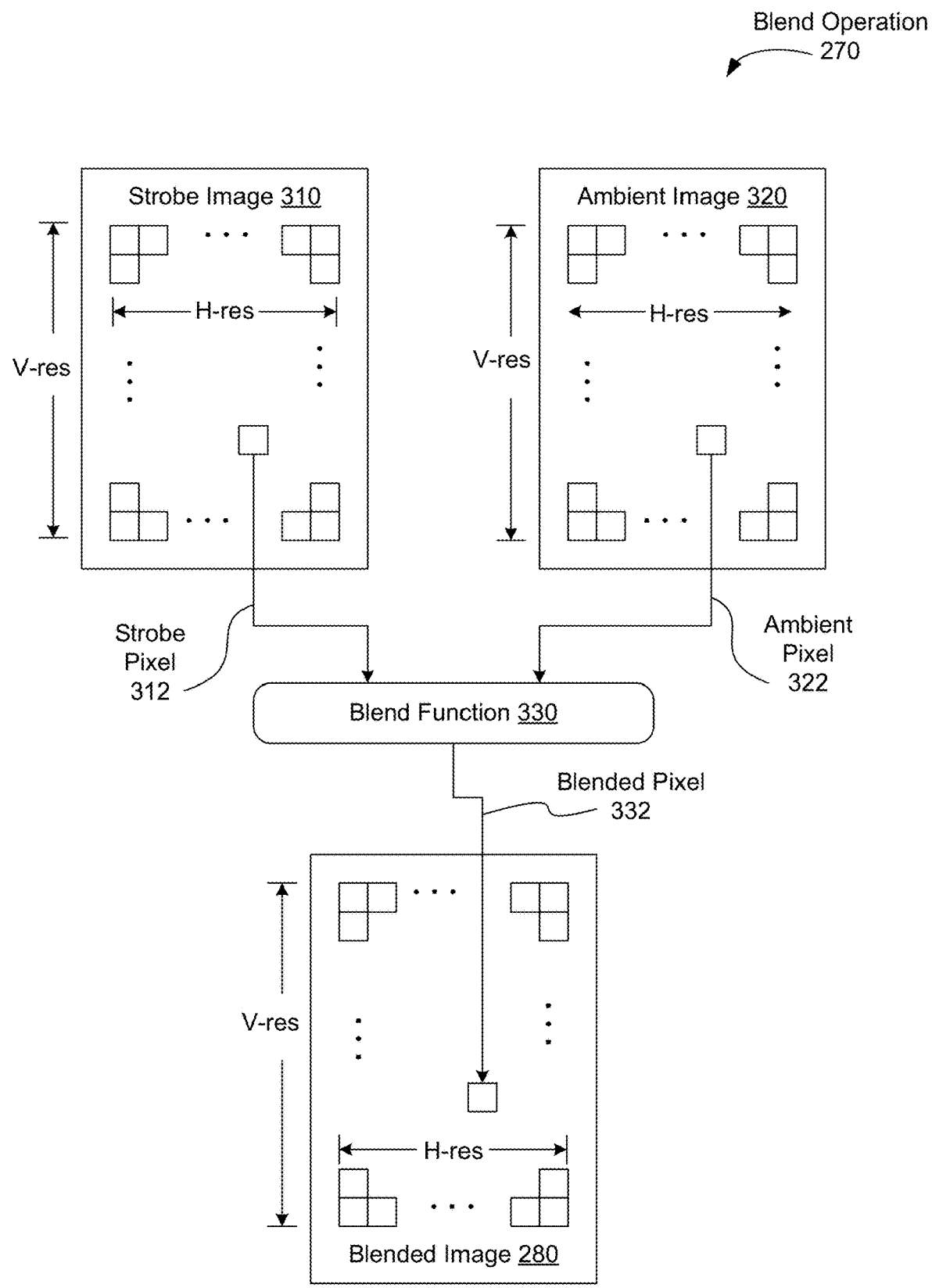
FIG. 3A illustrates an image blend operation for blending a strobe image with an ambient image to generate a blended image, according to one embodiment of the present invention.

FIG. 3A illustrates image blend operation 270, according to one embodiment of the present invention. A strobe image 310 and an ambient image 320 of the same horizontal resolution (H-res) and vertical resolution (V-res) are combined via blend function 330 to generate blended image 280 having the same horizontal resolution and vertical resolution. In alternative embodiments, strobe image 310 or ambient image 320, or both images may be scaled to an arbitrary resolution defined by blended image 280 for processing by blend function 330. Blend function 330 is described in greater detail below in FIGS. 3B-3D.

As shown, strobe pixel 312 and ambient pixel 322 are blended by blend function 330 to generate blended pixel 332, stored in blended image 280. Strobe pixel 312, ambient pixel 322, and blended pixel 332 are located in substantially identical locations in each respective image.

In one embodiment, strobe image 310 corresponds to strobe image 210 of FIG. 2A and ambient image 320 corresponds to ambient image 220. In another embodiment, strobe image 310 corresponds to corrected strobe image data 252 of FIG. 2B and ambient image 320 corresponds to ambient image 220. In yet another embodiment, strobe image 310 corresponds to aligned strobe image 232 of FIG. 2C and ambient image 320 corresponds to aligned ambient image 234. In still yet another embodiment, strobe image 310 corresponds to corrected strobe image data 252 of FIG. 2D, and ambient image 320 corresponds to aligned ambient image 234.

Blend operation 270 may be performed by one or more CPU cores 170, one or more GPU cores 172, or any combination thereof. In one embodiment, blend function 330 is associated with a fragment shader, configured to execute within one or more GPU cores 172.

Figure 3B:
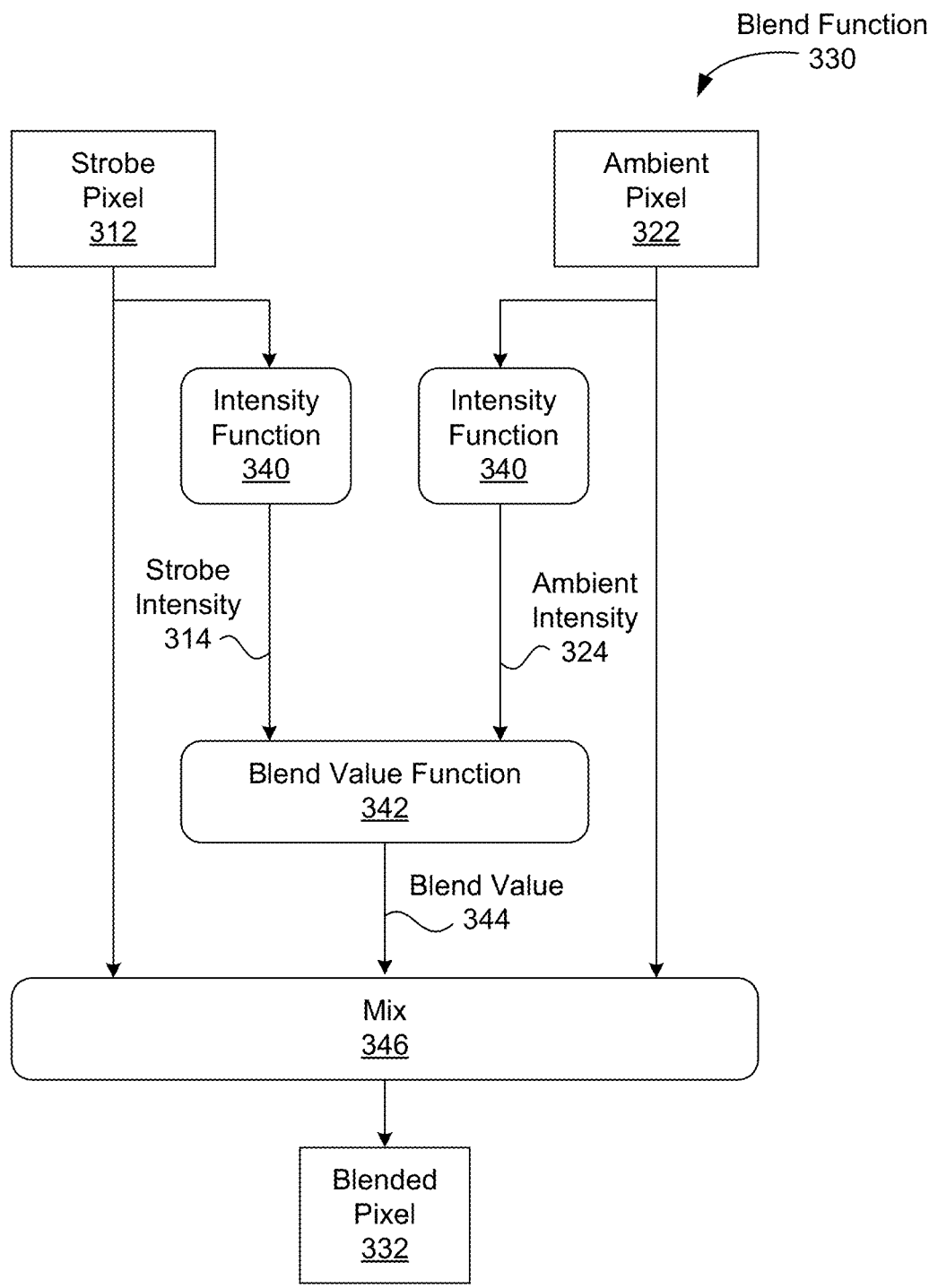
FIG. 3B illustrates a blend function for blending pixels associated with a strobe image and an ambient image, according to one embodiment of the present invention.

FIG. 3B illustrates blend function 330 of FIG. 3A for blending pixels associated with a strobe image and an ambient image, according to one embodiment of the present invention. As shown, a strobe pixel 312 from strobe image 310 and an ambient pixel 322 from ambient image 320 are blended to generate a blended pixel 332 associated with blended image 280.

Strobe intensity 314 is calculated for strobe pixel 312 by intensity function 340. Similarly, ambient intensity 324 is calculated by intensity function 340 for ambient pixel 322. In one embodiment, intensity function 340 implements Equation 1, where Cr, Cg, Cb are contribution constants and Red, Green, and Blue represent color intensity values for an associated pixel:

$$\text{Intensity} = Cr * \text{Red} + Cg * \text{Green} + Cb * \text{Blue} \quad \text{(Eq. 1)}$$

A sum of the contribution constants should be equal to a maximum range value for Intensity. For example, if Intensity is defined to range from 0.0 to 1.0, then Cr+Cg+Cb=1.0. In one embodiment Cr=Cg=Cb=1/3.

Blend value function 342 receives strobe intensity 314 and ambient intensity 324 and generates a blend value 344. Blend value function 342 is described in greater detail in FIGS. 3B and 3C. In one embodiment, blend value 344 controls a linear mix operation 346 between strobe pixel 312 and ambient pixel 322 to generate blended pixel 332. Linear mix operation 346 receives Red, Green, and Blue values for strobe pixel 312 and ambient pixel 322. Linear mix operation 346 receives blend value 344, which determines how much strobe pixel 312 versus how much ambient pixel 322 will be represented in blended pixel 332. In one embodiment, linear mix operation 346 is defined by equation 2, where Out corresponds to blended pixel 332, Blend corresponds to blend value 344, "A" corresponds to a color vector comprising ambient pixel 322, and "B" corresponds to a color vector comprising strobe pixel 312.

$$\text{Out} = (\text{Blend} * B) + (1.0 - \text{Blend}) * A \quad \text{(Eq. 2)}$$

When blend value 344 is equal to 1.0, blended pixel 332 is entirely determined by strobe pixel 312. When blend value 344 is equal to 0.0, blended pixel 332 is entirely determined by ambient pixel 322. When blend value 344 is equal to 0.5, blended pixel 332 represents a per component average between strobe pixel 312 and ambient pixel 322.

Figure 3C:
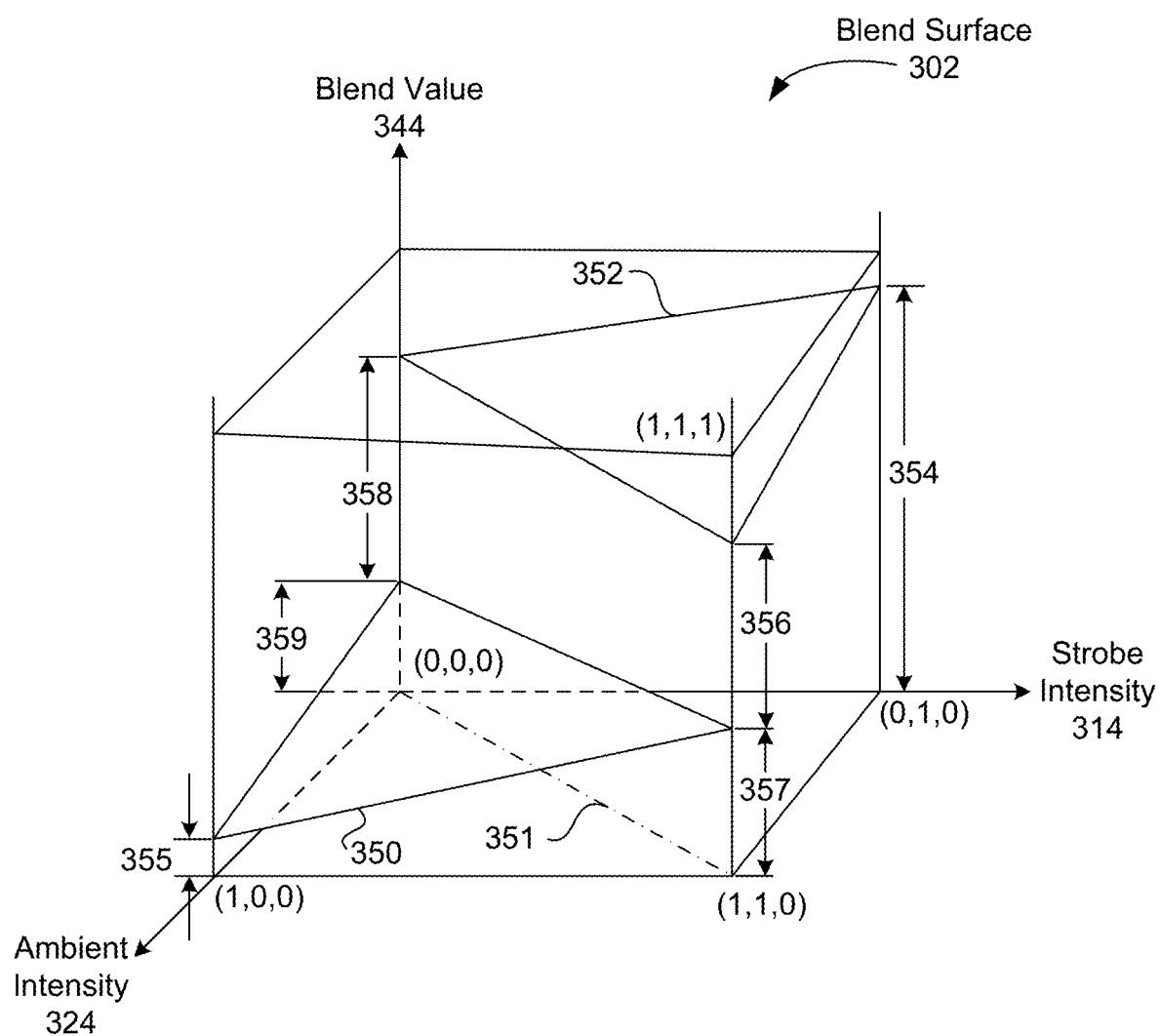
FIG. 3C illustrates a blend surface for blending two pixels, according to one embodiment of the present invention.

FIG. 3C illustrates a blend surface 302 for blending two pixels, according to one embodiment of the present invention. In one embodiment, blend surface 302 defines blend value function 342 of FIG. 3B. Blend surface 302 comprises a strobe dominant region 352 and an ambient dominant region 350 within a coordinate system defined by an axis for each of ambient intensity 324, strobe intensity 314, and blend value 344. Blend surface 302 is defined within a volume where ambient intensity 324, strobe intensity 314, and blend value 344 may range from 0.0 to 1.0. Persons skilled in the art will recognize that a range of 0.0 to 1.0 is arbitrary and other numeric ranges may be implemented without departing the scope and spirit of the present invention.

When ambient intensity 324 is larger than strobe intensity 314, blend value 344 may be defined by ambient dominant region 350. Otherwise, when strobe intensity 314 is larger than ambient intensity 324, blend value 344 may be defined by strobe dominant region 352. Diagonal 351 delineates a boundary between ambient dominant region 350 and strobe dominant region 352, where ambient intensity 324 is equal to strobe intensity 314. As shown, a discontinuity of blend value 344 in blend surface 302 is implemented along diagonal 351, separating ambient dominant region 350 and strobe dominant region 352.

For simplicity, a particular blend value 344 for blend surface 302 will be described herein as having a height above a plane that intersects three points including points at (1,0,0), (0,1,0), and the origin (0,0,0). In one embodiment, ambient dominant region 350 has a height 359 at the origin and strobe dominant region 352 has a height 358 above height 359. Similarly, ambient dominant region 350 has a height 357 above the plane at location (1,1), and strobe dominant region 352 has a height 356 above height 357 at location (1,1). Ambient dominant region 350 has a height 355 at location (1,0) and strobe dominant region 352 has a height of 354 at location (0,1).

In one embodiment, height 355 is greater than 0.0, and height 354 is less than 1.0. Furthermore, height 357 and height 359 are greater than 0.0 and height 356 and height 358 are each greater than 0.25. In certain embodiments, height 355 is not equal to height 359 or height 357. Furthermore, height 354 is not equal to the sum of height 356 and height 357, nor is height 354 equal to the sum of height 358 and height 359.

The height of a particular point within blend surface 302 defines blend value 344, which then determines how much strobe pixel 312 and ambient pixel 322 each contribute to blended pixel 332. For example, at location (0,1), where ambient intensity is 0.0 and strobe intensity is 1.0, the height of blend surface 302 is given as height 354, which sets blend value 344 to a value for height 354. This value is used as blend value 344 in mix operation 346 to mix strobe pixel 312 and ambient pixel 322. At (0,1), strobe pixel 312 dominates the value of blended pixel 332, with a remaining, small portion of blended pixel 322 contributed by ambient pixel 322. Similarly, at (1,0), ambient pixel 322 dominates the value of blended pixel 332, with a remaining, small portion of blended pixel 322 contributed by strobe pixel 312.

Figure 3D:
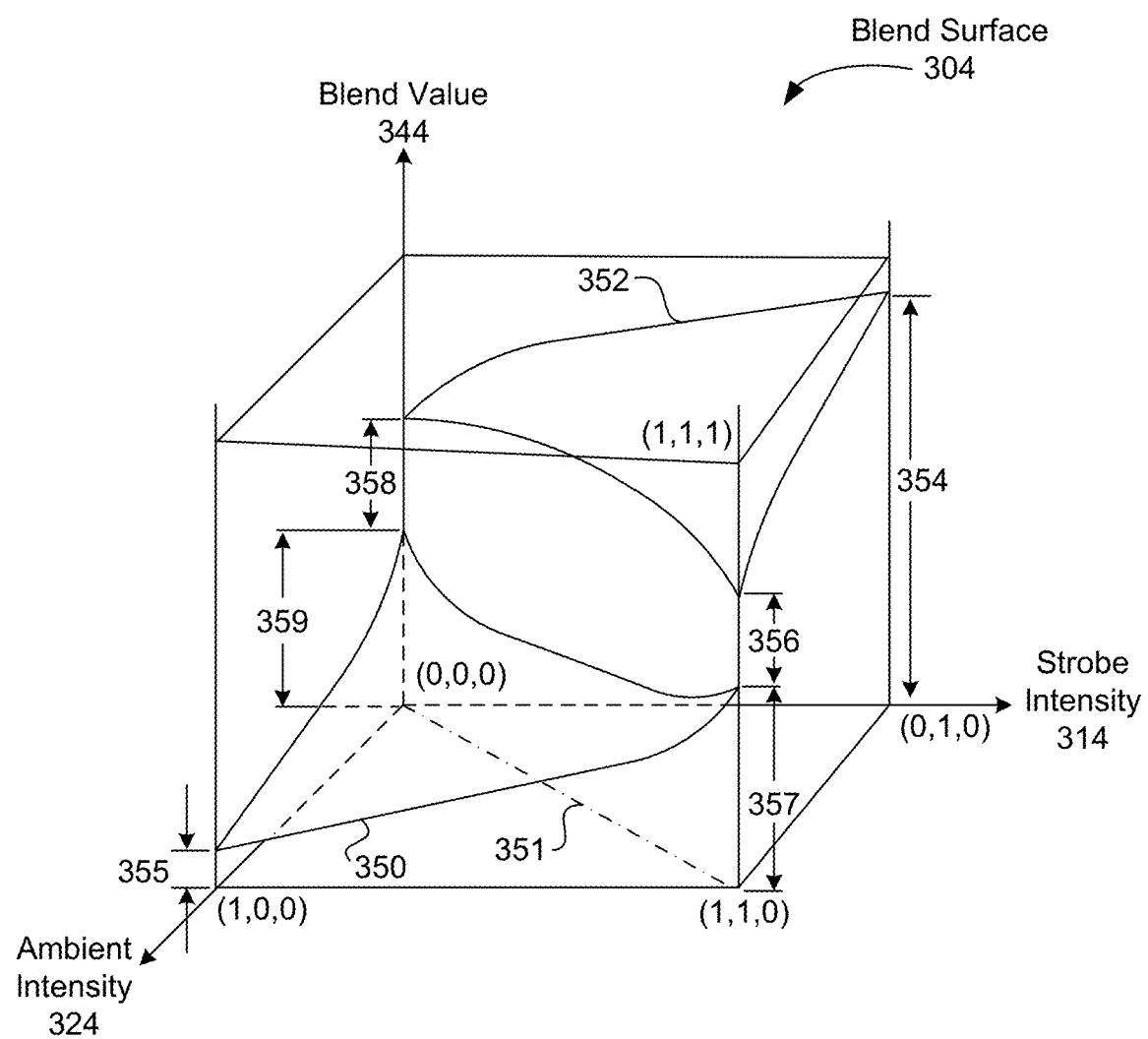
FIG. 3D illustrates a blend surface for blending two pixels, according to another embodiment of the present invention.

[woo] Ambient dominant region 350 and strobe dominant region 352 are illustrated herein as being planar sections for simplicity. However, as shown in FIG. 3D, certain curvature may be added, for example, to provide smoother transitions, such as along at least portions of diagonal 351, where strobe pixel 312 and ambient pixel 322 have similar intensity. A gradient, such as a table top or a wall in a given scene, may include a number of pixels that cluster along diagonal 351. These pixels may look more natural if the height difference between ambient dominant region 350 and strobe dominant region 352 along diagonal 351 is reduced compared to a planar section. A discontinuity along diagonal 351 is generally needed to distinguish pixels that should be strobe dominant versus pixels that should be ambient dominant. A given quantization of strobe intensity 314 and ambient intensity 324 may require a certain bias along diagonal 351, so that either ambient dominant region 350 or strobe dominant region 352 comprises a larger area within the plane than the other.

FIG. 3D illustrates a blend surface 304 for blending two pixels, according to another embodiment of the present invention. Blend surface 304 comprises a strobe dominant region 352 and an ambient dominant region 350 within a coordinate system defined by an axis for each of ambient intensity 324, strobe intensity 314, and blend value 344. Blend surface 304 is defined within a volume substantially identical to blend surface 302 of FIG. 3E.

As shown, upward curvature at the origin (0,0) and at (1,1) is added to ambient dominant region 350, and downward curvature at (0,0) and (1,1) is added to strobe dominant region 352. As a consequence, a smoother transition may be observed within blended image 280 for very bright and very dark regions, where color may be less stable and may diverge between strobe image 310 and ambient image 320. Upward curvature may be added to ambient dominant region 350 along diagonal 351 and corresponding downward curvature may be added to strobe dominant region 352 along diagonal 351.

In certain embodiments, downward curvature may be added to ambient dominant region 350 at (1,0), or along a portion of the axis for ambient intensity 324. Such downward curvature may have the effect of shifting the weight of mix operation 346 to favor ambient pixel 322 when a corresponding strobe pixel 312 has very low intensity.

In one embodiment, a blend surface, such as blend surface 302 or blend surface 304, is pre-computed and stored as a texture map that is established as an input to a fragment shader configured to implement blend operation 270. A surface function that describes a blend surface having an ambient dominant region 350 and a strobe dominant region 352 is implemented to generate and store the texture map. The surface function may be implemented on a CPU core 170 of FIG. 1A or a GPU core 172, or a combination thereof. The fragment shader executing on a GPU core may use the texture map as a lookup table implementation of blend value function 342. In alternative embodiments, the fragment shader implements the surface function and computes a blend value 344 as needed for each combination of a strobe intensity 314 and an ambient intensity 324. One exemplary surface function that may be used to compute a blend value 344 (blendValue) given an ambient intensity 324 (ambient) and a strobe intensity 314 (strobe) is illustrated below as pseudo-code in Table 1. A constant "e" is set to a value that is relatively small, such as a fraction of a quantization step for ambient or strobe intensity, to avoid dividing by zero. Height 355 corresponds to constant 0.125 divided by 3.0.

TABLE 1 fDivA = strobe/(ambient + e);
fDivB = (1.0 − ambient) / ((1.0 − strobe) + (1.0 − ambient) + e)
temp = (fDivA >= 1.0) ? 1.0 : 0.125;
blendValue = (temp + 2.0 * fDivB) / 3.0;

In certain embodiments, the blend surface is dynamically configured based on image properties associated with a given strobe image 310 and corresponding ambient image 320. Dynamic configuration of the blend surface may include, without limitation, altering one or more of heights 354 through 359, altering curvature associated with one or more of heights 354 through 359, altering curvature along diagonal 351 for ambient dominant region 350, altering curvature along diagonal 351 for strobe dominant region 352, or any combination thereof.

One embodiment of dynamic configuration of a blend surface involves adjusting heights associated with the surface discontinuity along diagonal 351. Certain images disproportionately include gradient regions having strobe pixels 312 and ambient pixels 322 of similar or identical intensity. Regions comprising such pixels may generally appear more natural as the surface discontinuity along diagonal 351 is reduced. Such images may be detected using a heat-map of ambient intensity 324 and strobe intensity 314 pairs within a surface defined by ambient intensity 324 and strobe intensity 314. Clustering along diagonal 351 within the heat-map indicates a large incidence of strobe pixels 312 and ambient pixels 322 having similar intensity within an associated scene. In one embodiment, clustering along diagonal 351 within the heat-map indicates that the blend surface should be dynamically configured to reduce the height of the discontinuity along diagonal 351. Reducing the height of the discontinuity along diagonal 351 may be implemented via adding downward curvature to strobe dominant region 352 along diagonal 351, adding upward curvature to ambient dominant region 350 along diagonal 351, reducing height 358, reducing height 356, or any combination thereof. Any technically feasible technique may be implemented to adjust curvature and height values without departing the scope and spirit of the present invention. Furthermore, any region of blend surface 302 may be dynamically adjusted in response to image characteristics without departing the scope of the present invention.

In one embodiment, dynamic configuration of the blend surface comprises mixing blend values from two or more pre-computed lookup tables implemented as texture maps. For example, a first blend surface may reflect a relatively large discontinuity and relatively large values for heights 356 and 358, while a second blend surface may reflect a relatively small discontinuity and relatively small values for height 356 and 358. Here, blend surface 304 may be dynamically configured as a weighted sum of blend values from the first blend surface and the second blend surface.

Weighting may be determined based on certain image characteristics, such as clustering of strobe intensity 314 and ambient intensity 324 pairs in certain regions within the surface defined by strobe intensity 314 and ambient intensity 324, or certain histogram attributes for strobe image 210 and ambient image 220. In one embodiment, dynamic configuration of one or more aspects of the blend surface, such as discontinuity height, may be adjusted according to direct user input, such as via a UI tool.

Figure 3E:
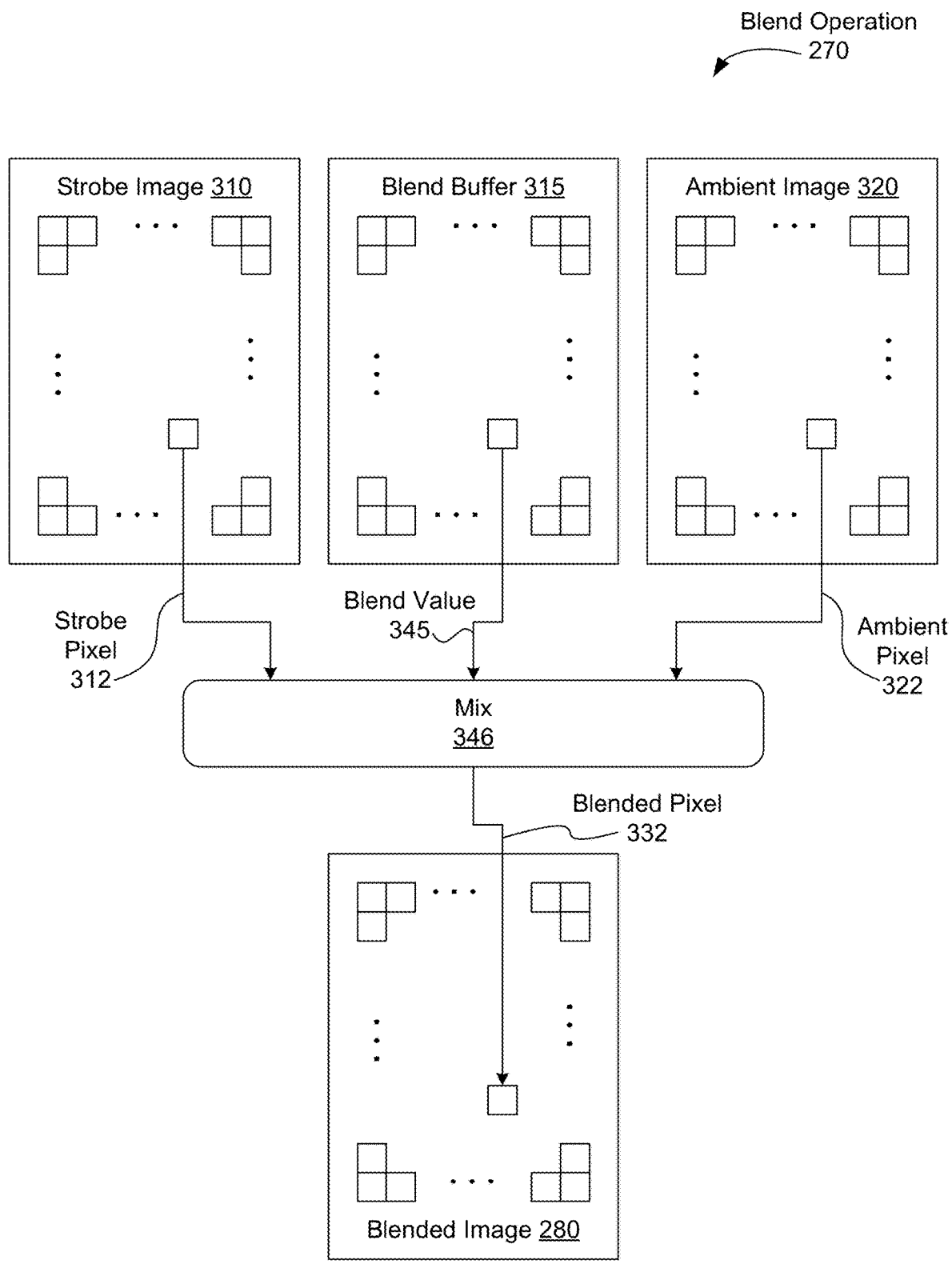
FIG. 3E illustrates an image blend operation for blending a strobe image with an ambient image to generate a blended image, according to one embodiment of the present invention.

FIG. 3E illustrates an image blend operation 270 for blending a strobe image with an ambient image to generate a blended image, according to one embodiment of the present invention. A strobe image 310 and an ambient image 320 of the same horizontal resolution and vertical resolution are combined via mix operation 346 to generate blended image 280 having the same resolution horizontal resolution and vertical resolution. In alternative embodiments, strobe image 310 or ambient image 320, or both images may be scaled to an arbitrary resolution defined by blended image 280 for processing by mix operation 346.

In certain settings, strobe image 310 and ambient image 320 include a region of pixels having similar intensity per pixel but different color per pixel. Differences in color may be attributed to differences in white balance for each image and different illumination contribution for each image. Because the intensity among adjacent pixels is similar, pixels within the region will cluster along diagonal 351 of FIGS. 3B and 3C, resulting in a distinctly unnatural speckling effect as adjacent pixels are weighted according to either strobe dominant region 352 or ambient dominant region 350. To soften this speckling effect and produce a natural appearance within these regions, blend values may be blurred, effectively reducing the discontinuity between strobe dominant region 352 and ambient dominant region 350. As is well-known in the art, blurring may be implemented by combining two or more individual samples.

In one embodiment, a blend buffer 315 comprises blend values 345, which are computed from a set of two or more blend samples. Each blend sample is computed according to blend function 330, described previously in conjunction with FIGS. 3B-3D. In one embodiment, blend buffer 315 is first populated with blend samples, computed according to blend function 330. The blend samples are then blurred to compute each blend value 345, which is stored to blend buffer 315. In other embodiments, a first blend buffer is populated with blend samples computed according to blend function 330, and two or more blend samples from the first blend buffer are blurred together to generate blend each value 345, which is stored in blend buffer 315. In yet other embodiments, two or more blend samples from the first blend buffer are blurred together to generate each blend value 345 as needed. In still another embodiment, two or more pairs of strobe pixels 312 and ambient pixels 322 are combined to generate each blend value 345 as needed. Therefore, in certain embodiments, blend buffer 315 comprises an allocated buffer in memory, while in other embodiments blend buffer 315 comprises an illustrative abstraction with no corresponding allocation in memory.

As shown, strobe pixel 312 and ambient pixel 322 are mixed based on blend value 345 to generate blended pixel 332, stored in blended image 280. Strobe pixel 312, ambient pixel 322, and blended pixel 332 are located in substantially identical locations in each respective image.

In one embodiment, strobe image 310 corresponds to strobe image 210 and ambient image 320 corresponds to ambient image 220. In other embodiments, strobe image 310 corresponds to aligned strobe image 232 and ambient image 320 corresponds to aligned ambient image 234. In one embodiment, mix operation 346 is associated with a fragment shader, configured to execute within one or more GPU cores 172.

Figure 4A:
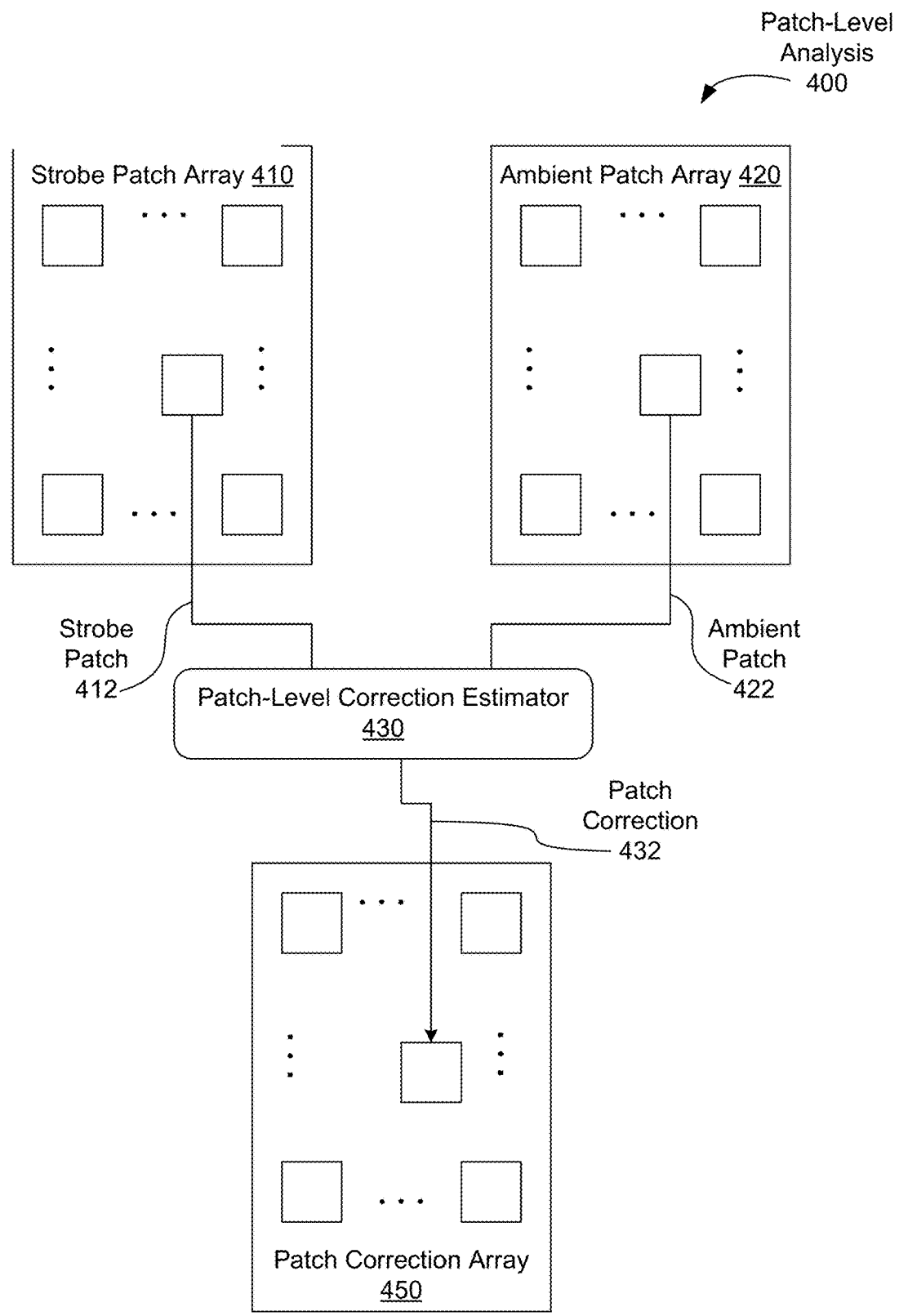
FIG. 4A illustrates a patch-level analysis process for generating a patch correction array, according to one embodiment of the present invention.
Figure 4B:
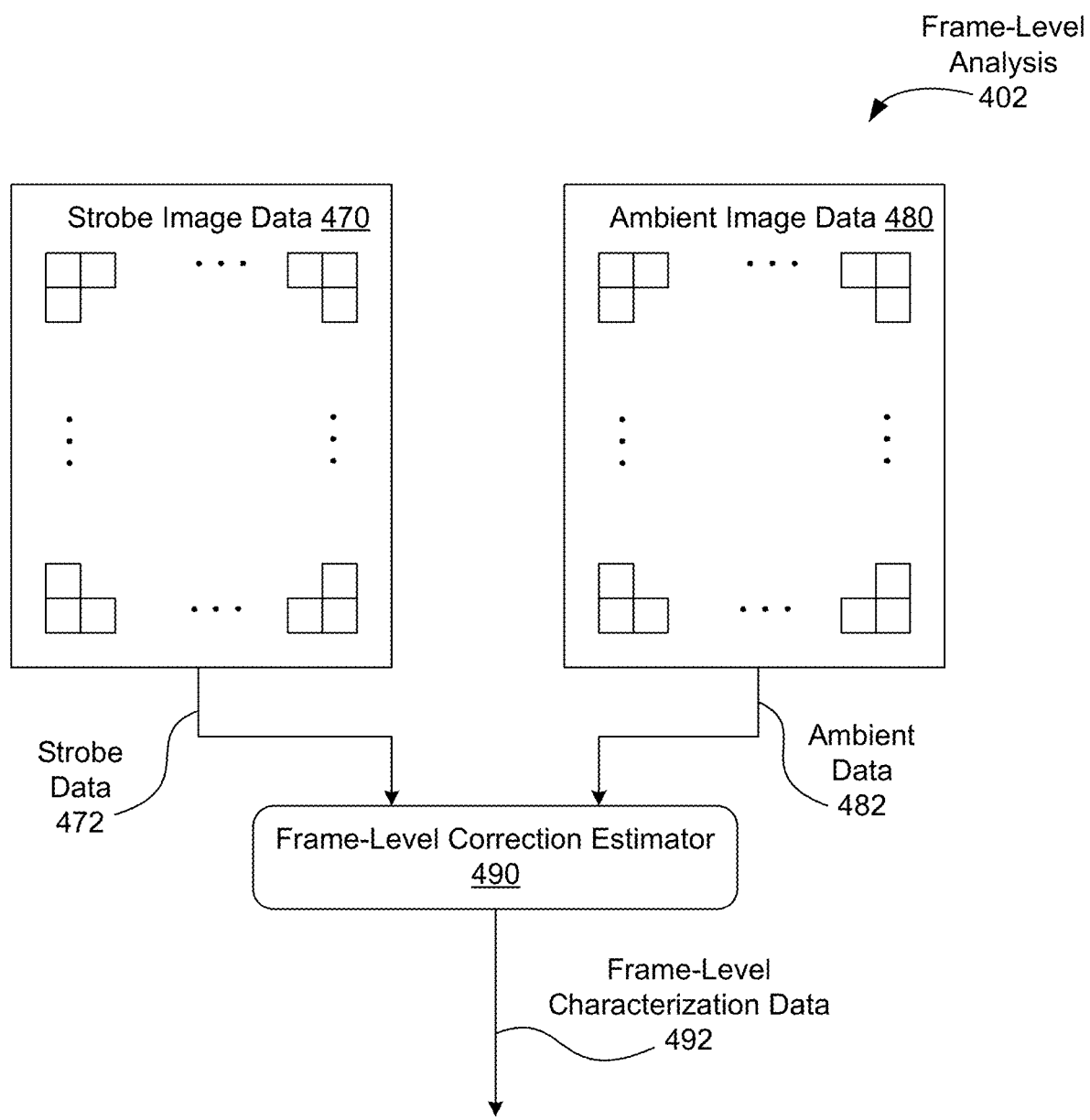
FIG. 4B illustrates a frame-level analysis process for generating frame-level characterization data, according to one embodiment of the present invention.
Figure 5A:
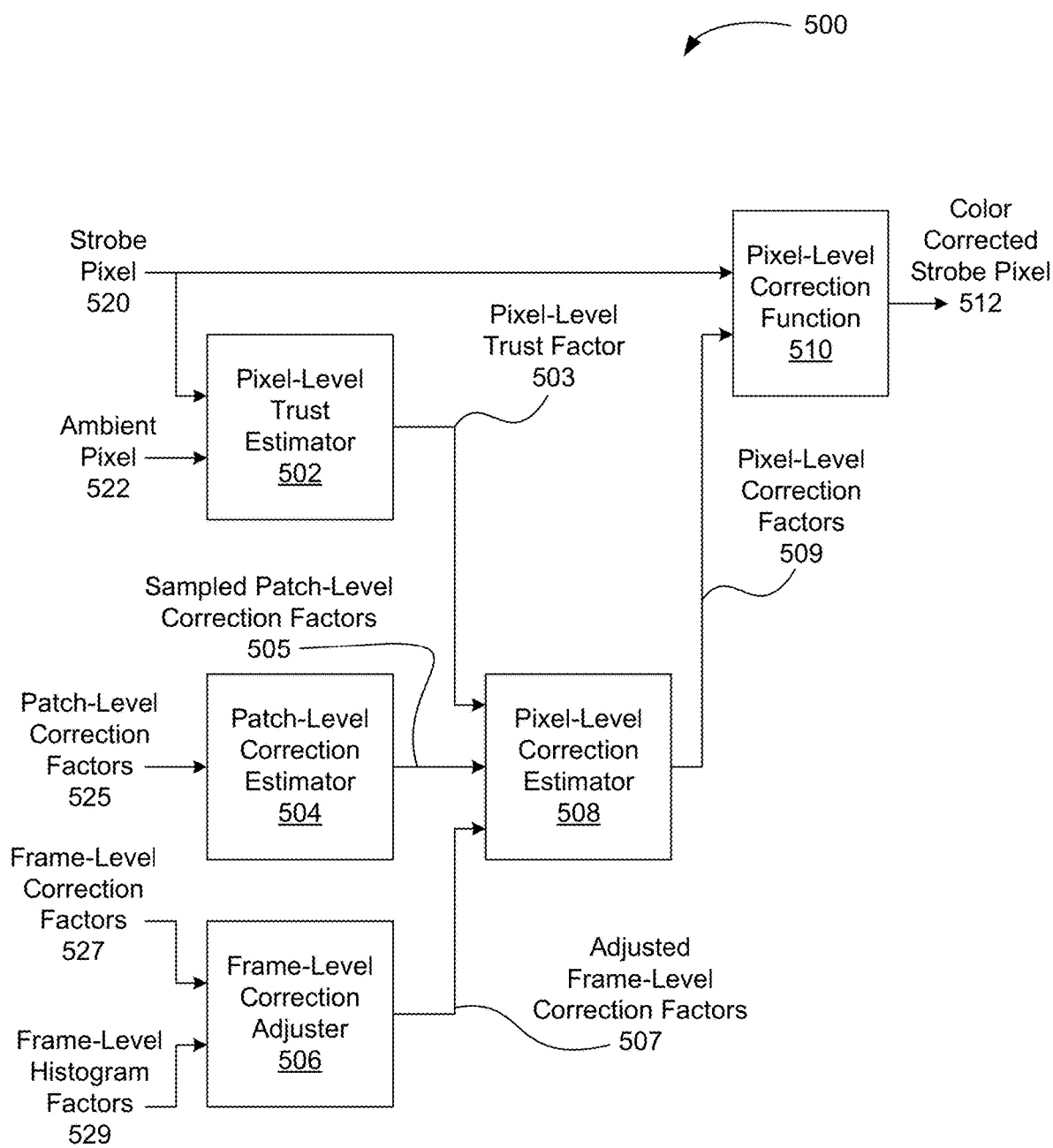
FIG. 5A illustrates a data flow process for correcting strobe pixel color, according to one embodiment of the present invention.
Figure 5B:
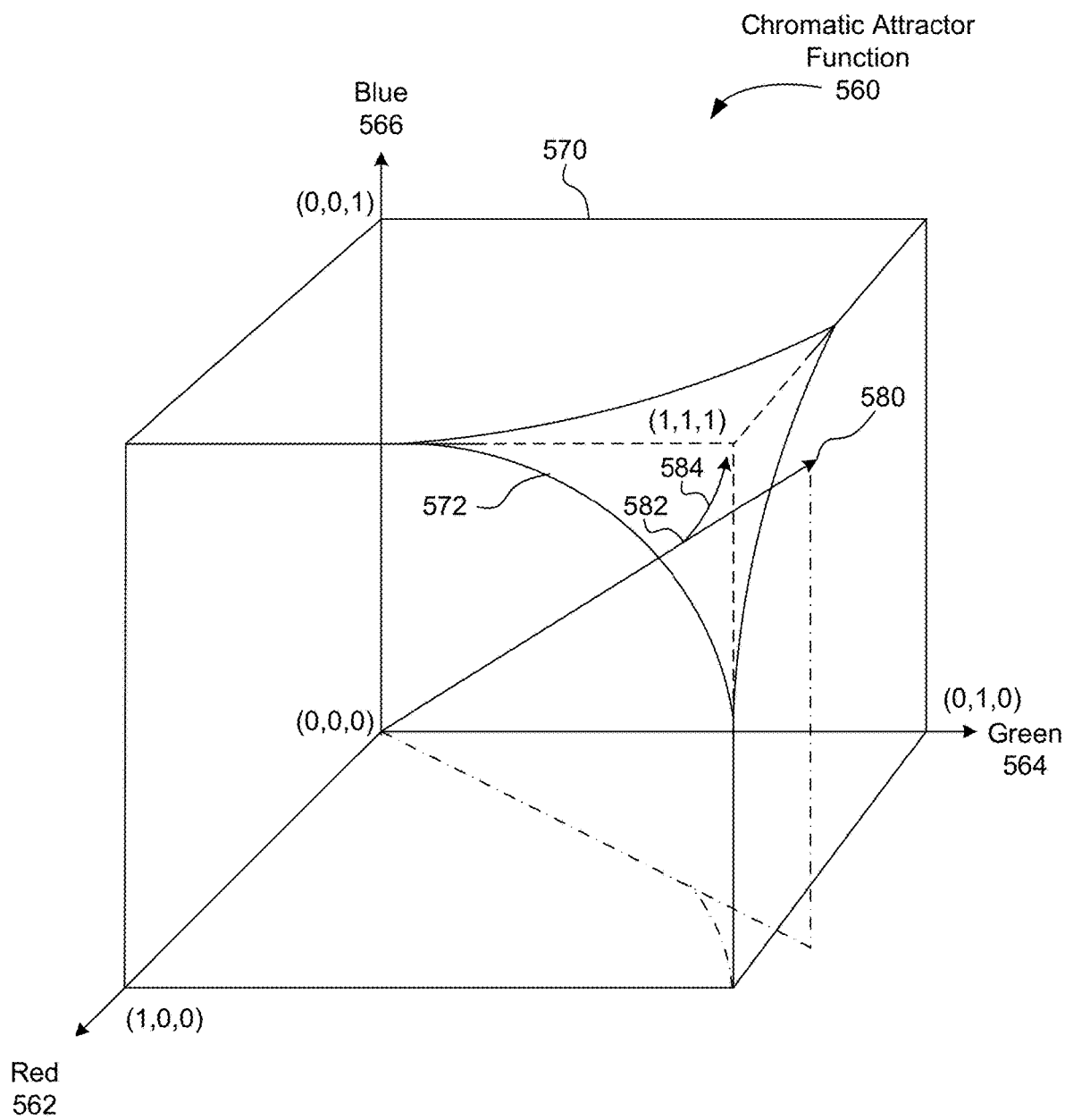
FIG. 5B illustrates a chromatic attractor function, according to one embodiment of the present invention.

As discussed previously in FIGS. 2B and 2D, strobe image 210 may need to be processed to correct color that is divergent from color in corresponding ambient image 220. Strobe image 210 may include frame-level divergence, spatially localized divergence, or a combination thereof. FIGS. 4A and 4B describe techniques implemented in frame analysis operation 240 for computing color correction data 242. In certain embodiments, color correction data 242 comprises frame-level characterization data for correcting overall color divergence, and patch-level correction data for correcting localized color divergence. FIGS. 5A and 5B discuss techniques for implementing color correction operation 250, based on color correction data 242.

FIG. 4A illustrates a patch-level analysis process 400 for generating a patch correction array 450, according to one embodiment of the present invention. Patch-level analysis provides local color correction information for correcting a region of a source strobe image to be consistent in overall color balance with an associated region of a source ambient image. A patch corresponds to a region of one or more pixels within an associated source image. A strobe patch 412 comprises representative color information for a region of one or more pixels within strobe patch array 410, and an associated ambient patch 422 comprises representative color information for a region of one or more pixels at a corresponding location within ambient patch array 420.

In one embodiment, strobe patch array 410 and ambient patch array 420 are processed on a per patch basis by patch-level correction estimator 430 to generate patch correction array 450. Strobe patch array 410 and ambient patch array 420 each comprise a two-dimensional array of patches, each having the same horizontal patch resolution and the same vertical patch resolution. In alternative embodiments, strobe patch array 410 and ambient patch array 420 may each have an arbitrary resolution and each may be sampled according to a horizontal and vertical resolution for patch correction array 450.

In one embodiment, patch data associated with strobe patch array 410 and ambient patch array 420 may be pre-computed and stored for substantially entire corresponding source images. Alternatively, patch data associated with strobe patch array 410 and ambient patch array 420 may be computed as needed, without allocating buffer space for strobe patch array 410 or ambient patch array 420.

In data flow process 202 of FIG. 2B, the source strobe image comprises strobe image 210, while in data flow process 206 of FIG. 2D, the source strobe image comprises aligned strobe image 232. Similarly, ambient patch array 420 comprises a set of patches generated from a source ambient image. In data flow process 202, the source ambient image comprises ambient image 220, while in data flow process 206, the source ambient image comprises aligned ambient image 234.

In one embodiment, representative color information for each patch within strobe patch array 410 is generated by averaging color for a four-by-four region of pixels from the source strobe image at a corresponding location, and representative color information for each patch within ambient patch array 420 is generated by averaging color for a four-by-four region of pixels from the ambient source image at a corresponding location. An average color may comprise red, green and blue components. Each four-by-four region may be non-overlapping or overlapping with respect to other four-by-four regions. In other embodiments, arbitrary regions may be implemented. Patch-level correction estimator 430 generates patch correction 432 from strobe patch 412 and a corresponding ambient patch 422. In certain embodiments, patch correction 432 is saved to patch correction array 450 at a corresponding location. In one embodiment, patch correction 432 includes correction factors for red, green, and blue, computed according to the pseudo-code of Table 2, below.

TABLE 2

```
ratio.r = (ambient.r) / (strobe.r);
ratio.g = (ambient.g) / (strobe.g);
ratio.b = (ambient.b) / (strobe.b);
maxRatio = max(ratio.r, max(ratio.g, ratio.b));
correct.r = (ratio.r / maxRatio);
correct.g = (ratio.g / maxRatio);
correct.b = (ratio.b / maxRatio);
```

Here, "strobe.r" refers to a red component for strobe patch 412, "strobe.g" refers to a green component for strobe patch 412, and "strobe.b" refers to a blue component for strobe patch 412. Similarly, "ambient.r," "ambient.g," and "ambient.b" refer respectively to red, green, and blue components of ambient patch 422. A maximum ratio of ambient to strobe components is computed as "maxRatio," which is then used to generate correction factors, including "correct.r" for a red channel, "correct.g" for a green channel, and "correct.b" for a blue channel. Correction factors correct.r, correct.g, and correct.b together comprise patch correction 432. These correction factors, when applied fully in color correction operation 250, cause pixels associated with strobe patch 412 to be corrected to reflect a color balance that is generally consistent with ambient patch 422.

In one alternative embodiment, each patch correction 432 comprises a slope and an offset factor for each one of at least red, green, and blue components. Here, components of source ambient image pixels bounded by a patch are treated as function input values and corresponding components of source strobe image pixels are treated as function outputs for a curve fitting procedure that estimates slope and offset parameters for the function. For example, red components of source ambient image pixels associated with a given patch may be treated as "X" values and corresponding red pixel components of source strobe image pixels may be treated as "Y" values, to form (X,Y) points that may be processed according to a least-squares linear fit procedure, thereby generating a slope parameter and an offset parameter for the red component of the patch. Slope and offset parameters for green and blue components may be computed similarly. Slope and offset parameters for a component describe a line equation for the component. Each patch correction 432 includes slope and offset parameters for at least red, green, and blue components. Conceptually, pixels within an associated strobe patch may be color corrected by evaluating line equations for red, green, and blue components.

In a different alternative embodiment, each patch correction 432 comprises three parameters describing a quadratic function for each one of at least red, green, and blue components. Here, components of source strobe image pixels bounded by a patch are fit against corresponding components of source ambient image pixels to generate quadratic parameters for color correction. Conceptually, pixels within an associated strobe patch may be color corrected by evaluating quadratic equations for red, green, and blue components.

FIG. 4B illustrates a frame-level analysis process 402 for generating frame-level characterization data 492, according to one embodiment of the present invention. Frame-level correction estimator 490 reads strobe data 472 comprising pixels from strobe image data 470 and ambient data 482 comprising pixels from ambient image data 480 to generate frame-level characterization data 492.

In certain embodiments, strobe data 472 comprises pixels from strobe image 210 of FIG. 2A and ambient data 482 comprises pixels from ambient image 220. In other embodiments, strobe data 472 comprises pixels from aligned strobe image 232 of FIG. 2C, and ambient data 482 comprises pixels from aligned ambient image 234. In yet other embodiments, strobe data 472 comprises patches representing average color from strobe patch array 410, and ambient data 482 comprises patches representing average color from ambient patch array 420.

In one embodiment, frame-level characterization data 492 includes at least frame-level color correction factors for red correction, green correction, and blue correction. Frame-level color correction factors may be computed according to the pseudo-code of Table 3.

TABLE 3

```
ratioSum.r = (ambientSum.r) / (strobeSum.r);
ratioSum.g = (ambientSum.g) / (strobeSum.g);
ratioSum.b = (ambientSum.b) / (strobeSum.b);
maxSumRatio = max(ratioSum.r, max(ratioSum.g, ratioSum.b));
correctFrame.r = (ratioSum.r / maxSumRatio);
correctFrame.g = (ratioSum.g / maxSumRatio);
correctFrame.b = (ratioSum.b / maxSumRatio);
```

Here, "strobeSum.r" refers to a sum of red components taken over strobe image data 470, "strobeSum.g" refers to a sum of green components taken over strobe image data 470, and "strobeSum.b" refers to a sum of blue components taken over strobe image data 470. Similarly, "ambientSum.r," "ambientSum.g," and "ambientSum.b" each refer to a sum of components taken over ambient image data 480 for respective red, green, and blue components. A maximum ratio of ambient to strobe sums is computed as "maxSumRatio," which is then used to generate frame-level color correction factors, including "correctFrame.r" for a red channel, "correctFrame.g" for a green channel, and "correctFrame.b" for a blue channel. These frame-level color correction factors, when applied fully and exclusively in color correction operation 250, cause overall color balance of strobe image 210 to be corrected to reflect a color balance that is generally consistent with that of ambient image 220.

While overall color balance for strobe image 210 may be corrected to reflect overall color balance of ambient image 220, a resulting color corrected rendering of strobe image 210 based only on frame-level color correction factors may not have a natural appearance and will likely include local regions with divergent color with respect to ambient image 220. Therefore, as described below in FIG. 5A, patch-level correction may be used in conjunction with frame-level correction to generate a color corrected strobe image.

In one embodiment, frame-level characterization data 492 also includes at least a histogram characterization of strobe image data 470 and a histogram characterization of ambient image data 480. Histogram characterization may include identifying a low threshold intensity associated with a certain low percentile of pixels, a median threshold intensity associated with a fiftieth percentile of pixels, and a high threshold intensity associated with a high threshold percentile of pixels. In one embodiment, the low threshold intensity is associated with an approximately fifteenth percentile of pixels and a high threshold intensity is associated with an approximately eighty-fifth percentile of pixels, so that approximately fifteen percent of pixels within an associated image have a lower intensity than a calculated low threshold intensity and approximately eighty-five percent of pixels have a lower intensity than a calculated high threshold intensity.

In certain embodiments, frame-level characterization data 492 also includes at least a heat-map, described previously. The heat-map may be computed using individual pixels or patches representing regions of pixels. In one embodiment, the heat-map is normalized using a logarithm operator, configured to normalize a particular heat-map location against a logarithm of a total number of points contributing to the heat-map. Alternatively, frame-level characterization data 492 includes a factor that summarizes at least one characteristic of the heat-map, such as a diagonal clustering factor to quantify clustering along diagonal 351 of FIGS. 3C and 3D. This diagonal clustering factor may be used to dynamically configure a given blend surface.

While frame-level and patch-level correction coefficients have been discussed representing two different spatial extents, persons skilled in the art will recognize that more than two levels of spatial extent may be implemented without departing the scope and spirit of the present invention.

FIG. 5A illustrates a data flow process 500 for correcting strobe pixel color, according to one embodiment of the present invention. A strobe pixel 520 is processed to generate a color corrected strobe pixel 512. In one embodiment, strobe pixel 520 comprises a pixel associated with strobe image 210 of FIG. 2B, ambient pixel 522 comprises a pixel associated with ambient image 220, and color corrected strobe pixel 512 comprises a pixel associated with corrected strobe image data 252. In an alternative embodiment, strobe pixel 520 comprises a pixel associated with aligned strobe image 232 of FIG. 2D, ambient pixel 522 comprises a pixel associated with aligned ambient image 234, and color corrected strobe pixel 512 comprises a pixel associated with corrected strobe image data 252. Color corrected strobe pixel 512 may correspond to strobe pixel 312 in FIG. 3A, and serve as an input to blend function 330.

In one embodiment, patch-level correction factors 525 comprise one or more sets of correction factors for red, green, and blue associated with patch correction 432 of FIG. 4A, frame-level correction factors 527 comprise frame-level correction factors for red, green, and blue associated with frame-level characterization data 492 of FIG. 4B, and frame-level histogram factors 529 comprise at least a low threshold intensity and a median threshold intensity for both an ambient histogram and a strobe histogram associated with frame-level characterization data 492.

A pixel-level trust estimator 502 computes a pixel-level trust factor 503 from strobe pixel 520 and ambient pixel 522. In one embodiment, pixel-level trust factor 503 is computed according to the pseudo-code of Table 4, where strobe pixel 520 corresponds to strobePixel, ambient pixel 522 corresponds to ambientPixel, and pixel-level trust factor 503 corresponds to pixelTrust. Here, ambientPixel and strobePixel may comprise a vector variable, such as a well-known vec3 or vec4 vector variable.

TABLE 4

```
ambientIntensity = intensity (ambientPixel);
strobeIntensity = intensity (strobePixel);
stepInput = ambientIntensity * strobeIntensity;
pixelTrust = smoothstep (lowEdge, highEdge, stepInput);
```

Here, an intensity function may implement Equation 1 to compute ambientIntensity and strobeIntensity, corresponding respectively to an intensity value for ambientPixel and an intensity value for strobePixel. While the same intensity function is shown computing both ambientIntensity and strobeIntensity, certain embodiments may compute each intensity value using a different intensity function. A product operator may be used to compute stepInput, based on ambientIntensity and strobeIntensity. The well-known smoothstep function implements a relatively smoothly transition from 0.0 to 1.0 as stepInput passes through lowEdge and then through highEdge. In one embodiment, lowEdge=0.25 and highEdge=0.66.

A patch-level correction estimator 504 computes patch-level correction factors 505 by sampling patch-level correction factors 525. In one embodiment, patch-level correction estimator 504 implements bilinear sampling over four sets of patch-level color correction samples to generate sampled patch-level correction factors 505. In an alternative embodiment, patch-level correction estimator 504 implements distance weighted sampling over four or more sets of patch-level color correction samples to generate sampled patch-level correction factors 505. In another alternative embodiment, a set of sampled patch-level correction factors 505 is computed using pixels within a region centered about strobe pixel 520. Persons skilled in the art will recognize that any technically feasible technique for sampling one or more patch-level correction factors to generate sampled patch-level correction factors 505 is within the scope and spirit of the present invention.

In one embodiment, each one of patch-level correction factors 525 comprises a red, green, and blue color channel correction factor. In a different embodiment, each one of the patch-level correction factors 525 comprises a set of line equation parameters for red, green, and blue color channels. Each set of line equation parameters may include a slope and an offset. In another embodiment, each one of the patch-level correction factors 525 comprises a set of quadratic curve parameters for red, green, and blue color channels. Each set of quadratic curve parameters may include a square term coefficient, a linear term coefficient, and a constant.

In one embodiment, frame-level correction adjustor 506 computes adjusted frame-level correction factors 507 from the frame-level correction factors for red, green, and blue according to the pseudo-code of Table 5. Here, a mix operator may function according to Equation 2, where variable A corresponds to 1.0, variable B corresponds to a correctFrame color value, and frameTrust may be computed according to an embodiment described below in conjunction with the pseudo-code of Table 6. As discussed previously, correctFrame comprises frame-level correction factors. Parameter frameTrust quantifies how trustworthy a particular pair of ambient image and strobe image may be for performing frame-level color correction.

TABLE 5

```
adjCorrectFrame.r = mix(1.0, correctFrame.r, frameTrust);
adjCorrectFrame.g = mix(1.0, correctFrame.g, frameTrust);
adjCorrectFrame.b = mix(1.0, correctFrame.b, frameTrust);
```

When frameTrust approaches zero (correction factors not trustworthy), the adjusted frame-level correction factors 507 converge to 1.0, which yields no frame-level color correction. When frameTrust is 1.0 (completely trustworthy), the adjusted frame-level correction factors 507 converge to values calculated previously in Table 3. The pseudo-code of Table 6 illustrates one technique for calculating frameTrust.

TABLE 6 strobeExp = (WSL*SL + WSM*SM + WSH*SH) / (WSL + WSM + WSH);
ambientExp = (WAL*SL + WAM*SM + WAH*SH) / (WAL + WAM + WAH);
frameTrustStrobe = smoothstep (SLE, SHE, strobeExp);
frameTrustAmbient = smoothstep (ALE, AHE, ambientExp);
frameTrust = frameTrustStrobe * frameTrustAmbient;

Here, strobe exposure (strobeExp) and ambient exposure (ambientExp) are each characterized as a weighted sum of corresponding low threshold intensity, median threshold intensity, and high threshold intensity values. Constants WSL, WSM, and WSH correspond to strobe histogram contribution weights for low threshold intensity, median threshold intensity, and high threshold intensity values, respectively. Variables SL, SM, and SH correspond to strobe histogram low threshold intensity, median threshold intensity, and high threshold intensity values, respectively. Similarly, constants WAL, WAM, and WAH correspond to ambient histogram contribution weights for low threshold intensity, median threshold intensity, and high threshold intensity values, respectively; and variables AL, AM, and AH correspond to ambient histogram low threshold intensity, median threshold intensity, and high threshold intensity values, respectively. A strobe frame-level trust value (frameTrustStrobe) is computed for a strobe frame associated with strobe pixel 520 to reflect how trustworthy the strobe frame is for the purpose of frame-level color correction. In one embodiment, WSL=WAL=1.0, WSM=WAM=2.0, and WSH=WAH=0.0. In other embodiments, different weights may be applied, for example, to customize the techniques taught herein to a particular camera apparatus. In certain embodiments, other percentile thresholds may be measured, and different combinations of weighted sums may be used to compute frame-level trust values.

In one embodiment, a smoothstep function with a strobe low edge (SLE) and strobe high edge (SHE) is evaluated based on strobeExp. Similarly, a smoothstep function with ambient low edge (ALE) and ambient high edge (AHE) is evaluated to compute an ambient frame-level trust value (frameTrustAmbient) for an ambient frame associated with ambient pixel 522 to reflect how trustworthy the ambient frame is for the purpose of frame-level color correction. In one embodiment, SLE=ALE=0.15, and SHE=AHE=0.30. In other embodiments, different low and high edge values may be used.

In one embodiment, a frame-level trust value (frameTrust) for frame-level color correction is computed as the product of frameTrustStrobe and frameTrustAmbient. When both the strobe frame and the ambient frame are sufficiently exposed and therefore trustworthy frame-level color references, as indicated by frameTrustStrobe and frameTrustAmbient, the product of frameTrustStrobe and frameTrustAmbient will reflect a high trust for frame-level color correction. If either the strobe frame or the ambient frame is inadequately exposed to be a trustworthy color reference, then a color correction based on a combination of strobe frame and ambient frame should not be trustworthy, as reflected by a low or zero value for frameTrust.

In an alternative embodiment, the frame-level trust value (frameTrust) is generated according to direct user input, such as via a UI color adjustment tool having a range of control positions that map to a frameTrust value. The UI color adjustment tool may generate a full range of frame-level trust values (0.0 to 1.0) or may generate a value constrained to a computed range. In certain settings, the mapping may be non-linear to provide a more natural user experience. In one embodiment, the control position also influences pixel-level trust factor 503 (pixelTrust), such as via a direct bias or a blended bias.

A pixel-level correction estimator 508 is configured to generate pixel-level correction factors 509 from sampled patch-level correction factors 505, adjusted frame-level correction factors 507, and pixel-level trust factor 503. In one embodiment, pixel-level correction estimator 508 comprises a mix function, whereby sampled patch-level correction factors 505 is given substantially full mix weight when pixel-level trust factor 503 is equal to 1.0 and adjusted frame-level correction factors 507 is given substantially full mix weight when pixel-level trust factor 503 is equal to 0.0. Pixel-level correction estimator 508 may be implemented according to the pseudo-code of Table 7.

TABLE 7 pixCorrection.r = mix(adjCorrectFrame.r, correct.r, pixelTrust);
pixCorrection.g= mix(adjCorrectFrame.g, correct.g, pixelTrust);
pixCorrection.b = mix(adjCorrectFrame.b, correct.b, pixelTrust);

In another embodiment, line equation parameters comprising slope and offset define sampled patch-level correction factors 505 and adjusted frame-level correction factors 507. These line equation parameters are mixed within pixel-level correction estimator 508 according to pixelTrust to yield pixel-level correction factors 509 comprising line equation parameters for red, green, and blue channels. In yet another embodiment, quadratic parameters define sampled patch-level correction factors 505 and adjusted frame-level correction factors 507. In one embodiment, the quadratic parameters are mixed within pixel-level correction estimator 508 according to pixelTrust to yield pixel-level correction factors 509 comprising quadratic parameters for red, green, and blue channels. In another embodiment, quadratic equations are evaluated separately for frame-level correction factors and patch level correction factors for each color channel, and the results of evaluating the quadratic equations are mixed according to pixelTrust.

In certain embodiments, pixelTrust is at least partially computed by image capture information, such as exposure time or exposure ISO index. For example, if an image was captured with a very long exposure at a very high ISO index, then the image may include significant chromatic noise and may not represent a good frame-level color reference for color correction.

Pixel-level correction function 510 generates color corrected strobe pixel 512 from strobe pixel 520 and pixel-level correction factors 509. In one embodiment, pixel-level correction factors 509 comprise correction factors pixCorrection.r, pixCorrection.g, and pixCorrection.b and color corrected strobe pixel 512 is computed according to the pseudo-code of Table 8.

TABLE 8

```
// scale red, green, blue
vec3 pixCorrection = (pixCorrection.r, pixCorrection.g, pixCorrection.b);
vec3 deNormCorrectedPixel = strobePixel * pixCorrection;
normalizeFactor = length(strobePixel) / length(deNormCorrectedPixel);
vec3 normCorrectedPixel = deNormCorrectedPixel * normalizeFactor;
vec3 correctedPixel = cAttractor(normCorrectedPixel);
```

Here, pixCorrection comprises a vector of three components (vec3) corresponding pixel-level correction factors pixCorrection.r, pixCorrection.g, and pixCorrection.b. A de-normalized, color corrected pixel is computed as deNormCorrectedPixel. A pixel comprising a red, green, and blue component defines a color vector in a three-dimensional space, the color vector having a particular length. The length of a color vector defined by deNormCorrectedPixel may be different with respect to a color vector defined by strobePixel. Altering the length of a color vector changes the intensity of a corresponding pixel. To maintain proper intensity for color corrected strobe pixel 512, deNormCorrectedPixel is re-normalized via normalizeFactor, which is computed as a ratio of length for a color vector defined by strobePixel to a length for a color vector defined by deNormCorrectedPixel. Color vector normCorrectedPixel includes pixel-level color correction and re-normalization to maintain proper pixel intensity. A length function may be performed using any technically feasible technique, such as calculating a square root of a sum of squares for individual vector component lengths.

A chromatic attractor function (cAttractor) gradually converges an input color vector to a target color vector as the input color vector increases in length. Below a threshold length, the chromatic attractor function returns the input color vector. Above the threshold length, the chromatic attractor function returns an output color vector that is increasingly convergent on the target color vector. The chromatic attractor function is described in greater detail below in FIG. 5B.

In alternative embodiments, pixel-level correction factors comprise a set of line equation parameters per color channel, with color components of strobePixel comprising function inputs for each line equation. In such embodiments, pixel-level correction function 510 evaluates the line equation parameters to generate color corrected strobe pixel 512. This evaluation process is illustrated in the pseudo-code of Table 9.

TABLE 9

```
// evaluate line equation based on strobePixel for red, green, blue
vec3 pixSlope = (pixSlope.r, pixSlope.g, pixSlope.b);
vec3 pixOffset = (pixOffset.r, pixOffset.g, pixOffset.b);
vec3 deNormCorrectedPixel = (strobePixel * pixSlope) + pixOffset;
normalizeFactor = length(strobePixel) / length(deNormCorrectedPixel);
vec3 normCorrectedPixel = deNormCorrectedPixel * normalizeFactor;
vec3 correctedPixel = cAttractor(normCorrectedPixel);
```

In other embodiments, pixel level correction factors comprise a set of quadratic parameters per color channel, with color components of strobePixel comprising function inputs for each quadratic equation. In such embodiments, pixel-level correction function 510 evaluates the quadratic equation parameters to generate color corrected strobe pixel 512.

In certain embodiments chromatic attractor function (cAttractor) implements a target color vector of white (1, 1, 1), and causes very bright pixels to converge to white, providing a natural appearance to bright portions of an image. In other embodiments, a target color vector is computed based on spatial color information, such as an average color for a region of pixels surrounding the strobe pixel. In still other embodiments, a target color vector is computed based on an average frame-level color. A threshold length associated with the chromatic attractor function may be defined as a constant, or, without limitation, by a user input, a characteristic of a strobe image or an ambient image or a combination thereof. In an alternative embodiment, pixel-level correction function 510 does not implement the chromatic attractor function.

In one embodiment, a trust level is computed for each patch-level correction and applied to generate an adjusted patch-level correction factor comprising sampled patch-level correction factors 505. Generating the adjusted patch-level correction may be performed according to the techniques taught herein for generating adjusted frame-level correction factors 507.

Other embodiments include two or more levels of spatial color correction for a strobe image based on an ambient image, where each level of spatial color correction may contribute a non-zero weight to a color corrected strobe image comprising one or more color corrected strobe pixels. Such embodiments may include patches of varying size comprising varying shapes of pixel regions without departing the scope of the present invention.

FIG. 5B illustrates a chromatic attractor function 560, according to one embodiment of the present invention. A color vector space is shown having a red axis 562, a green axis 564, and a blue axis 566. A unit cube 570 is bounded by an origin at coordinate (0, 0, 0) and an opposite corner at coordinate (1, 1, 1). A surface 572 having a threshold distance from the origin is defined within the unit cube. Color vectors having a length that is shorter than the threshold distance are conserved by the chromatic attractor function 560. Color vectors having a length that is longer than the threshold distance are converged towards a target color. For example, an input color vector 580 is defined along a particular path that describes the color of the input color vector 580, and a length that describes the intensity of the color vector. The distance from the origin to point 582 along input color vector 580 is equal to the threshold distance. In this example, the target color is pure white (1, 1, 1), therefore any additional length associated with input color vector 580 beyond point 582 follows path 584 towards the target color of pure white.

One implementation of chromatic attractor function 560, comprising the cAttractor function of Tables 8 and 9 is illustrated in the pseudo-code of Table 10.

TABLE 10

```
extraLength = max(length (inputColor), distMin) ;
mixValue= (extraLength – distMin) / (distMax– distMin);
outputColor = mix (inputColor, targetColor, mixValue);
```

Here, a length value associated with inputColor is compared to distMin, which represents the threshold distance. If the length value is less than distMin, then the "max" operator returns distMin. The mixValue term calculates a parameterization from 0.0 to 1.0 that corresponds to a length value ranging from the threshold distance to a maximum possible length for the color vector, given by the square root of 3.0. If extraLength is equal to distMin, then mixValue is set equal to 0.0 and outputColor is set equal to the input-Color by the mix operator. Otherwise, if the length value is greater than distMin, then mixValue represents the parameterization, enabling the mix operator to appropriately converge inputColor to targetColor as the length of inputColor approaches the square root of 3.0. In one embodiment, distMax is equal to the square root of 3.0 and distMin=1.45. In other embodiments different values may be used for distMax and distMin. For example, if distMin=1.0, then chromatic attractor 560 begins to converge to targetColor much sooner, and at lower intensities. If distMax is set to a larger number, then an inputPixel may only partially converge on targetColor, even when inputPixel has a very high intensity. Either of these two effects may be beneficial in certain applications.

While the pseudo-code of Table 10 specifies a length function, in other embodiments, computations may be performed in length-squared space using constant squared values with comparable results.

In one embodiment, targetColor is equal to (1,1,1), which represents pure white and is an appropriate color to "burn" to in overexposed regions of an image rather than a color dictated solely by color correction. In another embodiment, targetColor is set to a scene average color, which may be arbitrary. In yet another embodiment, targetColor is set to a color determined to be the color of an illumination source within a given scene.

Figure 6:
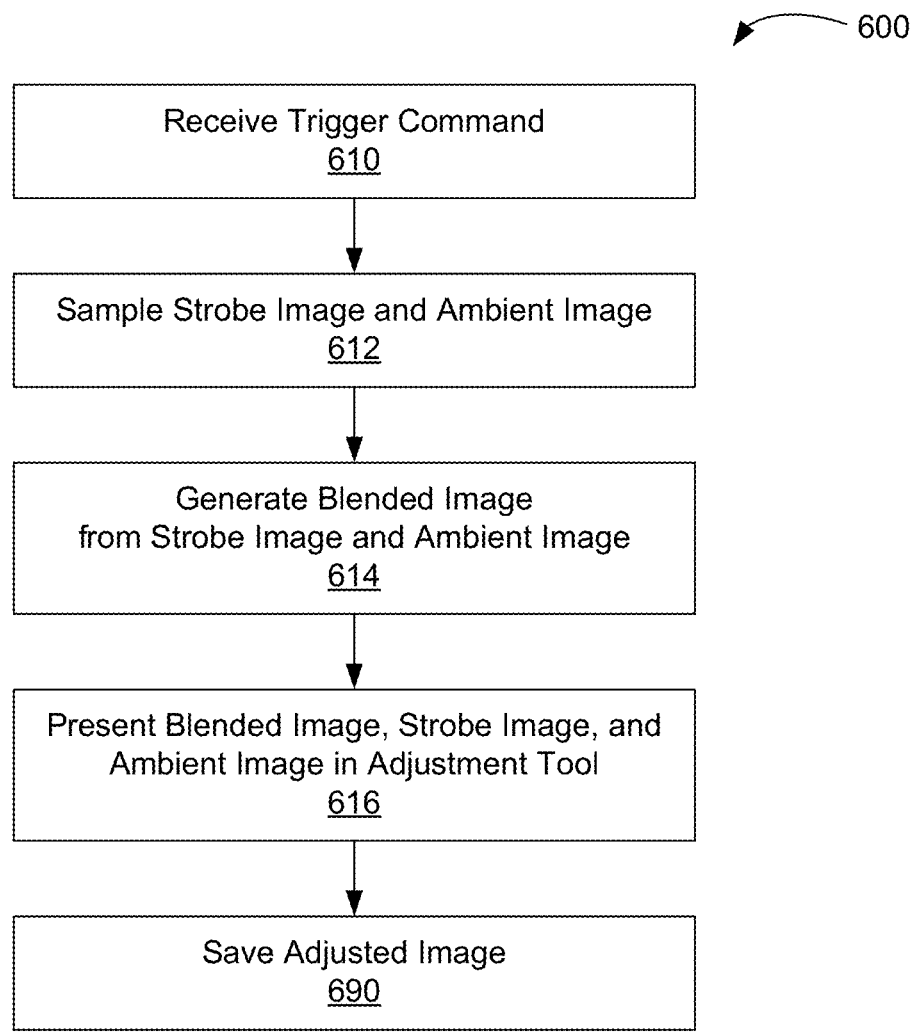
FIG. 6 is a flow diagram of method steps for generating an adjusted digital photograph, according to one embodiment of the present invention.

FIG. 6 is a flow diagram of a method 600 for generating an adjusted digital photograph, according to one embodiment of the present invention. Although the method steps are described in conjunction with the systems of FIGS. 1A-1D, persons skilled in the art will understand that any system configured to perform the method steps, in any order, is within the scope of the present invention.

Method 600 begins in step 610, where a digital photographic system, such as digital photographic system 100 of FIG. 1A, receives a trigger command to take (i.e., capture) a digital photograph. The trigger command may comprise a user input event, such as a button press, remote control command related to a button press, completion of a timer count down, an audio indication, or any other technically feasible user input event. In one embodiment, the digital photographic system implements digital camera 102 of FIG. 1C, and the trigger command is generated when shutter release button 115 is pressed. In another embodiment, the digital photographic system implements mobile device 104 of FIG. 1D, and the trigger command is generated when a UI button is pressed.

In step 612, the digital photographic system samples a strobe image and an ambient image. In one embodiment, the strobe image is taken before the ambient image. Alternatively, the ambient image is taken before the strobe image. In certain embodiments, a white balance operation is performed on the ambient image. Independently, a white balance operation may be performed on the strobe image. In other embodiments, such as in scenarios involving raw digital photographs, no white balance operation is applied to either the ambient image or the strobe image.

In step 614, the digital photographic system generates a blended image from the strobe image and the ambient image. In one embodiment, the digital photographic system generates the blended image according to data flow process 200 of FIG. 2A. In a second embodiment, the digital photographic system generates the blended image according to data flow process 202 of FIG. 2B. In a third embodiment, the digital photographic system generates the blended image according to data flow process 204 of FIG. 2C. In a fourth embodiment, the digital photographic system generates the blended image according to data flow process 206 of FIG. 2D. In each of these embodiments, the strobe image comprises strobe image 210, the ambient image comprises ambient image 220, and the blended image comprises blended image 280.

In step 616, the digital photographic system presents an adjustment tool configured to present at least the blended image, the strobe image, and the ambient image, according to a transparency blend among two or more of the images. The transparency blend may be controlled by a user interface slider. The adjustment tool may be configured to save a particular blend state of the images as an adjusted image. The adjustment tool is described in greater detail below in FIGS. 9 and 10.

The method terminates in step 690, where the digital photographic system saves at least the adjusted image.

Figure 7A:
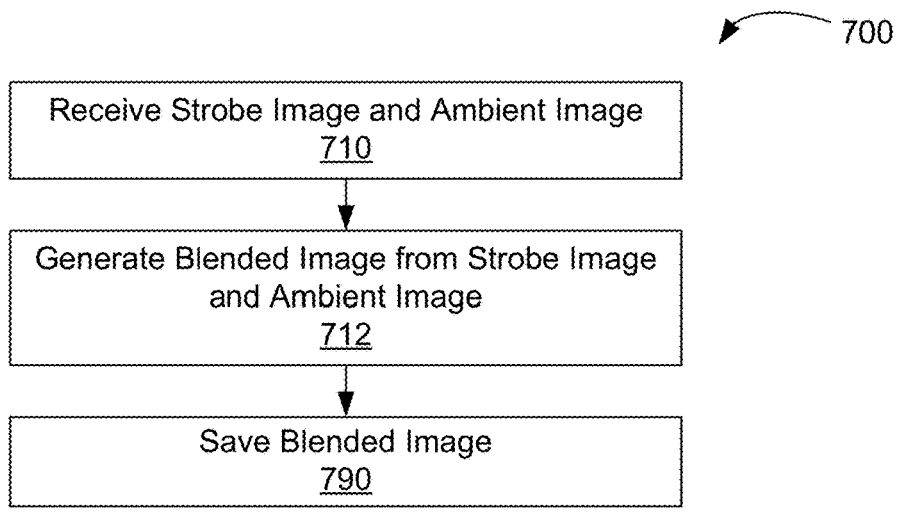
FIG. 7A is a flow diagram of method steps for blending a strobe image with an ambient image to generate a blended image, according to a first embodiment of the present invention.

FIG. 7A is a flow diagram of a method 700 for blending a strobe image with an ambient image to generate a blended image, according to a first embodiment of the present invention. Although the method steps are described in conjunction with the systems of FIGS. 1A-1D, persons skilled in the art will understand that any system configured to perform the method steps, in any order, is within the scope of the present invention. In one embodiment, method 700 implements data flow 200 of FIG. 2A. The strobe image and the ambient image each comprise at least one pixel and may each comprise an equal number of pixels.

The method begins in step 710, where a processor complex within a digital photographic system, such as processor complex 110 within digital photographic system 100 of FIG. 1A, receives a strobe image and an ambient image, such as strobe image 210 and ambient image 220, respectively. In step 712, the processor complex generates a blended image, such as blended image 280, by executing a blend operation 270 on the strobe image and the ambient image. The method terminates in step 790, where the processor complex saves the blended image, for example to NV memory 116, volatile memory 118, or memory system 162.

Figure 7B:
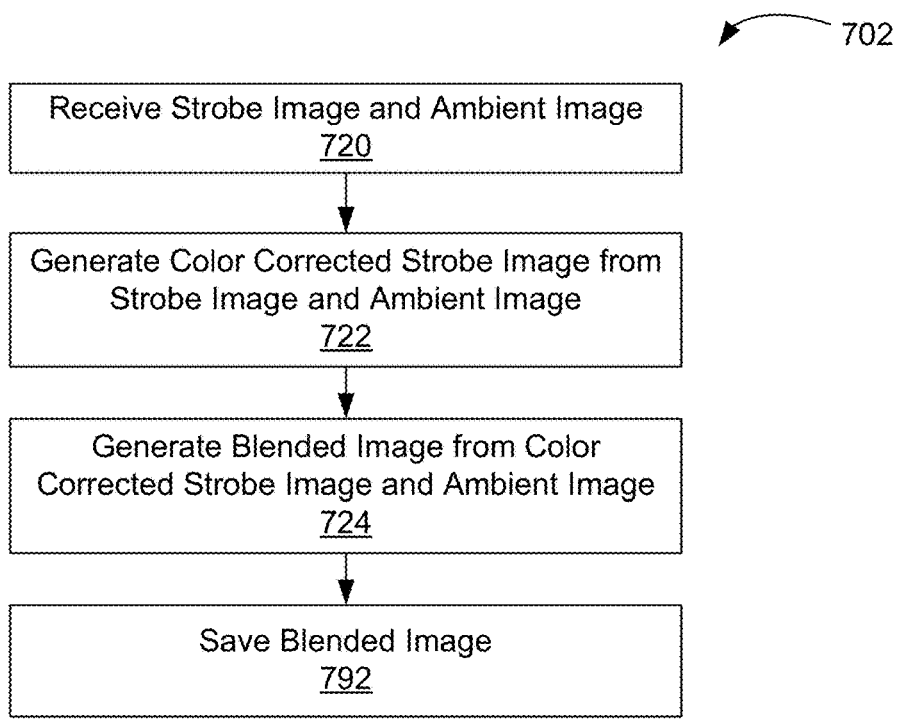
FIG. 7B is a flow diagram of method steps for blending a strobe image with an ambient image to generate a blended image, according to a second embodiment of the present invention.

FIG. 7B is a flow diagram of a method 702 for blending a strobe image with an ambient image to generate a blended image, according to a second embodiment of the present invention. Although the method steps are described in conjunction with the systems of FIGS. 1A-1D, persons skilled in the art will understand that any system configured to perform the method steps, in any order, is within the scope of the present invention. In one embodiment, method 702 implements data flow 202 of FIG. 2B. The strobe image and the ambient image each comprise at least one pixel and may each comprise an equal number of pixels.

The method begins in step 720, where a processor complex within a digital photographic system, such as processor complex 110 within digital photographic system 100 of FIG. 1A, receives a strobe image and an ambient image, such as strobe image 210 and ambient image 220, respectively. In step 722, the processor complex generates a color corrected strobe image, such as corrected strobe image data 252, by executing a frame analysis operation 240 on the strobe image and the ambient image and executing and a color correction operation 250 on the strobe image. In step 724, the processor complex generates a blended image, such as blended image 280, by executing a blend operation 270 on the color corrected strobe image and the ambient image. The method terminates in step 792, where the processor complex saves the blended image, for example to NV memory 116, volatile memory 118, or memory system 162.

Figure 8A:
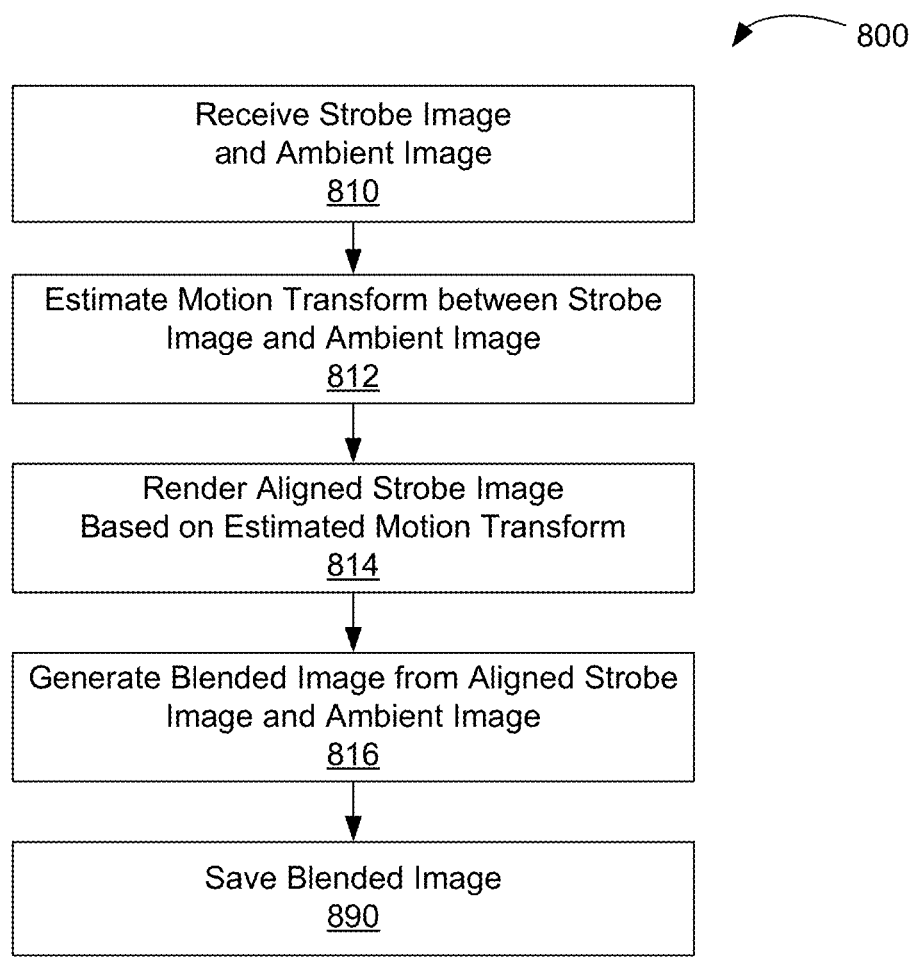
FIG. 8A is a flow diagram of method steps for blending a strobe image with an ambient image to generate a blended image, according to a third embodiment of the present invention.

FIG. 8A is a flow diagram of a method 800 for blending a strobe image with an ambient image to generate a blended image, according to a third embodiment of the present invention. Although the method steps are described in conjunction with the systems of FIGS. 1A-1D, persons skilled in the art will understand that any system configured to perform the method steps, in any order, is within the scope of the present invention. In one embodiment, method 800 implements data flow 204 of FIG. 2C. The strobe image and the ambient image each comprise at least one pixel and may each comprise an equal number of pixels.

The method begins in step 810, where a processor complex within a digital photographic system, such as processor complex 110 within digital photographic system 100 of FIG. 1A, receives a strobe image and an ambient image, such as strobe image 210 and ambient image 220, respectively. In step 812, the processor complex estimates a motion transform between the strobe image and the ambient image. In step 814, the processor complex renders at least an aligned strobe image or an aligned ambient image based the estimated motion transform. In certain embodiments, the processor complex renders both the aligned strobe image and the aligned ambient image based on the motion transform. The aligned strobe image and the aligned ambient image may be rendered to the same resolution so that each is aligned to the other. In one embodiment, steps 812 and 814 together comprise alignment operation 230. In step 816, the processor complex generates a blended image, such as blended image 280, by executing a blend operation 270 on the aligned strobe image and the aligned ambient image. The method terminates in step 890, where the processor complex saves the blended image, for example to NV memory 116, volatile memory 118, or memory system 162.

Figure 8B:
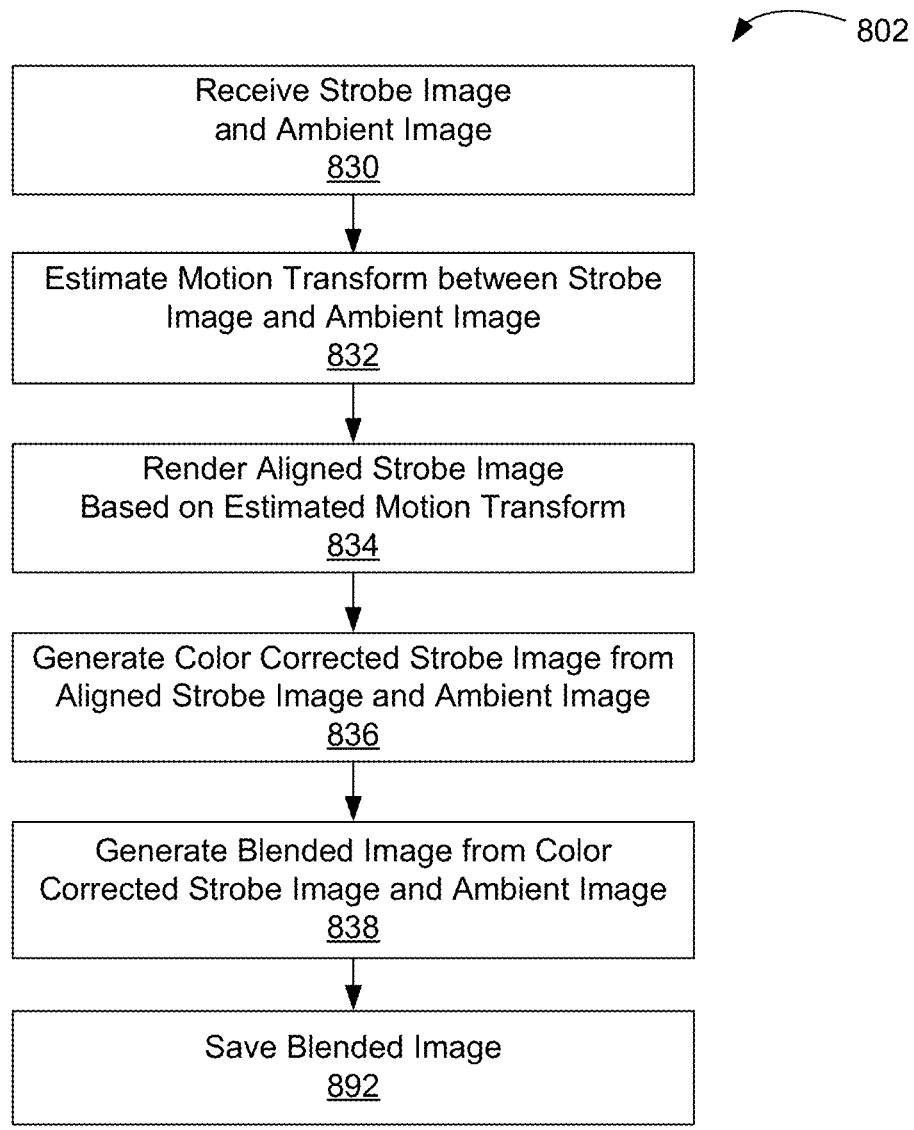
FIG. 8B is a flow diagram of method steps for blending a strobe image with an ambient image to generate a blended image, according fourth embodiment of the present invention.

FIG. 8B is a flow diagram of a method 802 for blending a strobe image with an ambient image to generate a blended image, according to a fourth embodiment of the present invention. Although the method steps are described in conjunction with the systems of FIGS. 1A-1D, persons skilled in the art will understand that any system configured to perform the method steps, in any order, is within the scope of the present invention. In one embodiment, method 802 implements data flow 206 of FIG. 2D. The strobe image and the ambient image each comprise at least one pixel and may each comprise an equal number of pixels.

The method begins in step 830, where a processor complex within a digital photographic system, such as processor complex 110 within digital photographic system 100 of FIG. 1A, receives a strobe image and an ambient image, such as strobe image 210 and ambient image 220, respectively. In step 832, the processor complex estimates a motion transform between the strobe image and the ambient image. In step 834, the processor complex may render at least an aligned strobe image or an aligned ambient image based the estimated motion transform. In certain embodiments, the processor complex renders both the aligned strobe image and the aligned ambient image based on the motion transform. The aligned strobe image and the aligned ambient image may be rendered to the same resolution so that each is aligned to the other. In one embodiment, steps 832 and 834 together comprise alignment operation 230.

In step 836, the processor complex generates a color corrected strobe image, such as corrected strobe image data 252, by executing a frame analysis operation 240 on the aligned strobe image and the aligned ambient image and executing a color correction operation 250 on the aligned strobe image. In step 838, the processor complex generates a blended image, such as blended image 280, by executing a blend operation 270 on the color corrected strobe image and the aligned ambient image. The method terminates in step 892, where the processor complex saves the blended image, for example to NV memory 116, volatile memory 118, or memory system 162.

While the techniques taught herein are discussed above in the context of generating a digital photograph having a natural appearance from an underlying strobe image and ambient image with potentially discordant color, these techniques may be applied in other usage models as well.

For example, when compositing individual images to form a panoramic image, color inconsistency between two adjacent images can create a visible seam, which detracts from overall image quality. Persons skilled in the art will recognize that frame analysis operation 240 may be used in conjunction with color correction operation 250 to generated panoramic images with color-consistent seams, which serve to improve overall image quality. In another example, frame analysis operation 240 may be used in conjunction with color correction operation 250 to improve color consistency within high dynamic range (HDR) images.

In yet another example, multispectral imaging may be improved by enabling the addition of a strobe illuminator, while maintaining spectral consistency. Multispectral imaging refers to imaging of multiple, arbitrary wavelength ranges, rather than just conventional red, green, and blue ranges. By applying the above techniques, a multispectral image may be generated by blending two or more multispectral images having different illumination sources, i.e., different lighting conditions.

In still other examples, the techniques taught herein may be applied in an apparatus that is separate from digital photographic system 100 of FIG. 1A. Here, digital photographic system 100 may be used to generate and store a strobe image and an ambient image. The strobe image and ambient image are then combined later within a computer system, disposed locally with a user, or remotely within a cloud-based computer system. In one embodiment, method 802 comprises a software module operable with an image processing tool to enable a user to read the strobe image and the ambient image previously stored, and to generate a blended image within a computer system that is distinct from digital photographic system 100.

Persons skilled in the art will recognize that while certain intermediate image data may be discussed in terms of a particular image or image data, these images serve as illustrative abstractions. Such buffers may be allocated in certain implementations, while in other implementations intermediate data is only stored as needed. For example, aligned strobe image 232 may be rendered to completion in an allocated image buffer during a certain processing step or steps, or alternatively, pixels associated with an abstraction of an aligned image may be rendered as needed without a need to allocate an image buffer to store aligned strobe image 232.

While the techniques described above discuss color correction operation 250 in conjunction with a strobe image that is being corrected based on an ambient reference image, a strobe image may serve as a reference image for correcting an ambient image. In one embodiment ambient image 220 is subjected to color correction operation 250, and blend operation 270 operates as previously discussed for blending an ambient image and a strobe image.

User Interface Elements

Figure 9:
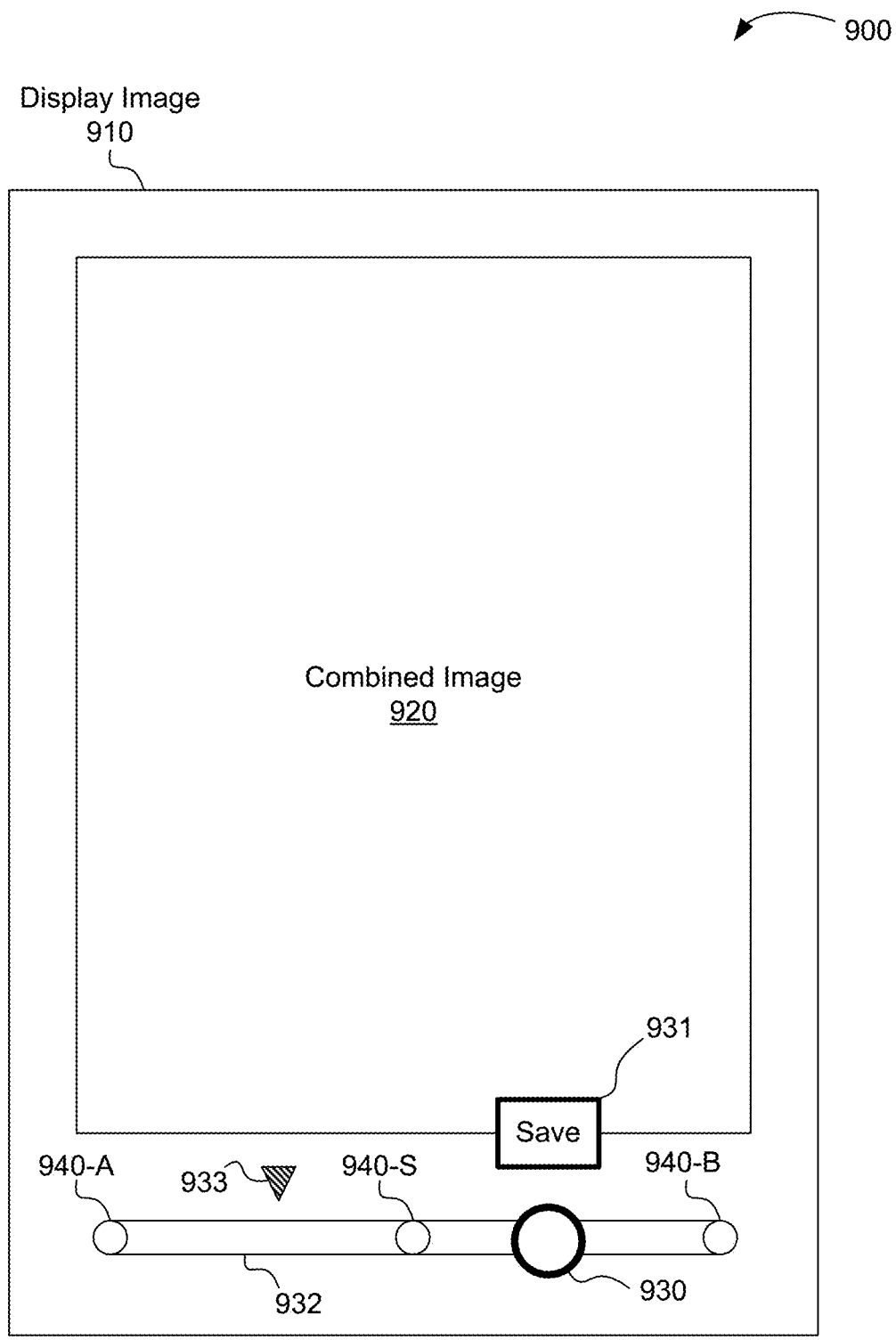
FIG. 9 illustrates a user interface system for generating a combined image, according to one embodiment of the present invention.

FIG. 9 illustrates a user interface (UI) system 900 for generating a combined image 920, according to one embodiment of the present invention. Combined image 920 comprises a combination of at least two related images. In one embodiment, combined image 920 comprises an image rendering that combines an ambient image, a strobe image, and a blended image. The strobe image may comprise a color corrected strobe image. For example combined image 920 may include a rendering that combines ambient image 220, strobe image 210, and blended image 280 of FIGS. 2A-2D. In one configuration, combined image 920 comprises an image rendering that combines an ambient image and a blended image. In another configuration, combined image 920 comprises an image rendering that combines an ambient image and a strobe image.

In one embodiment, UI system 900 presents a display image 910 that includes, without limitation, combined image 920, a UI control grip 930 comprising a continuous linear position UI control element configured to move along track 932, and two or more anchor points 940, which may each include a visual marker displayed within display image 910. In alternative embodiments, UI control grip 930 may comprise a continuous rotational position UI control element, or any other technically feasible continuous position UI control element. In certain embodiments, UI control grip 930 is configured to indicated a current setting for an input parameter, whereby the input parameter may be changed by a user via a tap gesture or a touch and drag gesture. The tap gesture may be used to select a particular position of UI control grip 930, while a touch and drag gesture may be used to enter a sequence of positions for UI control grip 930.

In one embodiment, UI system 900 is generated by an adjustment tool executing within processor complex 110 and display image 910 is displayed on display unit 112. The at least two component images may reside within NV memory 116, volatile memory 118, memory subsystem 162, or any combination thereof. In another embodiment, UI system 900 is generated by an adjustment tool executing within a computer system, such as a laptop computer, desktop computer, server computer, or any other technically feasible computer system. The at least two component images may be transmitted to the computer system or may be generated by an attached camera device. In yet another embodiment, UI system 900 is generated by a cloud-based server computer system, which may download the at least two component images to a client browser, which may execute combining operations described below.

UI control grip 930 is configured to move between two end points, corresponding to anchor points 940-A and 940-B. One or more anchor points, such as anchor point 940-S may be positioned between the two end points. Each anchor point 940 should be associated with a specific image, which may be displayed as combined image 920 when UI control grip 930 is positioned directly over the anchor point.

In one embodiment, anchor point 940-A is associated with the ambient image, anchor point 940-S is associated with the strobe image, and anchor point 940-B is associated with the blended image. When UI control grip 930 is positioned at anchor point 940-A, the ambient image is displayed as combined image 920. When UI control grip 930 is positioned at anchor point 940-S, the strobe image is displayed as combined image 920. When UI control grip 930 is positioned at anchor point 940-B, the blended image is displayed as combined image 920. In general, when UI control grip 930 is positioned between anchor points 940-A and 940-S, inclusive, a first mix weight is calculated for the ambient image and the strobe image. The first mix weight may be calculated as having a value of 0.0 when the UI control grip 930 is at anchor point 940-A and a value of 1.0 when UI control grip 930 is at anchor point 940-S. A mix operation, described previously, is then applied to the ambient image and the strobe image, whereby a first mix weight of 0.0 gives complete mix weight to the ambient image and a first mix weight of 1.0 gives complete mix weight to the strobe image. In this way, a user may blend between the ambient image and the strobe image. Similarly, when UI control grip 930 is positioned between anchor point 940-S and 940-B, inclusive, a second mix weight may be calculated as having a value of 0.0 when UI control grip 930 is at anchor point 940-S and a value of 1.0 when UI control grip 930 is at anchor point 940-B. A mix operation is then applied to the strobe image and the blended image, whereby a second mix weight of 0.0 gives complete mix weight to the strobe image and a second mix weight of 1.0 gives complete mix weight to the blended image.

This system of mix weights and mix operations provide a UI tool for viewing the ambient image, strobe image, and blended image as a gradual progression from the ambient image to the blended image. In one embodiment, a user may save a combined image 920 corresponding to an arbitrary position of UI control grip 930. The adjustment tool implementing UI system 900 may receive a command to save the combined image 920 via any technically feasible gesture or technique. For example, the adjustment tool may be configured to save combined image 920 when a user gestures within the area occupied by combined image 920. Alternatively, the adjustment tool may save combined image 920 when a user presses, but does not otherwise move UI control grip 930. In another implementation, the adjustment tool may save combined image 920 when the user enters a gesture, such as pressing a save button 931, dedicated to receive a save command.

In one embodiment, save button 931 is displayed and tracks the position of UI control grip 930 while the user adjusts UI control grip 930. The user may click save button 931 at any time to save an image corresponding to the current position of UI control grip 930.

In another embodiment, save button 931 is displayed above (or in proximity to) UI control grip 930, when the user does not have their finger on UI control grip 930. If the user touches the save button 931, an image is saved corresponding to the position of UI control grip 930. If the user subsequently touches the UI control grip 930, then save button 931 disappears. In one usage case, a user adjusts the UI control grip 930, lifts their finger from the UI control grip, and save button 931 is displayed conveniently located above UI control grip 930. The user may then save a first adjusted image corresponding to this first position of UI control grip 930. The user then makes a second adjustment using UI control grip 930. After making the second adjustment, the user lifts their finger from UI control grip 930 and save button 931 is again displayed above the current position of UI control grip 930. The user may save a second adjusted image, corresponding to a second UI control grip position, by pressing save button 931 again.

In certain embodiments, UI control grip 930 may be positioned initially in a default position, or initially in a calculated position, such as calculated from current image data or previously selected position information. The user may override the initial position by moving UI control grip 930. The initial position may be indicated via an initial position marker 933 disposed along track 932 to assist the user in returning to the initial position after moving UI control grip 930 away from the initial position. In one embodiment, UI control grip 930 is configured to return to the initial position when a user taps in close proximity to initial position marker 933. In certain embodiments, the initial position marker may be configured to change color or intensity when UI control grip 930 is positioned in close proximity to the initial position marker.

In certain embodiments, the adjustment tool provides a continuous position UI control, such as UI control grip 930, for adjusting otherwise automatically generated parameter values. For example, a continuous UI control may be configured to adjust, without limitation, a frameTrust value, a bias or function applied to a plurality of individual pixelTrust values, blend surface parameters such as one or more of heights 355-358 illustrated in FIG. 3C, blend surface curvature as illustrated in FIG. 3D, or any combination thereof. In one embodiment, an initial parameter value is calculated and mapped to a corresponding initial position for UI control grip 930. The user may subsequently adjust the parameter value via UI control grip 930. Any technically feasible mapping between a position for UI control grip 930 and the corresponding value may be implemented without departing the scope and spirit of the present invention.

Persons skilled in the art will recognize that the above system of mix weights and mix operations may be generalized to include two or more anchor points, which may be associated with two or more related images without departing the scope and spirit of the present invention. Such related images may comprise, without limitation, an ambient image and a strobe image, two ambient images having different exposure and a strobe image, or two or more ambient images having different exposure.

Furthermore, a different continuous position UI control, such as a rotating knob, may be implemented rather than UI control grip 930. In certain embodiments, a left-most anchor point corresponds to an ambient image, a mid-point anchor point corresponds to a blended image, and a right-most anchor point corresponds to a strobe image.

Figure 10A:
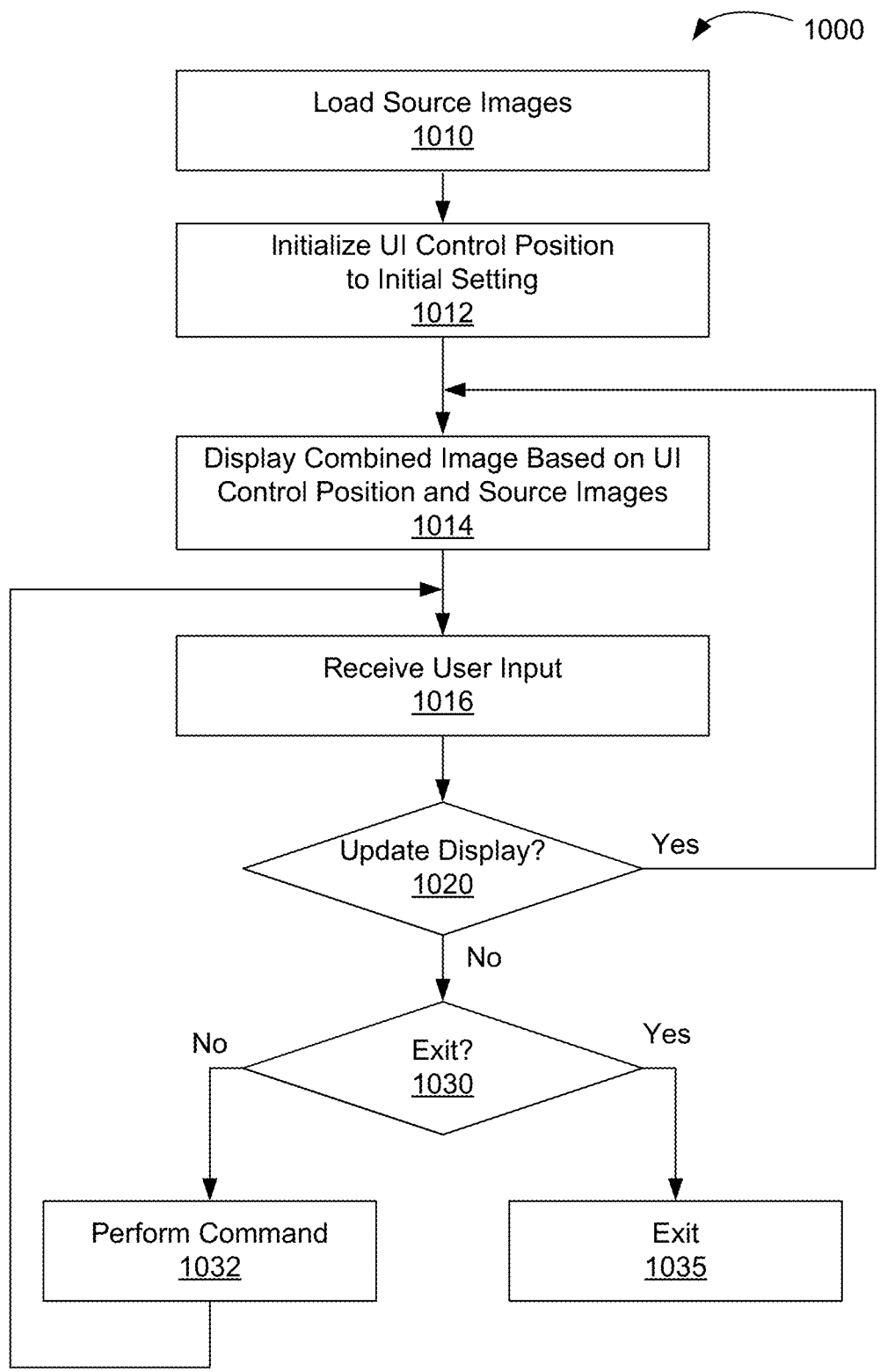
FIG. 10A is a flow diagram of method steps for generating a combined image, according to one embodiment of the present invention.

FIG. 10A is a flow diagram of a method 1000 for generating a combined image, according to one embodiment of the present invention. Although the method steps are described in conjunction with the systems of FIGS. 1A-1D, persons skilled in the art will understand that any system configured to perform the method steps, in any order, is within the scope of the present invention.

Method 1000 begins in step 1010, where an adjustment tool executing within a processor complex, such as processor complex 110, loads at least two related source images. In step 1012, the adjustment tool initializes a position for a UI control, such as UI control grip 930 of FIG. 9, to an initial position. In one embodiment, the initial UI control position corresponds to an anchor point, such as anchor point 940-A, anchor point 940-S, or anchor point 940-B. In another embodiment, the initial UI control position corresponds to a recommended UI control position. In certain embodiments, the recommended UI control position is based on previous UI control positions associated with a specific UI event that serves to indicate user acceptance of a resulting image, such as a UI event related to saving or sharing an image based on a particular UI control position. For example, the recommended UI control position may represent an historic average of previous UI control positions associated with the UI event. In another example, the recommended UI control position represents a most likely value from a histogram of previous UI control positions associated with the UI event.

In certain embodiments, the recommended UI control position is based on one or more of the at least two related source images. For example, a recommended UI control position may be computed to substantially optimize a certain cost function associated with a combined image 920. The cost function may assign a cost to over-exposed regions and another cost to under-exposed regions of a combined image associated with a particular UI control position. Optimizing the cost function may then comprise rendering combined images having different UI control positions to find a UI control position that substantially minimizes the cost function over each rendered combined image. The combined images may be rendered at full resolution or reduced resolution for calculating a respective cost function. The cost function may assign greater cost to over-exposed regions than under-exposed regions to prioritize reducing over-exposed areas. Alternatively, the cost function may assign greater cost to under-exposed regions than over-exposed regions to prioritize reducing under-exposed areas. One exemplary technique for calculating a recommended UI control position for UI control grip 930 is illustrated in greater detail below in FIG. 10B.

In certain alternative embodiments, the cost function is computed without rendering a combined image. Instead, the cost function for a given UI control position is computed via interpolating or otherwise combining one or more attributes for each image associated with a different anchor point. For example, a low intensity mark computed at a fifteenth percentile point for each of two different images associated with corresponding anchor points may comprise one of two attributes associated with the two different images. A second attribute may comprise a high intensity mark, computed at an eighty-fifth percentile mark. One exemplary cost function defines a combined low intensity mark as a mix of two different low intensity marks corresponding to each of two images associated with two different anchor points, and a high intensity mark as a mix of two different high intensity marks corresponding to each of the two images. The cost function value is then defined as the sum of an absolute distance from the combined low intensity mark and a half intensity value and an absolute distance from the combined high intensity mark and a half intensity value. Alternatively, each distance function may be computed from a mix of median values for each of the two images. Persons skilled in the art will recognize that other cost functions may be similarly implemented without departing the scope and spirit of the present invention.

In one embodiment, computing the recommended UI control position includes adding an offset estimate, based on previous user offset preferences expressed as a history of UI control position overrides. Here, the recommended UI control position attempts to model differences in user preference compared to a recommended UI control position otherwise computed by a selected cost function. In one implementation, the offset estimate is computed along with an offset weight. As offset samples are accumulated, the offset weight may increase, thereby increasing the influence of the offset estimate on a final recommended UI control position. Each offset sample may comprise a difference between a recommended UI control position and a selected UI control position expressed as a user override of the recommended UI control position. As the offset weight increases with accumulating samples, the recommended UI control position may gradually converge with a user preference of UI control position. The goal of the above technique is to reduce an overall amount and frequency of override intervention by the user by generating recommended UI control positions that are more consistent with a preference demonstrated by for the user.

In step 1014, the adjustment tool displays a combined image, such as combined image 920, based on a position of the UI control and the at least two related source images.

Any technically feasible technique may be implemented to generate the combined image. In one embodiment, step 1014 includes generating the combined image, whereby generating comprises mixing the at least two related source images as described previously in FIG. 9. In certain embodiments, the adjustment tool displays a "save" button, when the user is not touching the UI control. In certain other embodiments, the adjustment tool displays the save button regardless of whether the user is touching the UI control.

In step 1016, the adjustment tool receives user input. The user input may include, without limitation, a UI gesture such as a selection gesture or click gesture within display image 910. If, in step 1020, the user input should trigger a display update, then the method proceeds back to step 1014. A display update may include any change to display image 910. As such, a display update may include, without limitation, a chance in position of the UI control, an updated rendering of combined image 920, or a change in visibility of a given UI element, such as save button 931. Otherwise, the method proceeds to step 1030.

If, in step 1030, the user input does not comprise a command to exit, then the method proceeds to step 1032, where the adjustment tool performs a command associated with the user input. In one embodiment, the command comprises a save command and the adjustment tool then saves the combined image, which is generated according to a current position of the UI control. The method then proceeds back to step 1016.

Returning to step 1030, if the user input comprises a command to exit, then the method terminates in step 1035, and the adjustment tool exits, thereby terminating execution.

In one embodiment, one of the two related images is an ambient image, while another of the two related images is a strobe image. In certain embodiments, the strobe image comprises a color corrected strobe image.

Figure 10B:
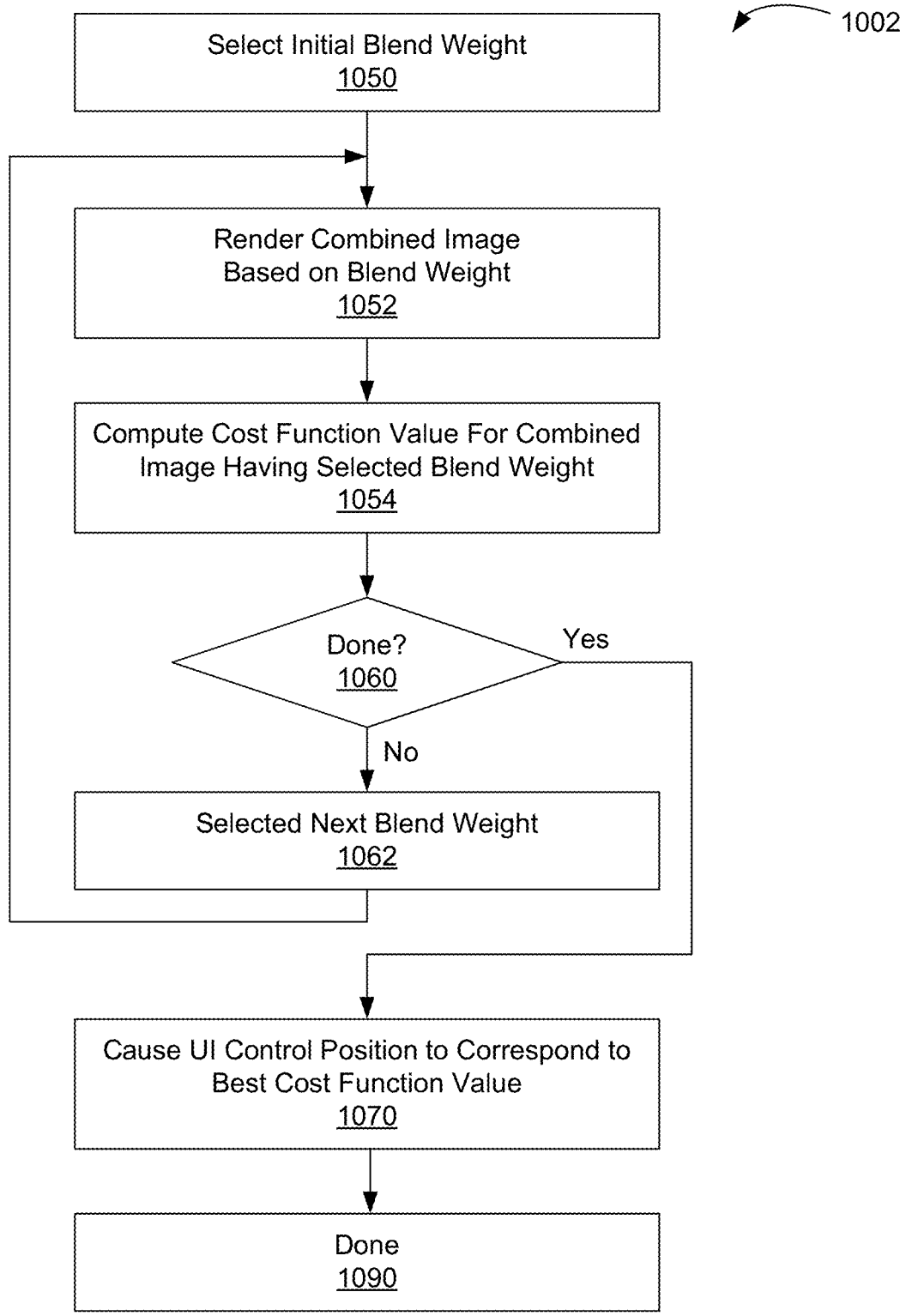
FIG. 10B is a flow diagram of a method steps for calculating a recommended UI control position for blending two different images, according to one embodiment of the present invention.

FIG. 10B is a flow diagram of a method 1002 for calculating a recommended UI control position for blending two different images, according to one embodiment of the present invention. Although the method steps are described in conjunction with the systems of FIGS. 1A-1D, persons skilled in the art will understand that any system configured to perform the method steps, in any order, is within the scope of the present invention. In one embodiment, the control position corresponds to a UI control position such as a position for UI control grip 930, used to generate blending weights for two or more related images.

The two different images may include regions having different exposure and lighting characteristics. For example, a strobe image may include excessively bright or saturated regions where the strobe reflected almost fully, while an ambient image may not include saturated regions, but may instead have inadequately illuminated regions.

A combined image, as described above, may include an excessively bright region as a consequence of one of the two different images having an overexposed region, or an inadequately exposed region as a consequence of one of the two different images having an inadequately exposed region. In one embodiment, a combined image is generated by mixing the two different images according to a mix weight. For certain pairs of two different images, reducing the mix weight of a first image may improve image quality by reducing the influence of overexposed regions within the first image. Similarly, reducing the mix weight of a second image may improve image quality by reducing the influence of inadequately exposed regions in the second image. In certain scenarios, a balanced mix weight between the first image and the second image may produce good image quality by reducing the influence of excessively bright regions in the first image while also reducing the influence of inadequately exposed regions in the second image. Method 1002 iteratively finds a mix weight that optimizes a cost function that is correlated to image quality of the combined image.

Method 1002 begins is step 1050, where a selection function selects an initial blend weight. In one embodiment, the selection function is associated with the adjustment tool of FIG. 10A. The initial blend weight may give complete weight to the first image and no weight to the second image, so that the combined image is equivalent to the first image. Alternatively, the initial blend weight may give complete weight to the second image, so that the combined image is equivalent to the second image. In practice, any technically feasible initial blend weight may also be implemented. In step 1052, the selection function renders a combined image according to a current blend weight, based on the first image and the second image. Initially, the current blend weight should be the initial blend weight.

In step 1054, the selection function computes a cost function value for the combined image. In one embodiment, the cost function is proportional to image area that is either overexposed or underexposed. A larger cost function value indicates more overexposed or underexposed area; such overexposed or underexposed areas are correlated to lower image quality for the combined image. In one exemplary implementation, the cost function comprises a sum where each pixel within the combined image adds a constant value to the cost function if the pixel intensity is below a low threshold (underexposed) or above a high threshold (overexposed). In another exemplary implementation, the cost function comprises a sum where each pixel adds an increasing value to the cost function in proportion to overexposure or underexposure. In other words, as the pixel increases intensity above the high threshold, the pixel adds an increasing cost to the cost function; similarly, as the pixel decreases intensity below the low threshold, the pixel adds an increasing cost to the cost function. In one embodiment, the high threshold is 90% of maximum defined intensity for the pixel and the low threshold is 10% of the maximum defined intensity for the pixel. Another exemplary cost function implements an increasing cost proportional to pixel intensity distance from a median intensity for the combined image. Yet another exemplary cost function combines two or more cost components, such as pixel intensity distance from the median intensity for the combined image and incremental cost for pixel intensity values above the high threshold or below the low threshold, where each cost component may be scaled according to a different weight.

In one embodiment, the cost function includes a repulsion cost component that increases as the control position approaches a specified anchor point. In one exemplary implementation, the repulsion cost component may be zero unless the control position is less than a threshold distance to the anchor point. When the control position is less than the threshold distance to the anchor point, the repulsion cost component increases according to any technically feasible function, such as a linear, logarithmic, or exponential function. The repulsion cost component serves to nudge the recommended UI control position away from the specified anchor point. For example, the repulsion cost component may serve to nudge the recommended UI control position away from extreme control position settings, such as away from anchor points 940-A and 940-B. In certain embodiments, the cost function may include an attraction cost component that decreases as the control position approaches a specified anchor point. The attraction cost component may serve to slightly favor certain anchor points.

If, in step 1060 searching for a recommended UI control position is not done, then the method proceeds to step 1062, where the selection function selects a next blend weight to be the current blend weight. Selecting a next blend weight may comprise linearly sweeping a range of possible blend weights, performing a binary search over the range of possible blend weights, or any other technically feasible search order for blend weights. In general, two different images should not have a monotonic cost function over the range of possible blend weights, however, the cost function may have one global minimum that may be discovered via a linear sweep or a binary search that identifies and refines a bounding region around the global minimum.

Returning to step 1060, if searching for a recommended UI control position is done, then the method proceeds to step 1070. Here a recommended UI control position corresponds to a blend weight that yields a rendered combined image having a minimum cost function over the range of possible blend weights. In step 1070, the selection function causes a UI control position to correspond to a best cost function value. For example, the selection tool may return a parameter corresponding to a recommended UI control position, thereby causing the adjustment tool to move UI control grip 930 to a position corresponding to the recommended UI control position. The method terminates in step 1090.

Method 1002 may be practiced over multiple images and multiple blend ranges. For example, the recommended UI control position may represent a blend weight from a set of possible blend ranges associated with the full travel range of UI control grip 930 over multiple anchor points, each corresponding to a different image. As shown in FIG. 9, three images are represented by anchor points 940, and two different blend ranges are available to blend two adjacent images. Persons skilled in the art will recognize that embodiments of the present invention may be practiced over an arbitrary set of images, including ambient images, strobe images, color corrected strobe images, and blended images.

FIGS. 11A-11C illustrate a user interface configured to adapt to device orientation while preserving proximity of a user interface control element to a hand grip edge, according to embodiments of the present invention. The user interface comprises a display object 1120, such as combined image 920 of FIG. 9, and a UI control 1132, which may comprise UI control grip 930 and track 932. Both display object 1120 and UI control 1132 are displayed on display screen 1112, which resides within mobile device 1110. A hand grip edge 1130 represents a portion of mobile device 1110 being held by a user. As shown, when the user rotates mobile device 1110, the display object responds by rotating to preserve a UI up orientation that is consistent with a user's sense of up and down; however, UI control 1132 remains disposed along user grip edge 1130, thereby preserving the user's ability to reach UI control 1132, such as to enter gestures. FIG. 11A illustrates mobile device 1110 in a typical up right position. As shown, hand grip edge 1130 is at the base of mobile device 1110. FIG. 11B illustrates mobile device 1110 in a typical upside down position. As shown, hand grip edge 1130 is at the top of mobile device 1110. FIG. 11C illustrates mobile device 1110 in a sideways position. As shown, hand grip edge 1130 is on the side of mobile device 1110.

In one embodiment, a UI up orientation is determined by gravitational force measurements provided by an accelerometer (force detector) integrated within mobile device 1110. In certain embodiments, hand grip edge 1130 is presumed to be the same edge of the device, whereby a user is presumed to not change their grip on mobile device 1110. However, in certain scenarios, a user may change their grip, which is then detected by a hand grip sensor implemented in certain embodiments, as illustrated below in FIG. 11D. For example, when a user grips mobile device 1110, hand grip sensors detect the user grip, such as via a capacitive sensor, to indicate a hand grip edge 1130. When the user changes their grip, a different hand grip edge 1130 may be detected.

Figure 11D:
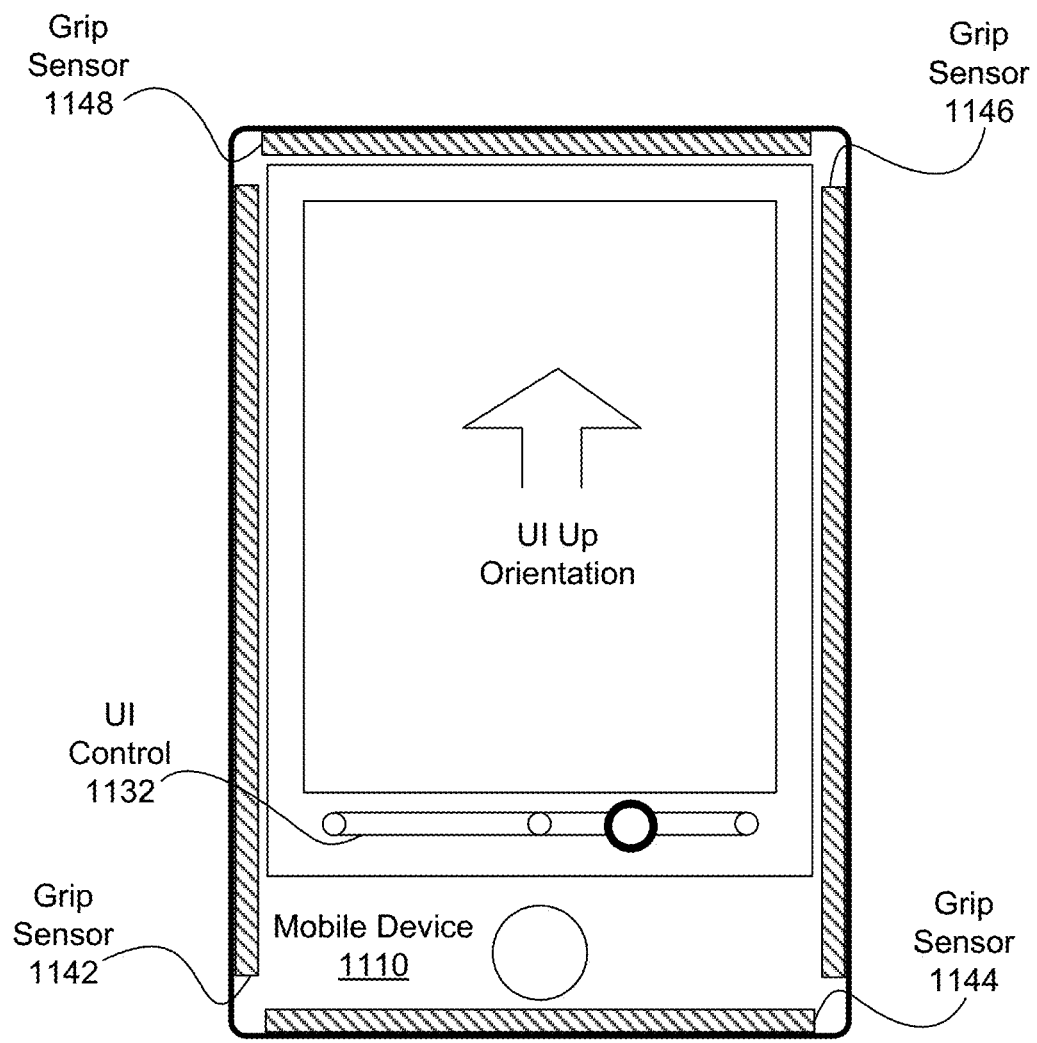
FIG. 11D illustrates a mobile device incorporating grip sensors configured to detect a user grip, according to one embodiment of the present invention.

FIG. 11D illustrates a mobile device incorporating grip sensors 1142, 1144, 1146, 1148 configured to detect a user grip, according to one embodiment of the present invention. As shown, grip sensor 1142 is disposed at the left of mobile device 1110, grip sensor 1144 is disposed at the bottom of the mobile device, grip sensor 1146 is disposed at the right of the mobile device, and grip sensor 1148 is disposed at the top of the mobile device. When a user grips mobile device 1110 from a particular edge, a corresponding grip sensor indicates to mobile device 1110 which edge is being gripped by the user. For example, if a user grips the bottom of mobile device 1110 along grip sensor 1144, then UI control 1132 is positioned along the corresponding edge, as shown. In one embodiment, grip sensors 1142-1148 each comprise an independent capacitive touch detector.

In certain scenarios, a user may grip mobile device 1110 using two hands rather than just one hand. In such scenarios, two or more grip sensors may simultaneously indicate a grip. Furthermore, the user may alternate which hand is gripping the mobile device, so that one or more of the grip sensors 1142-1148 alternately indicate a grip. In the above scenarios, when a grip sensor 1142-1148 indicates that the user changed their grip position to a new grip location, the new grip location may need to be held by the user for a specified time interval before the UI control is reconfigured according to the new grip position. In other words, selecting a new grip position may require overcoming a hysteresis function based on a hold time threshold. In each case, the UI up orientation may be determined independently according to one or more gravitational force measurements.

In one embodiment, two or more light-emitting diode (LED) illuminators are disposed on the back side of mobile device 1110. Each of the two or more LED illuminators is associated with a device enclosure region corresponding to a grip sensor. When a given grip sensor indicates a grip presence, a corresponding LED is not selected as a photographic illuminator for mobile device 1110. One or more different LEDs may be selected to illuminate a subject being photographed by mobile device 1110.

Figure 11E:
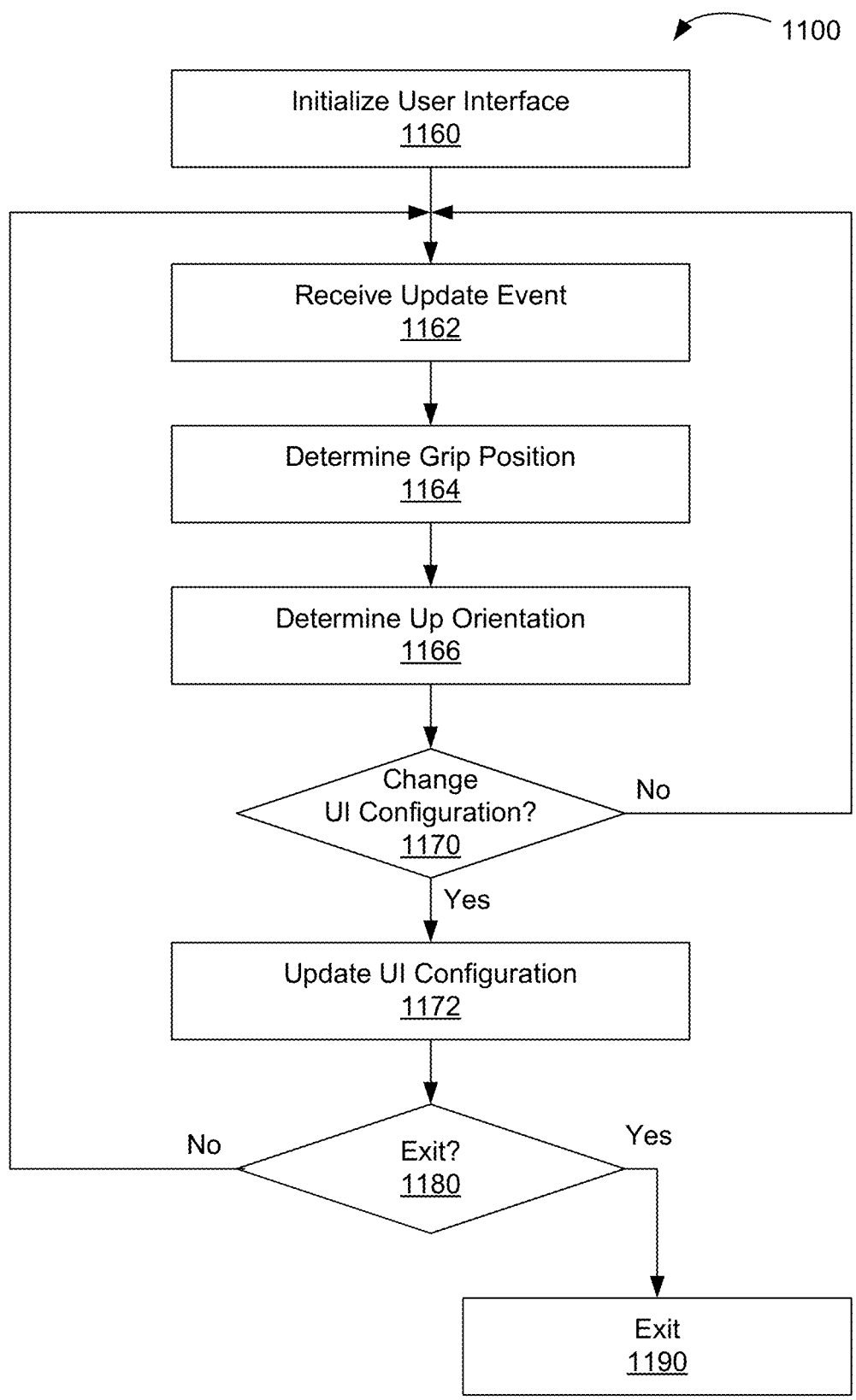
FIG. 11E is a flow diagram of method steps for orienting a user interface surface with respect to a control element, according to one embodiment of the present invention.

FIG. 11E is a flow diagram of a method 1100 for orienting a user interface surface with respect to a control element, according to one embodiment of the present invention. Although the method steps are described in conjunction with the systems of FIGS. 1A-1D, persons skilled in the art will understand that any system configured to perform the method steps, in any order, is within the scope of the present invention.

Method 1100 begins in step 1160, where a window manager executing within a computing device, such as mobile device 1110 of FIG. 11A, initializes a user interface (UI) comprising display object 1120 and UI control 1132. In step 1162, the window manager receives an update event, such as a user input event. In step 1164, the window manager determines a grip position where a user is likely holding the mobile device 1110. For example, the window manager may determine the grip position based on an assumption that the user will hold the mobile device along a consistent edge. The consistent edge may be initially determined, for example, as the edge closest to a physical button or UI button pressed by the user. Alternatively, the window manager may determine the grip position based on input data from one or more grip sensors, such as grip sensors 1142, 1144, 1146, and 1148. In step 1166, the window manager determines an up position. For example, the window manage may determine an up position based on a gravity force vector reported by an accelerometer. If, in step 1170 the window manager determines that a change to a current UI configuration in needed, then the method proceeds to step 1172. Otherwise the method proceeds back to step 1162. A change to the UI configuration may be needed, without limitation, if a new up orientation is detected or a new grip position is detected. In step 1172, the window manager updates the UI configuration to reflect a new grip position or a new up orientation, or a combination thereof. A new UI configuration should position UI control 1132 along the side of mobile device 1110 corresponding to a user grip. In one embodiment, of the user is gripping mobile device 1110 along two edges, then UI control 1132 may be positioned corresponding to the edge closest to being in a down orientation. Alternatively, the UI control 1132 may be positioned corresponding to a right hand preference or a left hand preference. A right or left hand preference may be selected by the user, for example as a control panel option.

If, in step 1180, the method should not terminate, then the method proceeds back to step 1162. Otherwise, the method terminates in step 1190.

In one embodiment the window manager comprises a system facility responsible for generating a window presentation paradigm. In other embodiments, the window manager comprises a set of window management functions associated with a given application or software module.

Figure 12A:
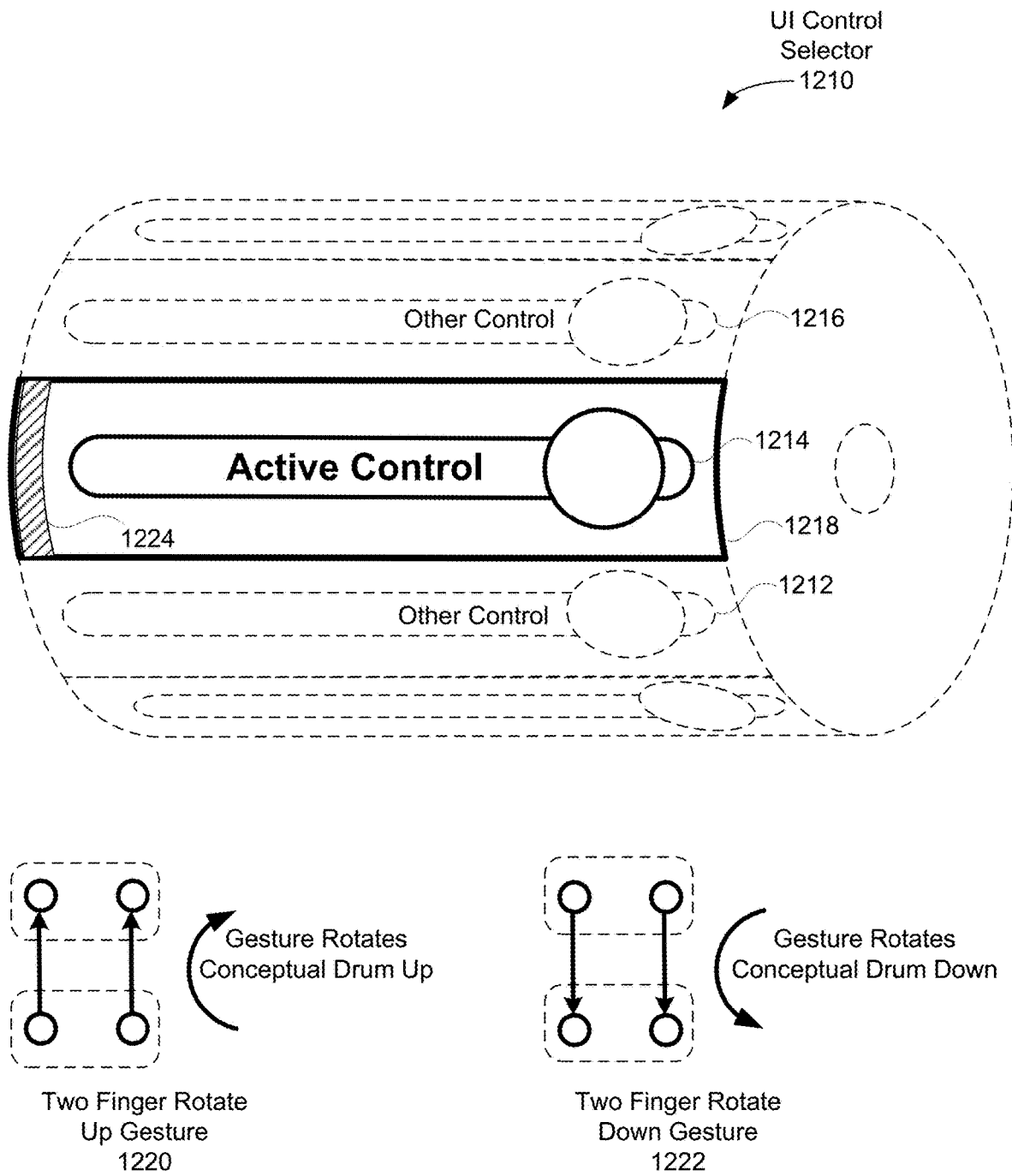
FIG. 12A illustrates a first user interface control selector configured to select one active control from one or more available controls, according to embodiments of the present invention.

FIG. 12A illustrates a user interface (UI) control selector 1210 configured to select one active control 1214 from one or more available controls 1212, 1214, 1216, according to embodiments of the present invention. The one or more available controls 1212, 1214, 1216 are conceptually organized as a drum that may be rotated up or down in repose to a corresponding rotate up gesture or rotate down gesture. A control aperture 1218 represents a region in which active control 1214 may operate. As shown, active control 1214 is a linear slider control, which may be used to input a particular application parameter. Control 1216 is shown as being not active, but may be made active by rotating the drum down using a rotate down gesture to expose control 1216 within control aperture 1218. Similarly, control 1212 may be made active by rotating the drum up using rotate up gesture. Inactive controls 1212, 1216 may be displayed as being partially obscured or partially transparent as an indication to the user that they are available.

In one embodiment, the rotate up gesture is implemented as a two-finger touch and upward swipe gesture, illustrated herein as rotate up gesture 1220. Similarly, the rotate down gesture is implemented as a two-finger touch and downward swipe gesture, illustrated herein as rotate down gesture 1222. In an alternative embodiment, the rotate up gesture is implemented as a single touch upward swipe gesture within control selection region 1224 and the rotate down gesture is implemented as a single touch downward swipe gesture within control selection region 1224.

Motion of the drum may emulate physical motion and include properties such as rotational velocity, momentum, and frictional damping. A location affinity function may be used to snap a given control into vertically centered alignment within control aperture 1218. Persons skilled in the art will recognize that any motion simulation scheme may be implemented to emulate drum motion without departing the scope and spirit of the present invention.

Figure 12B:
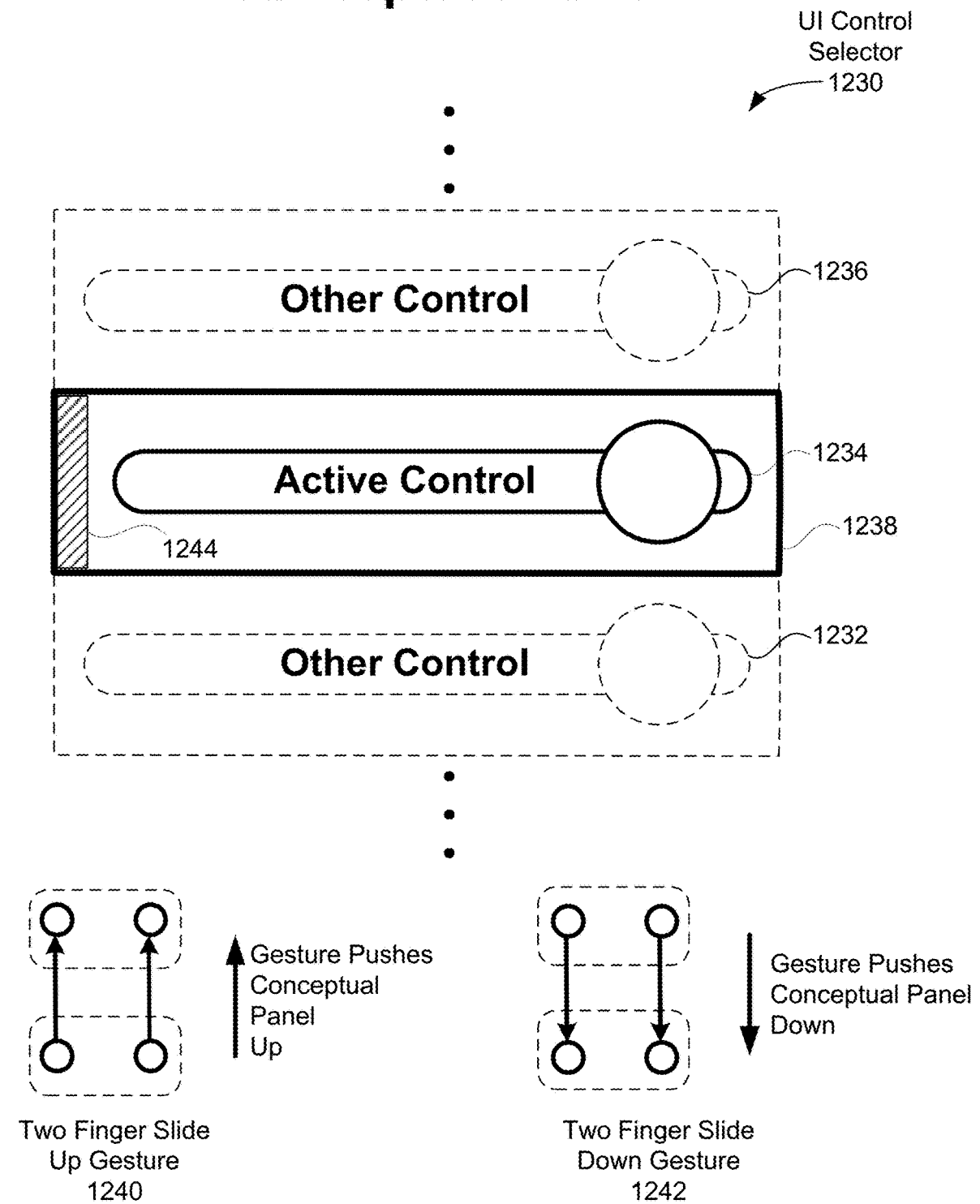
FIG. 12B illustrates a second user interface control selector configured to select one active control from one or more available controls, according to embodiments of the present invention.

FIG. 12B illustrates a user interface control selector 1230 configured to select one active control 1234 from one or more available controls 1232, 1234, 1236, according to embodiments of the present invention. The one or more available controls 1232, 1234, 1236 are conceptually organized as a flat sheet that may be slid up or slide down in repose to a corresponding slide up gesture or slide down gesture. A control aperture 1238 represents a region in which active control 1234 may operate. As shown, active control 1234 is a linear slider control, which may be used to input a particular application parameter. Control 1236 is shown as being not active, but may be made active by siding the sheet down using the slide down gesture to expose control 1236 within control aperture 1238. Similarly, control 1232 may be made active by sliding the sheet up using the slide up gesture. Inactive controls 1232, 1236 may be displayed as being partially obscured or partially transparent as an indication to the user that they are available.

In one embodiment, the slide up gesture is implemented as a two-finger touch and upward swipe gesture, illustrated herein as slide up gesture 1240. Similarly, the slide down gesture is implemented as a two-finger touch and downward swipe gesture, illustrated herein as slide down gesture 1242. In an alternative embodiment, the slide up gesture is implemented as a single touch upward swipe gesture within control selection region 1244 and the slide down gesture is implemented as a single touch downward swipe gesture within control selection region 1244

Motion of the sheet may emulate physical motion and include properties such as velocity, momentum, and frictional damping. A location affinity function may be used to snap a given control into vertically centered alignment within control aperture 1238. Persons skilled in the art will recognize that any motion simulation scheme may be implemented to emulate sheet motion without departing the scope and spirit of the present invention.

Active control 1214 and active control 1234 may each comprise any technically feasible UI control or controls, including, without limitation, any continuous control, such as a slider bar, or any type of discrete control, such as a set of one or more buttons. In one embodiment, two or more active controls are presented within control aperture 1218, 1238.

More generally, in FIGS. 12A and 12B, one or more active controls are distinguished from available controls that are not currently active. Any technically feasible technique may be implemented to distinguish the one or more active controls from available controls that are not currently active. For example, the one or more active controls may be rendered in a different color or degree of opacity; the one or more active controls may be rendered using thicker lines or bolder text, or any other visibly distinctive feature.

Figure 12C:
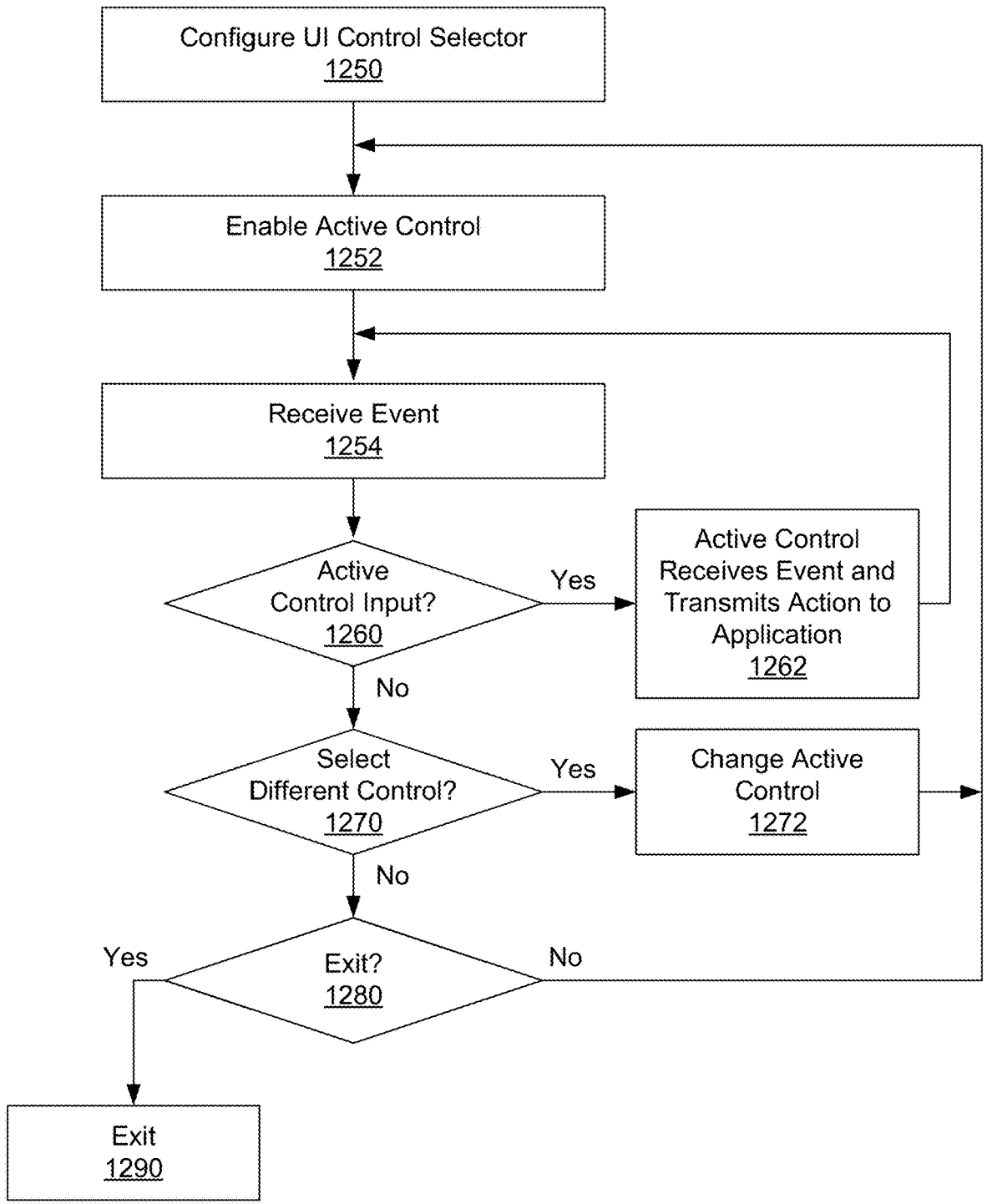
FIG. 12C is a flow diagram of method steps for selecting an active control from one or more available control elements, according to one embodiment of the present invention.

FIG. 12C is a flow diagram a method 1200 for selecting an active control from one or more available controls, according to one embodiment of the present invention. Although the method steps are described in conjunction with the systems of FIGS. 1A-1D, persons skilled in the art will understand that any system configured to perform the method steps, in any order, is within the scope of the present invention.

Method 1200 begins in step 1250, where an application configures a UI control selector to include at least two different UI controls. Configuration may be performed via one or more API calls associated with a window manager, for example via an object registration mechanism that registers each UI control and related settings with the UI control selector. One of the at least two different UI controls may be selected initially as an active control.

In step 1252, the UI control selector enables the active control, allowing the active control to receive user input. In step 1254, the window manager receives an input event. The input event may comprise a user input event targeting the active control, a user input event targeting the UI control selector, or any other technically feasible event, including a terminate signal. If, in step 1260, the input event comprises an active control input, then the method proceeds to step 1262, where the active control receives the input event and transmits a corresponding action based on the event to the application. In one embodiment, the application is configured to receive actions resulting from either of the at least two different UI controls. In certain embodiments, the application is configured to receive actions from any of the at least two different UI controls, although only the active control may actually generate actions in any one configuration of the UI control selector. Upon completing step 1262, the method proceeds back to step 1254.

Returning to step 1260, if the input event does not comprise an active control input, then the method proceeds to step 1270. If, in step 1270 the input event comprises an event to select a different control as the active control, then the method proceeds to step 1272, where the UI control selector changes which control is the active control. Upon completing step 1272, the method proceeds back to step 1252.

Returning to step 1270, if the input event does not comprise an event to select a different control, then the method proceeds to step 1280. If, in step 1280, the input event comprises a signal to exit then the method terminates in step 1290, otherwise, the method proceeds back to step 1252.

In one embodiment the window manager comprises a system facility responsible for generating a window presentation paradigm. In other embodiments, the window manager comprises a set of window management functions associated with a given application or software module.

Figure 13A:
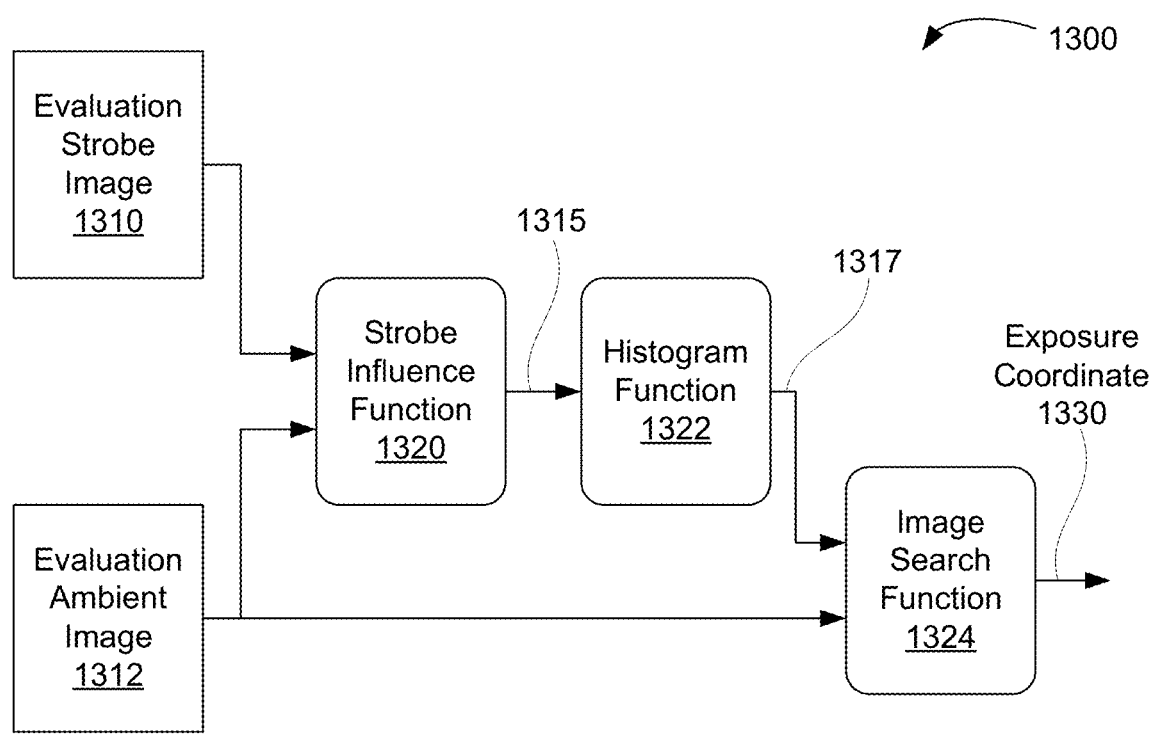
FIG. 13A illustrates a data flow process for selecting an ambient target exposure coordinate, according to one embodiment of the present invention.

FIG. 13A illustrates a data flow process 1300 for selecting an ambient target exposure coordinate, according to one embodiment of the present invention. An exposure coordinate is defined herein as a coordinate within a two-dimensional image that identifies a representative portion of the image for computing exposure for the image. The goal of data flow process 1300 is to select an exposure coordinate used to establish exposure for sampling an ambient image. The ambient image will then be combined with a related strobe image. Because the strobe image may better expose certain portions of a scene being photographed, those portions may be assigned reduced weight when computing ambient exposure. Here, the ambient target exposure coordinate conveys an exposure target to a camera subsystem, which may then adjust sensitivity, exposure time, aperture, or any combination thereof to generate mid-tone intensity values at the ambient target exposure coordinate in a subsequently sampled ambient image.

An evaluation strobe image 1310 is sampled based on at least a first evaluation exposure coordinate. An evaluation ambient image 1213 is separately sampled based on the at least a second evaluation exposure coordinate. In one embodiment, the second evaluation exposure coordinate comprises the first evaluation exposure coordinate. A strobe influence function 1320 scans the evaluation strobe image 1310 and the evaluation ambient image 1312 to generate ambient histogram data 1315. The ambient histogram data comprises, without limitation, an intensity value for each pixel within the evaluation ambient image, and state information indicating whether a given pixel should be counted by a histogram function 1322. In one embodiment, the strobe influence function implements an intensity discriminator function that determines whether a pixel is sufficiently illuminated by a strobe to be precluded from consideration when determining an ambient exposure coordinate. One exemplary discriminator function is true if a pixel in evaluation ambient image 1312 is at least as bright as a corresponding pixel in evaluation strobe image 1310. In another embodiment, the strobe influence function implements an intensity discriminator function that determines a degree to which a pixel is illuminated by a strobe. Here, the strobe influence function generates a weighted histogram contribution value, recorded in histogram function 1322. Pixels that are predominantly illuminated by the strobe are recorded as having a low weighted contribution for a corresponding ambient intensity by the histogram function, while pixels that are predominantly illuminated by ambient light are recorded as having a high weighted contribution for a corresponding ambient intensity by the histogram function.

In one embodiment, the first evaluation coordinate comprises a default coordinate. In another embodiment, the first evaluation coordinate comprises a coordinate identified by a user, such as via a tap gesture within a preview image. In yet another embodiment, the first evaluation coordinate comprises a coordinate identified via object recognition, such as via facial recognition.

Histogram function 1322 accumulates a histogram 1317 of ambient pixel intensity based on ambient histogram data 1315. Histogram 1317 reflects intensity information for regions of evaluation ambient image 1312 that are minimally influenced by strobe illumination. Regions minimally influenced by strobe illumination comprise representative exposure regions for ambient exposure calculations.

An image search function 1324 scans evaluation image 1312 to select the ambient target exposure coordinate, which may subsequently be used as an exposure coordinate to sample an ambient image. In one embodiment, the subsequently sampled ambient image and a subsequently sampled strobe image are combined in accordance with the techniques of FIGS. 2A through 10B.

In one embodiment, the image search function 1324 selects a coordinate that corresponds to a target intensity derived from, without limitation, intensity distribution information recorded within histogram 1317. In one embodiment, the target intensity corresponds to a median intensity recorded within histogram 1317. In another embodiment, the target intensity corresponds to an average intensity recorded within the histogram 1317. In certain embodiments, image search function 1324 preferentially selects a coordinate based on consistency of intensity in a defined region surrounding a given coordinate candidate. Consistency of intensity for the region may be defined according to any technically feasible definition; for example, consistency of intensity may be defined as a sum of intensity distances from the target intensity for pixels within the region.

In one embodiment, frame-level color correction factors, discussed in FIG. 4B above are substantially derived from regions included in ambient histogram data 1315.

Figure 13B:
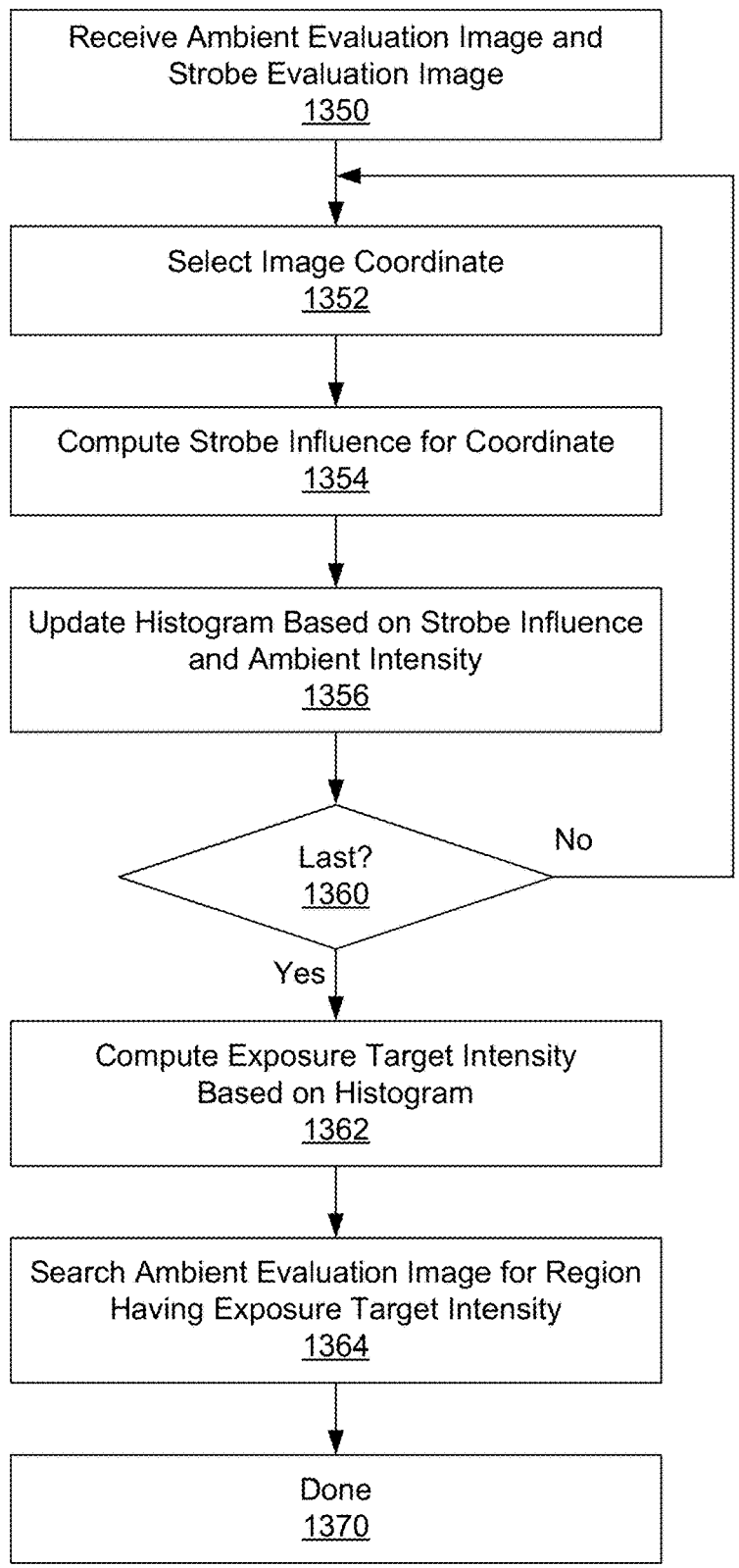
FIG. 13B is a flow diagram of method steps for selecting an ambient target exposure coordinate, according to one embodiment of the present invention.

FIG. 13B is a flow diagram of method 1302 for selecting an exposure coordinate, according to one embodiment of the present invention. Although the method steps are described in conjunction with the systems of FIGS. 1A-1D, persons skilled in the art will understand that any system configured to perform the method steps, in any technically feasible order, is within the scope of the present invention. In one embodiment, method 1302 implements an exposure coordinate selection function, such as data flow process 1300 of FIG. 13A.

Method 1302 begins in step 1350, where the exposure coordinate selection function receives an ambient evaluation image and a strobe evaluation image from a camera subsystem. The ambient evaluation image and the strobe evaluation image may be of arbitrary resolution, including a resolution that is lower than a native resolution for the camera subsystem. In one embodiment, the ambient evaluation image and the strobe evaluation image each comprise one intensity value per pixel.

In step 1352, the exposure coordinate selection function selects an image coordinate. The image coordinate corresponds to a two-dimensional location within ambient evaluation image, and a corresponding location within strobe evaluation image. Initially, the image coordinate may be one corner of the image, such as an origin coordinate. Subsequent execution of step 1352 may select coordinates along sequential columns in sequential rows until a last pixel is selected. In step 1354, the exposure coordinate selection function computes strobe influence for the selected coordinate. Strobe influence may be computed as described previously in FIG. 13A, or according to any technically feasible technique. In step 1356, the exposure coordinate selection function updates a histogram based on the strobe influence and ambient intensity. In one embodiment, strobe influence comprises a binary result and an ambient intensity is either recorded within the histogram as a count value corresponding to the ambient intensity or the ambient intensity is not recorded. In another embodiment, strobe influence comprises a value within a range of numeric values and an ambient intensity is recorded within the histogram with a weight defined by the numeric value.

If, in step 1360, the selected image coordinate is the last image coordinate, then the method proceeds to step 1362, otherwise, the method proceeds back to step 1352. In step 1362, the exposure coordinate selection function computes an exposure target intensity based on the histogram. For example, a median intensity defined by the histogram may be selected as an exposure target intensity. In step 1364, the exposure coordinate selection function searches the ambient evaluation image for a region having the exposure target intensity. This region may serve as an exemplary region for a camera subsystem to use for exposing a subsequent ambient image. In one embodiment, this region comprises a plurality of adjacent pixels within the ambient evaluation image having intensity values within an absolute or relative threshold of the exposure target intensity. The method terminates in step 1370.

Figure 13C:
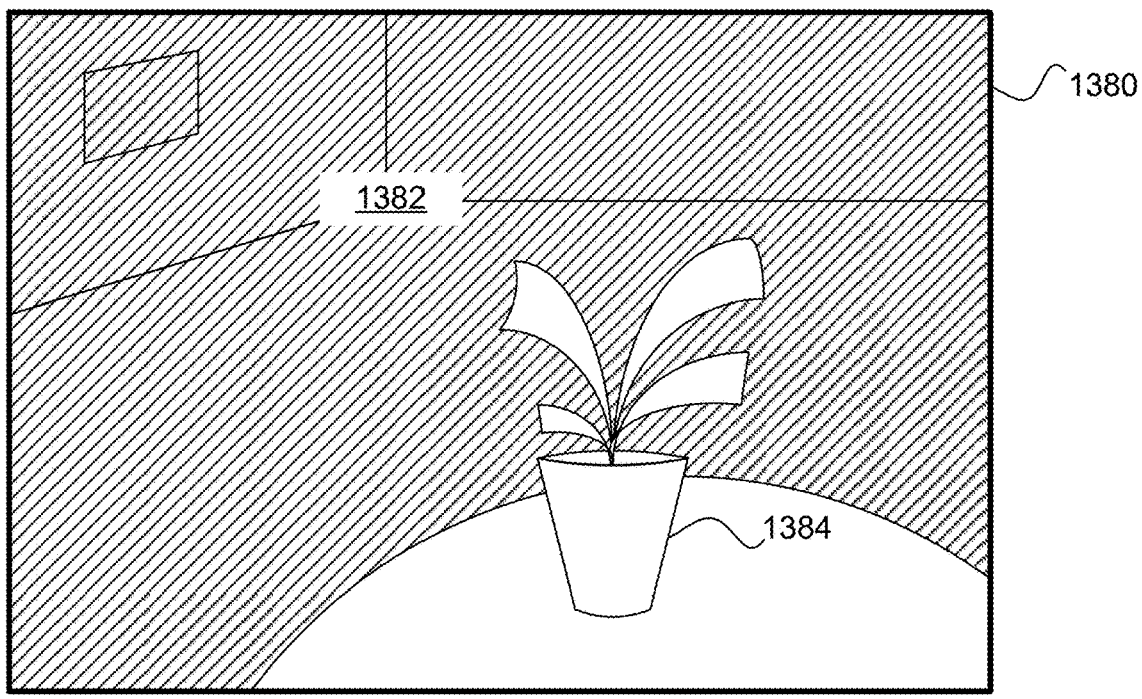
FIG. 13C illustrates a scene having a strobe influence region, according to one embodiment of the present invention.

FIG. 13C illustrates a scene 1380 having a strobe influence region, according to one embodiment of the present invention. The strobe influence region is illustrated as regions with no hash fill. Such regions include a foreground object 1384 and a surrounding region where the strobe illumination dominates. Region 1382, illustrated with a hash fill, depicts a region where strobe influence is minimal. In this example, pixels from region 1382 would be preferentially recorded within the histogram of FIG. 13B. In one embodiment, pixels comprising the strobe influence region would not be recorded within the histogram. In one alternative embodiment, pixels comprising the strobe influence region would be recorded within the histogram with reduced weight.

Figure 13D:
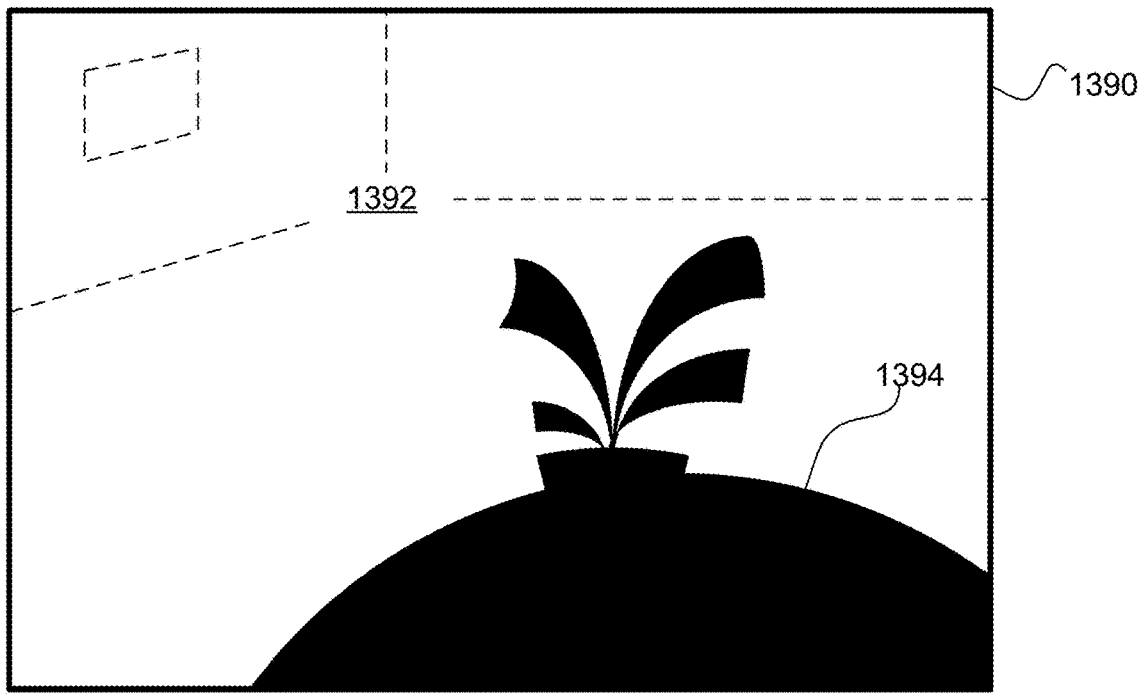
FIG. 13D illustrates a scene mask computed to preclude a strobe influence region, according to one embodiment of the present invention.

FIG. 13D illustrates a scene mask 1390 computed to preclude a strobe influence region 1394, according to one embodiment of the present invention. In this example, pixels within the strobe influence region 1394 are not recorded to the histogram of FIG. 13A, while pixels outside strobe influence region 1394 are recorded to the histogram.

Figure 14:
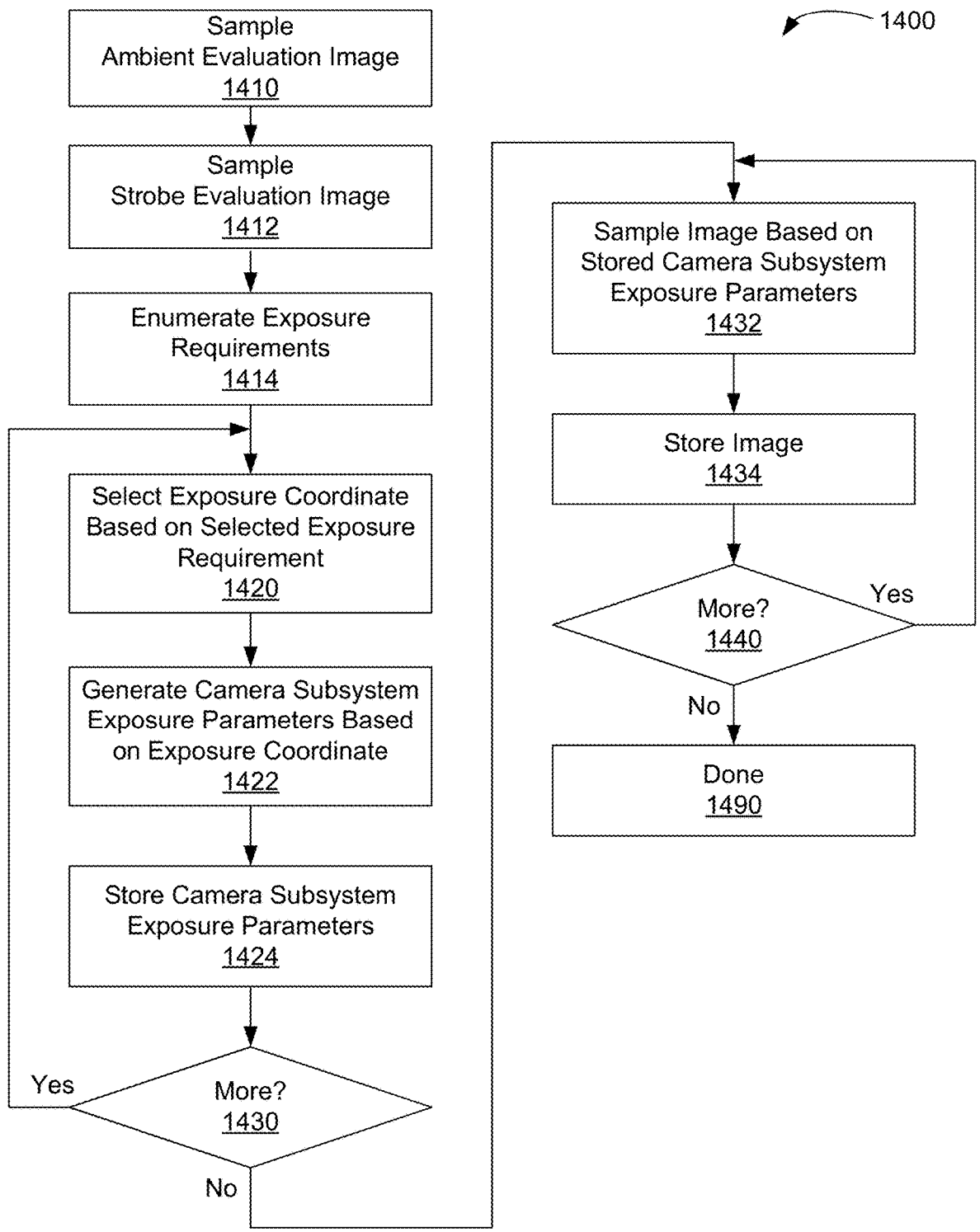
FIG. 14 is a flow diagram of method steps for sampling an ambient image and a strobe image based on computed exposure coordinates, according to one embodiment of the present invention.

FIG. 14 is a flow diagram of method 1400 for sampling an ambient image and a strobe image based on computed exposure coordinates, according to one embodiment of the present invention. Although the method steps are described in conjunction with the systems of FIGS. 1A-1D, persons skilled in the art will understand that any system configured to perform the method steps is within the scope of the present invention. The goal of method 1400 is to pre-compute two or more camera subsystem exposure parameters, a time consuming process, prior to actually sampling corresponding images for a photographic scene. Sampling the corresponding images is a time-sensitive process because the more time between two different images, the more likely the two corresponding images will appear. Therefore, the goal of method 1400 is to reduce overall inter-image time by performing time-consuming tasks related to image sampling prior to actually sampling the ambient image and strobe image. An image set comprises at least one ambient image and at least one strobe image. A camera control function is configured to execute method 1400. In one embodiment, the camera control function comprises a computer program product that includes computer programming instructions embedded within a non-transitory computer readable medium, such as within NV memory 116 of FIG. 1A, wherein the computer programming instructions cause a processor to perform method 1400.

Method 1400 begins in step 1410, where the camera control function causes a camera subsystem, such as camera unit 130, to sample an ambient evaluation image using available ambient scene illumination. The ambient evaluation image may be sampled at any technically feasible resolution, such as a lower resolution than a native resolution for the camera subsystem. In step 1412, the camera control function causes the camera subsystem to sample a strobe evaluation image of the photographic scene using a strobe illumination device, such as strobe unit 136. In one embodiment, a default exposure coordinate, such as an image midpoint, is used by the camera subsystem for exposing the ambient evaluation image and the strobe evaluation image. In another embodiment, an exposure coordinate selected by a user, such as via a tap selection gesture, is used by the camera subsystem for exposing the ambient evaluation image and the strobe evaluation image. In alternative embodiments steps 1412 and 1410 are executed in reverse sequence, so that the strobe evaluation image is sampled first followed by the ambient evaluation image. A given coordinate may also include an area, such as an area of pixels surrounding the coordinate.

In step 1414, the camera control function enumerates exposure requirements for an image set comprising two or more related images. One exemplary set of exposure requirements for an image set includes a requirement to sample two images, defined to be one ambient image and one strobe image. The ambient image exposure requirements may include an exposure target defined by a histogram median of pixel intensity values identified within the ambient evaluation image and strobe evaluation image. The exposure requirements may further include a coordinate being dominantly illuminated by ambient illumination rather than strobe illumination. The strobe image exposure requirements may include an exposure target defined by a user selected coordinate and a requirement to illuminate a scene with strobe illumination. Another exemplary set of exposure requirements may include three images, defined as two ambient images and one strobe image. One of the ambient images may require an exposure target defined by a histogram median with a positive offset applied for pixels identified within the ambient evaluation image and strobe evaluation image as being dominantly illuminated via ambient lighting. Another of the ambient images may require an exposure target defined by a histogram median with a negative offset applied. The strobe image exposure requirements may include an exposure target defined by the user selected coordinate and the requirement to illuminate the scene with strobe illumination. Upon completion of step 1414, a list of required images and corresponding exposure requirements is available, where each exposure requirement includes an exposure coordinate.

In step 1420, the camera control function selects an exposure coordinate based on a selected exposure requirement. In one embodiment, the exposure coordinate is selected by searching an ambient evaluation image for a region satisfying the exposure requirement. In step 1422, the camera control function causes the camera subsystem to generate camera subsystem exposure parameters for the photographic scene based on the selected exposure coordinate. In one embodiment, the camera subsystem exposure parameters comprise exposure time, exposure sensitivity ("ISO" sensitivity), aperture, or any combination thereof. The camera subsystem exposure parameters may be represented using any technically feasible encoding or representation, such as image sensor register values corresponding to exposure time and exposure sensitivity. In step 1424, the camera subsystem exposure parameters are saved to a data structure, such as a list, that includes image requirements and corresponding exposure parameters. The list of image requirements may include an entry for each image within the image set, and each entry may include exposure parameters. In certain embodiments, the exposure parameters may be kept in a distinct data structure. The exposure parameters for all images within the image set are determined prior to actually sampling the images. If, in step 1430, more camera subsystem exposure parameters need to be generated, then the method proceeds back to step 1420, otherwise, the method proceeds to step 1432.

In step 1432, the camera control function causes the camera to sample an image of the photographic scene based on a set of camera subsystem exposure parameters previously stored within the list of image requirements. In step 1434, the camera control function causes the image to be stored into the image set. The image set may be stored in any technically feasible memory system. If, in step 1440, more images need to be sampled, then the method proceeds back to step 1432, otherwise the method terminates in step 1490.

The list of image requirements may comprise an arbitrary set of ambient images and/or strobe images. In certain alternative embodiments, the strobe evaluation image is not sampled and method 1400 is practiced solely over images illuminated via available ambient light. Here, a histogram of ambient evaluation image may be used to generate exposure intensity targets in step 1414; the exposure intensity targets may then be used to find representative coordinates in step 1420; the representative coordinates may then be used to generate camera subsystem exposure parameters used to sample ambient images.

In certain embodiments, the camera subsystem is implemented as a separate system from a computing platform configured to perform methods described herein.

In one embodiment step 1420 of method 1400 comprises method 1302. In certain embodiments, step 612 of method 600 comprises method 1400. In one embodiment, step 612 of method 600 comprises method 1400, step 1420 comprises method 1302, and step 616 comprises method 1000. Furthermore, step 1012 comprises method 1002. In certain embodiments, step 1014 comprises method 1100.

In summary, techniques are disclosed for sampling digital images and blending the digital images based on user input. User interface (UI) elements are disclosed for blending the digital images based on user input and image characteristics. Other techniques are disclosed for selecting UI control elements that may be configured to operate on the digital images. A technique is disclosed for recommending blend weights among two or more images. Another technique is disclosed to generating a set of two or more camera subsystem exposure parameters that may be used to sample a sequence of corresponding images without introducing additional exposure computation time between each sampled image.

One advantage of the present invention is that a user is provided greater control and ease of control over images sampled and/or synthesized from two or more related images.

While the foregoing is directed to embodiments of the present invention, other and further embodiments of the invention may be devised without departing from the basic scope thereof, and the scope thereof is determined by the claims that follow.

We claim:
1. A device, comprising:
a non-transitory memory storing instructions; and
one or more processors in communication with the non-transitory memory, wherein the one or more processors execute the instructions to:
load two or more source images;
at least partially align the two or more source images;
initialize a first blend weight associated with the two or more source images;
render a first combined image from the two or more source images;
compute a cost function for the first combined image;
reduce the cost function by updating the first blend weight;
render a second combined image based on the updated first blend weight;
display the second combined image in an image viewer;
receive a selection of a user interface control selection graphical user interface element;
determine a first action corresponding to the selection;
transmit the first action from the user interface control selection graphical user interface element to the image viewer;
render a third combined image based on the first action; and
display the third combined image in the image viewer.

2. The device of claim 1, wherein the device is configured such that the user interface control selection graphical user interface element includes two or more available controls.

3. The device of claim 2, wherein the device is configured such that the one or more available controls are functionally organized as a drum.

4. The device of claim 2, wherein the device is configured such that the one or more available controls are functionally organized as a flat sheet.

5. The device of claim 2, wherein the device is configured such that the one or more available controls include an adjustment operation to a corresponding image.

6. The device of claim 5, wherein the device is configured such that the adjustment operation includes a flash contribution.

7. The device of claim 5, wherein the device is configured such that the adjustment operation includes a color correction.

8. The device of claim 3, wherein the one or more processors execute the instructions to rotate the drum up or down.

9. The device of claim 8, wherein the device is configured such that the drum is rotated by a two-figure gesture.

10. The device of claim 8, wherein the device is configured such that the drum is rotated by a one-figure gesture.

11. The device of claim 4, wherein the one or more processors execute the instructions to slide the flat sheet up or down.

12. The device of claim 11, wherein the device is configured such that the flat sheet is slid by a two-figure gesture.

13. The device of claim 11, wherein the device is configured such that the flat sheet is slid by a one-figure gesture.

14. The device of claim 1, wherein the device is configured such that the first action registers corresponding user interface controls.

15. The device of claim 1, wherein the device is configured such that the first action includes enabling an active control to receive at least one of: a user input event targeting the active control, or a user input event targeting the user interface control selection graphical user interface element.

16. The device of claim 1, wherein the one or more processors execute the instructions to emulate a physical motion in applying the first action to the image viewer.

17. The device of claim 1, wherein the device is configured such that the first action is restricted to a window manager.

18. The device of claim 1, wherein the device is configured such that the transmitting the first action includes performing one or more API calls via an object registration mechanism that registers settings of the user interface control selection graphical user interface element.

19. A computer program product comprising computer executable instructions stored on a non-transitory computer readable medium that when executed by a processor instruct the processor to:

load two or more source images;
at least partially align the two or more source images;
initialize a first blend weight associated with the two or more source images;
render a first combined image from the two or more source images;
compute a cost function for the first combined image;
reduce the cost function by updating the first blend weight;
render a second combined image based on the updated first blend weight;
display the second combined image in an image viewer;
receive a selection of a user interface control selection graphical user interface element;
determine a first action corresponding to the selection;
transmit the first action from the user interface control selection graphical user interface element to the image viewer;
render a third combined image based on the first action; and
display the third combined image in the image viewer.

20. A computer-implemented method, comprising:
loading, using a processor, two or more source images;
at least partially aligning, using the processor, the two or more source images;
initializing, using the processor, a first blend weight associated with the two or more source images;
rendering, using the processor, a first combined image from the two or more source images;
computing, using the processor, a cost function for the first combined image;
reducing, using the processor, the cost function by updating the first blend weight;
rendering, using the processor, a second combined image based on the updated first blend weight;
displaying, using the processor, the second combined image in an image viewer;
receiving, using the processor, a selection of a user interface control selection graphical user interface element;
determining, using the processor, a first action corresponding to the selection;
transmitting, using the processor, the first action from the user interface control selection graphical user interface element to the image viewer;
rendering, using the processor, a third combined image based on the first action; and
displaying, using the processor, the third combined image in the image viewer.

* * * * *